US012406617B2

(12) United States Patent
Guo et al.

(10) Patent No.: US 12,406,617 B2
(45) Date of Patent: Sep. 2, 2025

(54) DISPLAY PANEL AND DISPLAY APPARATUS

(71) Applicant: Shanghai Tianma Micro-electronics Co., Ltd., Shanghai (CN)

(72) Inventors: Wanlong Guo, Shanghai (CN); Qijun Yao, Shanghai (CN)

(73) Assignee: Shanghai Tianma Micro-electronics Co., Ltd., Shanghai (CN)

( * ) Notice: Subject to any disclaimer, the term of this patent is extended or adjusted under 35 U.S.C. 154(b) by 0 days.

(21) Appl. No.: 18/608,566

(22) Filed: Mar. 18, 2024

(65) Prior Publication Data

US 2025/0157390 A1 May 15, 2025

(30) Foreign Application Priority Data

Nov. 13, 2023 (CN) ......................... 202311507736.3

(51) Int. Cl.
*G09G 3/32* (2016.01)

(52) U.S. Cl.
CPC ....... *G09G 3/32* (2013.01); *G09G 2300/0842* (2013.01); *G09G 2310/0248* (2013.01); *G09G 2310/061* (2013.01); *G09G 2330/021* (2013.01)

(58) Field of Classification Search
CPC ............. G09G 3/32; G09G 2300/0842; G09G 2310/0248; G09G 2310/061; G09G 2330/021
See application file for complete search history.

(56) References Cited

U.S. PATENT DOCUMENTS

| | | | | |
|---|---|---|---|---|
| 2015/0194119 A1* | 7/2015 | Ahn | G09G 3/2025 | 345/82 |
| 2016/0118002 A1* | 4/2016 | Ito | G09G 3/3614 | 345/96 |
| 2017/0193922 A1* | 7/2017 | Pyeon | G09G 3/3291 | |
| 2022/0172691 A1* | 6/2022 | Mochizuki | G09G 3/3688 | |

FOREIGN PATENT DOCUMENTS

| | | |
|---|---|---|
| CN | 1620207 A | 5/2005 |
| CN | 100407270 C | 7/2008 |

* cited by examiner

*Primary Examiner* — Andrew Sasinowski
(74) *Attorney, Agent, or Firm* — Anova Law Group, PLLC

(57) ABSTRACT

The present disclosure includes a display panel and a display apparatus. The display panel includes a pre-charge circuit, a data-signal line and a pixel circuit, where the pre-charge circuit is electrically connected to the pixel circuit through the data-signal line; and before a data signal is written into the pixel circuit, the pre-charge circuit provides a pre-charge voltage signal to the data-signal line, and the data-signal line is charged through the pre-charge voltage signal.

19 Claims, 28 Drawing Sheets

DISPLAY PANEL AND DISPLAY APPARATUS

CROSS-REFERENCE TO RELATED APPLICATION

The present disclosure claims the priority of Chinese Patent Application No. 202311507736.3, filed on Nov. 13, 2023, the content of which is incorporated herein by reference in its entirety.

TECHNICAL FIELD

The present disclosure generally relates to the field of display technology and, more particularly, relates to a display panel and a display apparatus.

BACKGROUND

With rapid development of science and technology, display panels are intensively used in manufacturing and daily life. However, the display effect of existing display panels needs to be improved.

SUMMARY

One aspect of the present disclosure provides a display panel. The display panel includes a pre-charge circuit, a data-signal line and a pixel circuit, where the pre-charge circuit is electrically connected to the pixel circuit through the data-signal line; and before a data signal is written into the pixel circuit, the pre-charge circuit provides a pre-charge voltage signal to the data-signal line, and the data-signal line is charged through the pre-charge voltage signal.

Another aspect of the present disclosure provides a display apparatus including a display panel. The display panel includes a pre-charge circuit, a data-signal line and a pixel circuit, where the pre-charge circuit is electrically connected to the pixel circuit through the data-signal line; and before a data signal is written into the pixel circuit, the pre-charge circuit provides a pre-charge voltage signal to the data-signal line, and the data-signal line is charged through the pre-charge voltage signal.

Other aspects of the present disclosure may be understood by those skilled in the art in light of the description, the claims, and the drawings of the present disclosure.

BRIEF DESCRIPTION OF THE DRAWINGS

The accompanying drawings, which are incorporated into a part of the specification, illustrate embodiments of the present disclosure and together with the description to explain the principles of the present disclosure.

DETAILED DESCRIPTION

Figure 1:
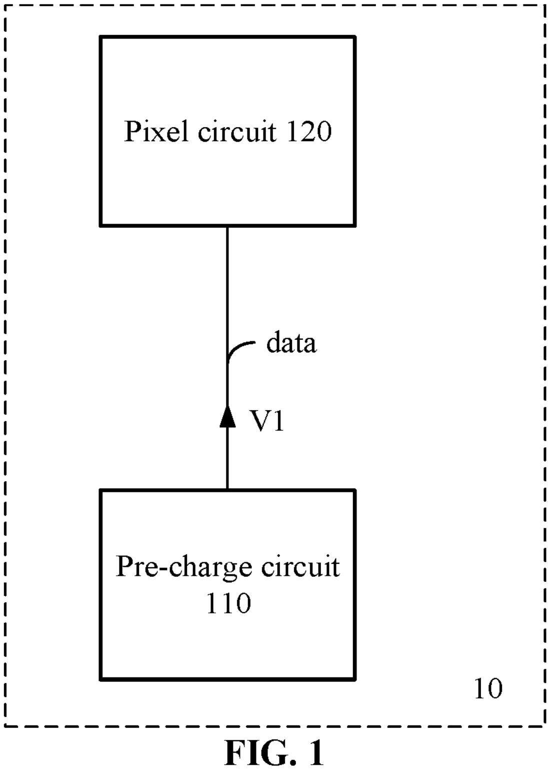
FIG. 1 illustrates a partial circuit schematic of a display panel according to various embodiments of the present disclosure.

The features and exemplary embodiments of various aspects of the present disclosure are described in detail hereinafter. In order to clearly illustrate the objectives, technical solutions and advantages of the present disclosure, the present disclosure is further described in detail below in conjunction with accompanying drawings and embodiments. It should be understood that embodiments described herein are only intended to explain the present disclosure rather than limit the present disclosure. It should be apparent to those skilled in the art that the present disclosure may be practiced without some of these specific details. Following description of embodiments is only to provide a better understanding of the present disclosure by showing examples of the present disclosure.

It should be noted that in the present disclosure, relational terms such as "first" and "second" may be only configured to distinguish one entity or operation from another entity or operation and may not necessarily require or imply that such actual relationship or order is between these entities or operations. Furthermore, the term "comprise", "include" or any other variation thereof may be intended to cover a non-exclusive inclusion. Therefore, a process, a method, an article or apparatus including a set of elements may include not only those elements, but also other elements not expressly listed, or also include elements inherent in the process, the method, the article or apparatus. Without further limitations, an element defined by the statement "include . . . " may not exclude the presence of additional identical elements in the process, the method, the article, or apparatus including such element.

It should be understood that the term "and/or" used in the present disclosure is only an association relationship to describe related objects, which indicates that there may be three relationships. For example, A and/or B may indicate three cases, including A alone, A and B, and B alone. In addition, the character "/" in the present disclosure may indicate that related objects are at an "or" relationship.

It should be noted that the transistors in embodiments of the present disclosure may be N-type transistors or P-type transistors. For the N-type transistor, the conduction level is high level, and the cut-off level is low level. That is, when the gate electrode of the N-type transistor is at a high level, the connection between the first electrode and the second electrode is turned on to be in conduction; and when the gate electrode of the N-type transistor is at a low level, the connection between the first electrode and the second electrode is turned off to be in disconnection. For the P-type transistor, the conduction level is low level, and the cut-off level is high level. That is, when the control electrode of the P-type transistor is at a low level, the connection between the first electrode and the second electrode of the P-type transistor is turned on to be in conduction; and when the control electrode of the P-type transistor is at a high level, the connection between the first electrode and the second electrode of the P-type transistor is turned off to be in disconnection. In an implementation manner, the gate electrode of each of the above transistors is configured to be the control electrode; and according to the signals and types of the gate electrodes of transistors, the first electrode is configured as the source electrode, and the second electrode is configured as the drain electrode; or the first electrode is configured as the drain electrode, and the second electrode is configured as the source electrode, which may not be distinguished herein. In addition, the conduction level and the cut-off level in embodiments of the present disclosure are general terms. The conduction level refers to any level that may turn on the transistor, and the cut-off level refers to any level that may turn off/cut off the transistor.

In embodiments of the present disclosure, the term "electrical connection" may refer to a direct electrical connection between two components or may refer to an electrical connection between two components via one or more other components.

In embodiments of the present disclosure, the first node and the first control node are only defined to facilitate the description of circuit structures; and the first node and the first control node are not actual circuit units.

It is obvious to those skilled in the art that various modifications and changes may be made in the present disclosure without departing from the spirit or scope of the present disclosure. Therefore, the present disclosure is intended to cover the modifications and variations of the present disclosure within the scope of corresponding claims (claimed technical solutions) and their equivalents. It should be noted that implementation manners provided in embodiments of the present disclosure may be combined with each other if there is no contradiction.

Before describing the technical solutions provided by embodiments of the present disclosure, in order to facilitate understanding of embodiments of the present disclosure, the present disclosure first explains the problems in the existing technology.

The display panel is formed by a plurality of sub-pixels arranged in an array. The sub-pixel may include a pixel circuit and a light-emitting element. Driven by a scan signal and a data signal, the pixel circuit may be charged and maintain the electrical connection between the light-emitting element and a power signal line through discharge, such that the light-emitting element may emit light.

Since the data-signal line itself has impedance and/or parasitic capacitance, relatively long time is needed for a data signal to reach desired target potential (i.e., a more ideal charging potential) when transmitted through the data-signal line; furthermore, higher charging efficiency may be achieved, which may result in relatively long charging time for the pixel circuit. Especially at low brightness (such as low gray scale), since the current of the data signal is relatively small, longer time is needed to reach desired target potential, which may result in longer charging time of the pixel circuit.

Therefore, when the data signal is affected by factors such as the impedance and/or parasitic capacitance of the data-signal line itself, actual charging efficiency of the pixel circuit may be relatively low. As a result, the charges stored in the pixel circuit during corresponding charging time may be excessively low, which may result in insufficient light-emitting time of the light-emitting element, and low actual display brightness and poor display effect of the display panel.

Embodiments of the present disclosure provide a display panel and a display apparatus, which may solve the technical problems in the existing technology that actual display brightness of the display panel is relatively low.

The technical solutions of embodiments of the present disclosure are described hereinafter. The display panel may include a pre-charge circuit, a data-signal line and a pixel circuit; the pre-charge circuit may be electrically connected to the pixel circuit through the data-signal line; before the data signal is written into the pixel circuit, the pre-charge circuit may provide a pre-charge voltage signal to the data-signal line; and the data-signal line may be charged through the pre-charge voltage signal. Pre-charging the data-signal line through the pre-charge circuit may be beneficial for compensating or reducing the impact of the load at the data-signal line on writing the data signal (i.e., charging) to the pixel circuit. Since the data-signal line has been at a pre-charge potential in advance, when the data-signal line charges the pixel circuit, the potential of the data-signal line may reach desired target potential relatively quickly from the pre-charge potential, thereby shortening the time for the pixel circuit to enter a charging state or improving the charging efficiency of the pixel circuit at an initial stage of charging. When the time for the pixel circuit to enter the charging state is shortened or the charging efficiency at the initial stage of charging is improved, overall charging efficiency of the pixel circuit during the charging process may be improved, and the charging process may be accelerated, which may reduce the problem of low actual brightness of the light-emitting element due to insufficient charging of the pixel circuit and improve the display effect of the display panel.

The display panel provided by embodiments of the present disclosure is first described hereinafter.

FIG. 1 illustrates a partial circuit schematic of a display panel according to various embodiments of the present disclosure. Referring to FIG. 1, a display panel 10 provided by embodiments of the present disclosure may include a pre-charge circuit 110, a data-signal line data, and a pixel circuit 120. The pre-charge circuit 110 may be electrically connected to the pixel circuit 120 through the data-signal line data. For ease of illustration, FIG. 1 only shows one pre-charge circuit 110, one data-signal line data, and one pixel circuit 120. However, it may be understood that the display panel 10 may include a plurality of pre-charge circuits 110, a plurality of data-signal lines data, and a plurality of pixel circuits 120, which may not be limited in the present disclosure.

Before the data signal is written into the pixel circuit 120, the pre-charge circuit 110 may provide a pre-charge voltage signal V1 to the data-signal line data and charge the data-signal line data through the pre-charge voltage signal V1.

By pre-charging the data-signal line data through the pre-charge circuit 110, exemplarily, the data-signal line data may be at the pre-charge potential in advance. When the data-signal line data charges the pixel circuit, exemplarily, the potential of the data-signal line data may reach desired target potential relatively quickly from the pre-charge potential, thereby shortening the time for the pixel circuit to enter the charging state or improving the charging efficiency of the pixel circuit at the initial stage of charging. When the time for the pixel circuit to enter the charging state is shortened or the charging efficiency at the initial stage of charging is improved, overall charging efficiency of the pixel circuit during the charging process may be improved, and the charging process may be accelerated, which may reduce the problem of low actual brightness of the light-emitting element due to insufficient charging of the pixel circuit and improve the display effect of the display panel.

The lengths of the data-signal lines data between different pixel circuits 120 and the pre-charge circuits 110 may be different, such that the loads of the data-signal lines data between different pixel circuits 120 and the pre-charge circuits 110 may also be different. Therefore, for at least two different pixel circuits 120, when the pre-charge circuits 110 pre-charge the data-signal lines data, the voltage values of the pre-charge voltage signal V1 may be different, which may more accurately compensate or reduce the impact of the load difference at the data-signal lines on writing the data signal (i.e., charging) to the pixel circuits.

Figure 2:
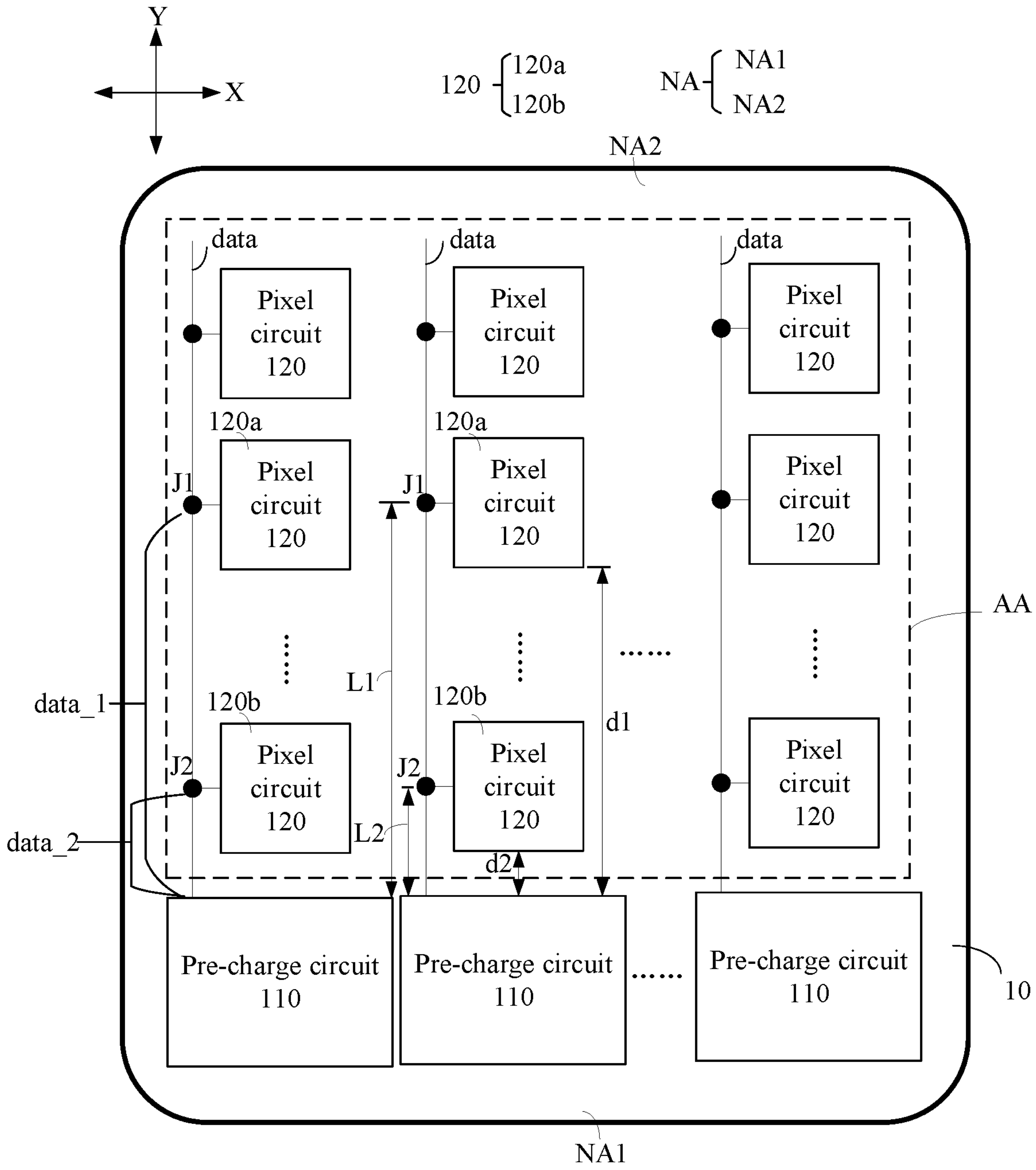
FIG. 2 illustrates a circuit schematic of a display panel according to various embodiments of the present disclosure.

FIG. 2 illustrates a circuit schematic of a display panel according to various embodiments of the present disclosure. Referring to FIG. 2, according to some embodiments of the present disclosure, optionally, the pre-charge circuit 110 may be electrically connected to at least two pixel circuits 120 arranged along the first direction Y through the data-signal line data. The data-signal line data may extend along the first direction Y. Exemplarily, the first direction Y may include a column direction of the display panel 10. At least two pixel circuits 120 may include the first pixel circuit 120*a* and the second pixel circuit 120*b*. That is, the pre-charge circuit 110 may be electrically connected to the first pixel circuit 120*a* and the second pixel circuit 120*b* through the data-signal line data. The first pixel circuit 120*a* and the second pixel circuit 120*b* may be arranged along the first direction Y. It should be noted that the positions of the first pixel circuit 120*a* and the second pixel circuit 120*b* in FIG. 2 are only exemplary. Along the first direction Y, the first pixel circuit 120*a* and the second pixel circuit 120*b* may be adjacent pixel circuits 120, or other pixel circuits 120 may be between the first pixel circuit 120*a* and the second pixel circuit 120*b*, which may not be limited in the present disclosure.

Before the first data signal is written into the first pixel circuit 120*a*, the pre-charge circuit 110 may provide the pre-charge voltage signal of the first voltage value to the data-signal line data, and the data-signal line data may be charged (that is, pre-charged) through the pre-charge voltage signal of the first voltage value.

Before the second data signal is written into the second pixel circuit 120*b*, the pre-charge circuit 110 may provide the pre-charge voltage signal of the second voltage value to the data-signal line data; and the data-signal line data may be charged (that is, pre-charged) through the pre-charge voltage signal of the second voltage value. For ease of distinction, the data signal written to the first pixel circuit 120*a* refers to the first data signal, and the data signal written to the second pixel circuit 120*b* refers to the second data signal. The voltage value of the first data signal and the voltage value of the second data signal may be same or different. The current value of the first data signal and the current value of the second data signal may be same or different. The first voltage value and the second voltage value may be different.

As shown in FIG. 2, the display panel 10 may include a display region AA and a non-display region NA. The non-display region NA may include the first non-display region NA1 and the second non-display region NA2. Along the first direction Y, the first non-display region NA1, the display region AA and the second non-display region NA2 may be arranged sequentially. The pre-charge circuit 110 may be, for example, in the first non-display region NA1. The data-signal line data may include the first-type data-signal line data_1 and the second-type data-signal line data_2. Along the first direction Y, the first-type data-signal line data_1 may be between the first pixel circuit 120*a* and the pre-charge circuit 110, and the length of the first-type data-signal line data_1 is the first length L1; and the second-type data-signal line data_2 may be between the second pixel circuit 120*b* and the pre-charge circuit 110, and the length of the second-type data-signal line data_2 is the second length L2. The first length L1 may be different from the second length L2. For example, as shown in FIG. 2, along the first direction Y, when the first pixel circuit 120*a* is on the side of the second pixel circuit 120*b* away from the pre-charge circuit 110, the first length L1 may be greater than the second length L2.

Since the length of the first-type data-signal line data_1 of the data-signal line data is different from the length of the second-type data-signal line data_2 of the data-signal line data, the load of the first-type data-signal line data_1 of the data-signal line data may be different from the load of the second-type data-signal line data_2 of the data-signal line data. Therefore, for the first pixel circuit 120*a* and the second pixel circuit 120*b* arranged along the first direction Y, when the pre-charge circuit 110 pre-charges the data-signal line data, the voltage value of the pre-charge voltage signal V1 may be different, which may be beneficial for compensating or reducing the load difference on the data-signal line data. For example, the pre-charge potential at the connection point J1 between the first pixel circuit 120*a* and the data-signal line data may be same as or similar to the pre-charge potential at the connection point J2 between the second pixel circuit 120*b* and the data-signal line data. In such way, when the data-signal line data charges the first pixel circuit 120*a* and the second pixel circuit 120*b*, exemplarily, the potential of the data-signal line data may reach desired target potential relatively quickly from same or similar pre-charge potential. Therefore, the time for the pixel circuit to enter the charging state may be shortened, or the charging efficiency of the pixel circuit at the initial stage of charging may be improved, which may reduce the problem of low actual brightness of the light-emitting element due to insufficient charging of the pixel circuit, thereby be beneficial for making the charging time lengths of pixel circuits at different positions to be consistent with each other, and desirably improving the display effect of the display panel.

Figure 3:
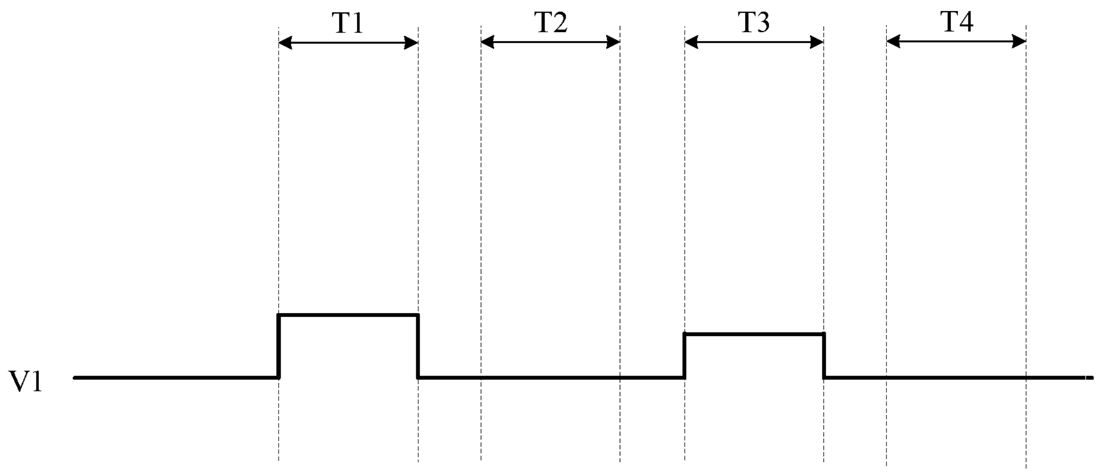
FIG. 3 illustrates a time sequence diagram of a pre-charge circuit pre-charging a data-signal line.

FIG. 3 illustrates a time sequence diagram of the pre-charge circuit pre-charging the data-signal line. As shown in FIGS. 2 and 3, taking the first pixel circuit 120*a* on the side of the second pixel circuit 120*b* away from the pre-charge circuit 110 as an example, in the second stage T2, the data-signal line data may write the first data signal into the first pixel circuit 120*a*. In the first stage T1 before the second stage T2, the pre-charge circuit 110 may provide the pre-charge voltage signal V1 of the first voltage value to the data-signal line data; and the data-signal line data may be charged through the pre-charge voltage signal V1 of the first voltage value. In the fourth stage T4, the data-signal line data may write the second data signal into the second pixel circuit 120*b*. In the third stage T3 before the fourth stage T4, the pre-charge circuit 110 may provide the pre-charge voltage signal V1 of the second voltage value to the data-signal line data; and the data-signal line data may be charged through the pre-charge voltage signal V1 of the second voltage value.

It should be noted that FIG. 3 takes the first voltage value and the second voltage value both being greater than 0V as an example for illustration. In other embodiments, the first voltage value and the second voltage value may also be less than 0V and flexibly adjusted according to actual situation, which may not be limited in embodiments of the present disclosure.

Figure 4:
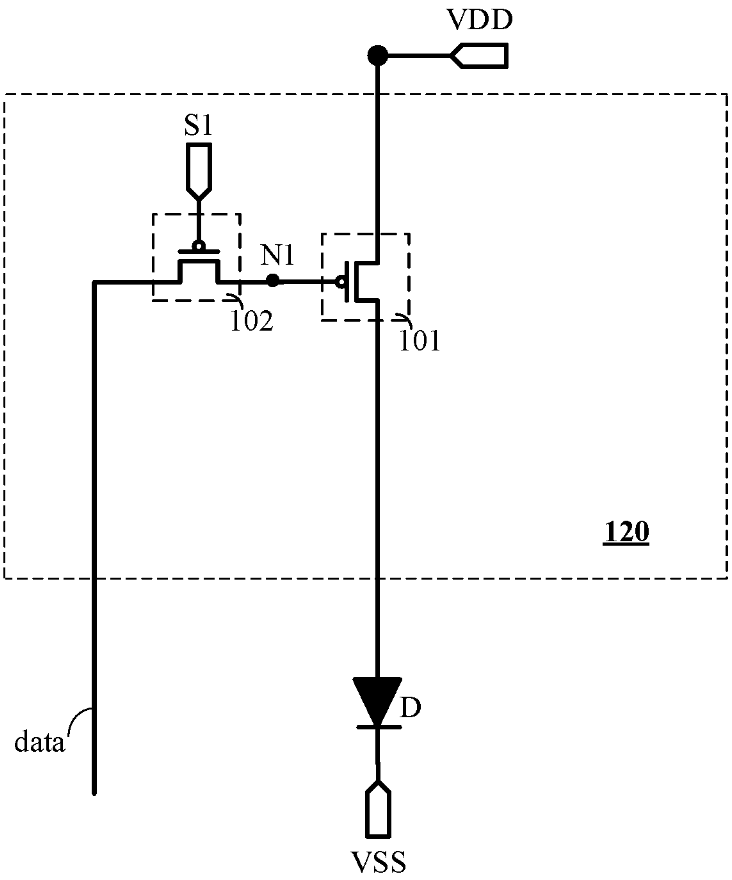
FIG. 4 illustrates a circuit schematic of a pixel circuit in a display panel according to various embodiments of the present disclosure.

FIG. 4 illustrates a circuit schematic of a pixel circuit in the display panel according to various embodiments of the present disclosure. Referring to FIG. 4, according to some embodiments of the present disclosure, optionally, the pixel circuit 120 (e.g., the first pixel circuit 120*a* or the second pixel circuit 120*b* shown in FIG. 2) may include a first driving module 101 configured to drive the light-emitting element D to emit light. In some other embodiments, the pixel circuit 120 may also include a data writing module 102. The control terminal of the data writing module 102 may be electrically connected to the first scan signal line S1. The first terminal of the data writing module 102 may be electrically connected to the data-signal line data. The second terminal of the data writing module 102 may be electrically connected to the first node N1. The data writing module 102 may be configured to transmit the data signal of the data-signal line data to the first node N1. The first driving module 101 may be turned on to be in conduction in response to the conduction level of the first node N1, and the first driving module 101 may provide a driving current to the light-emitting element D to drive the light-emitting element D to emit light.

As shown in FIGS. 2 and 4, in some embodiments, along the first direction Y, the distance d1 between the first pixel circuit 120*a* and the pre-charge circuit 110 may be greater than the distance d2 between the second pixel circuit 120*b* and the pre-charge circuit 110. That is, along the first direction Y, the first pixel circuit 120*a* may be on the side of the second pixel circuit 120*b* away from the pre-charge circuit 110. The load of the first-type data-signal line data_1 of the data-signal line data may be greater than the load of the second-type data-signal line data_2.

The first driving module 101 may include a P-type transistor. The P-type transistor conducts at low level. Therefore, when the first driving module 101 is the P-type transistor, the data signal written by the data-signal line data to the first driving module 101 may be a negative voltage, that is, the voltage value of the data signal may be less than 0V. Correspondingly, when the first driving module 101 is the P-type transistor, the voltage value of the pre-charge voltage signal may also be less than 0V, that is, may be close to the voltage value of the data signal. In such way, when the data-signal line data charges the pixel circuit, the potential of the data-signal line data may, exemplarily, reach desired target potential relatively quickly from the pre-charge potential, thereby shortening the time for the pixel circuit to enter the charging state or improving the charging efficiency of the pixel circuit at the initial stage of charging, thereby reducing the problem of insufficient charging of the pixel circuit.

Therefore, when the first driving module 101 is the P-type transistor, both the first voltage value and the second voltage value may be negative, that is, less than 0V. Optionally, the first voltage value may be less than the second voltage value, and the absolute value of the first voltage value may be larger than the absolute value of the second voltage value. For example, the first voltage value may be −x1 volts, the second voltage value may be −x2 volts, −x1<−x2, and both x1 and x2 may be positive numbers.

In such way, the load of the first-type data-signal line data_1 of the data-signal line data may be greater than the load of the second-type data-signal line data_2 of the data-signal line data, and the voltage drop of the first-type data-signal line data_1 of the data-signal line data may be greater than the voltage drop of the second-type data-signal line data_2 of the data-signal line data. However, since the absolute value of the first voltage value is greater than the absolute value of the second voltage value, the pre-charge potential at the connection point J1 between the first pixel circuit 120*a* and the data-signal line data may be still same as or similar to the pre-charge potential at the connection point J2 between the second pixel circuit 120*b* and the data-signal line data. In such way, when the data-signal line data charges the first pixel circuit 120*a* and the data-signal line data charges the second pixel circuit 120*b*, the potential of the data-signal line data may, exemplarily, reach desired target potential relatively quickly from same or similar pre-charge potential, thereby shortening the time for the pixel circuit to enter the charging state or improving the charging efficiency of the pixel circuit at the initial stage of charging, reducing the problem of low actual brightness of the light-emitting element due to insufficient charging of the pixel circuit, and also being beneficial for making the charging time of pixel circuits at different positions to be consistent with each other and improving the display effect of the display panel.

Figure 5:
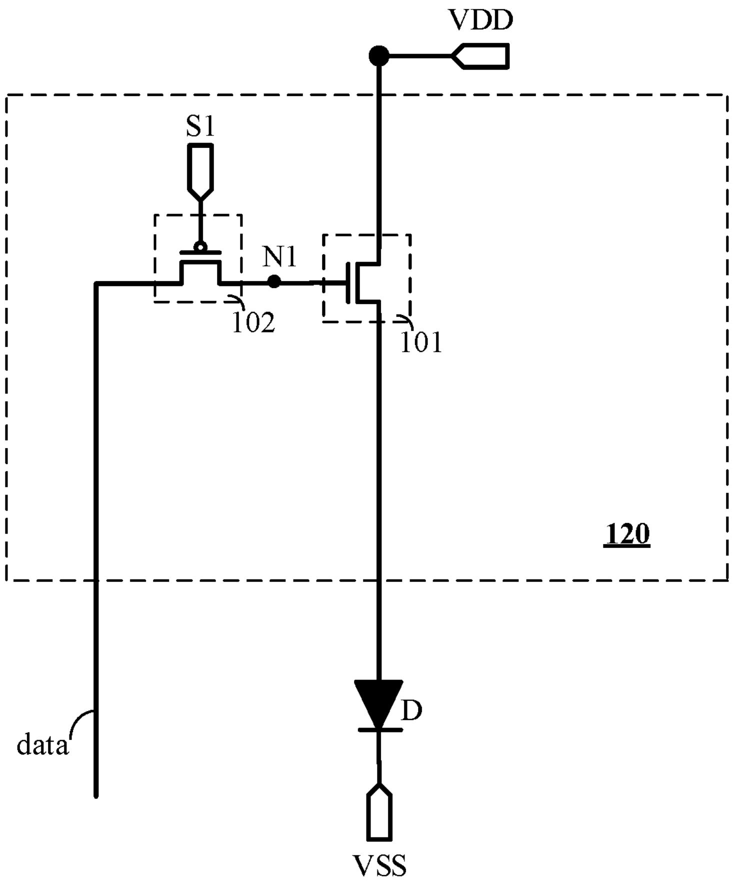
FIG. 5 illustrates another circuit schematic of a pixel circuit in a display panel according to various embodiments of the present disclosure.

FIG. 5 illustrates another circuit schematic of a pixel circuit in the display panel according to various embodiments of the present disclosure. Referring to FIG. 5, different from one embodiment shown in FIG. 4, according to other embodiments of the present disclosure, optionally, the first driving module 101 may include an N-type transistor. The N-type transistor conducts at high level. Therefore, when the first driving module 101 is the N-type transistor, the data signal written by the data-signal line data to the first driving module 101 may be a positive voltage, that is, the voltage value of the data signal may be greater than 0V. Correspondingly, when the first driving module 101 is the N-type transistor, the voltage value of the pre-charge voltage signal may also be greater than 0V, that is, may be close to the voltage value of the data signal. In such way, when the data-signal line data charges the pixel circuit, the potential of the data-signal line data may, exemplarily, reach desired target potential relatively quickly from the pre-charge potential, thereby shortening the time for the pixel circuit to enter the charging state or improving the charging efficiency of the pixel circuit at the initial stage of charging, and reducing the problem of insufficient charging of the pixel circuit.

Therefore, when the first driving module 101 is the N-type transistor, both the first voltage value and the second voltage value may be positive, that is, may be greater than 0V. Optionally, the first voltage value may be greater than the second voltage value, that is, the absolute value of the first voltage value may be also greater than the absolute value of the second voltage value. For example, the first voltage value may be x3 volts, the second voltage value may be x4 volts, x3>x4, and x3 and x4 may be both positive numbers.

In such way, the load of the first-type data-signal line data_1 of the data-signal line data may be greater than the load of the second-type data-signal line data_2, and the voltage drop of the first-type data-signal line data_1 of the data-signal line data may be greater than the voltage drop of the second-type data-signal line data_2. However, since the first voltage value is greater than the second voltage value, the pre-charge potential at the connection point J1 between the first pixel circuit 120*a* and the data-signal line data may be still same as or similar to the pre-charge potential at the connection point J2 between the second pixel circuit 120*b* and the data-signal line data. In such way, when the data-signal line data charges the first pixel circuit 120*a* and the data-signal line data charges the second pixel circuit 120*b*, the potential of the data-signal line data may, exemplarily, reach desired target relatively quickly from same or similar pre-charge potential, thereby shortening the time for the pixel circuit to enter the charging state or improving the charging efficiency of the pixel circuit at the initial stage of charging, and reducing the problem of low actual brightness of the light-emitting element due to insufficient charging of the pixel circuit, and also being beneficial for making the charging time of pixel circuits at different positions to be consistent with each other and desirably improving the display effect of the display panel.

Figure 6:
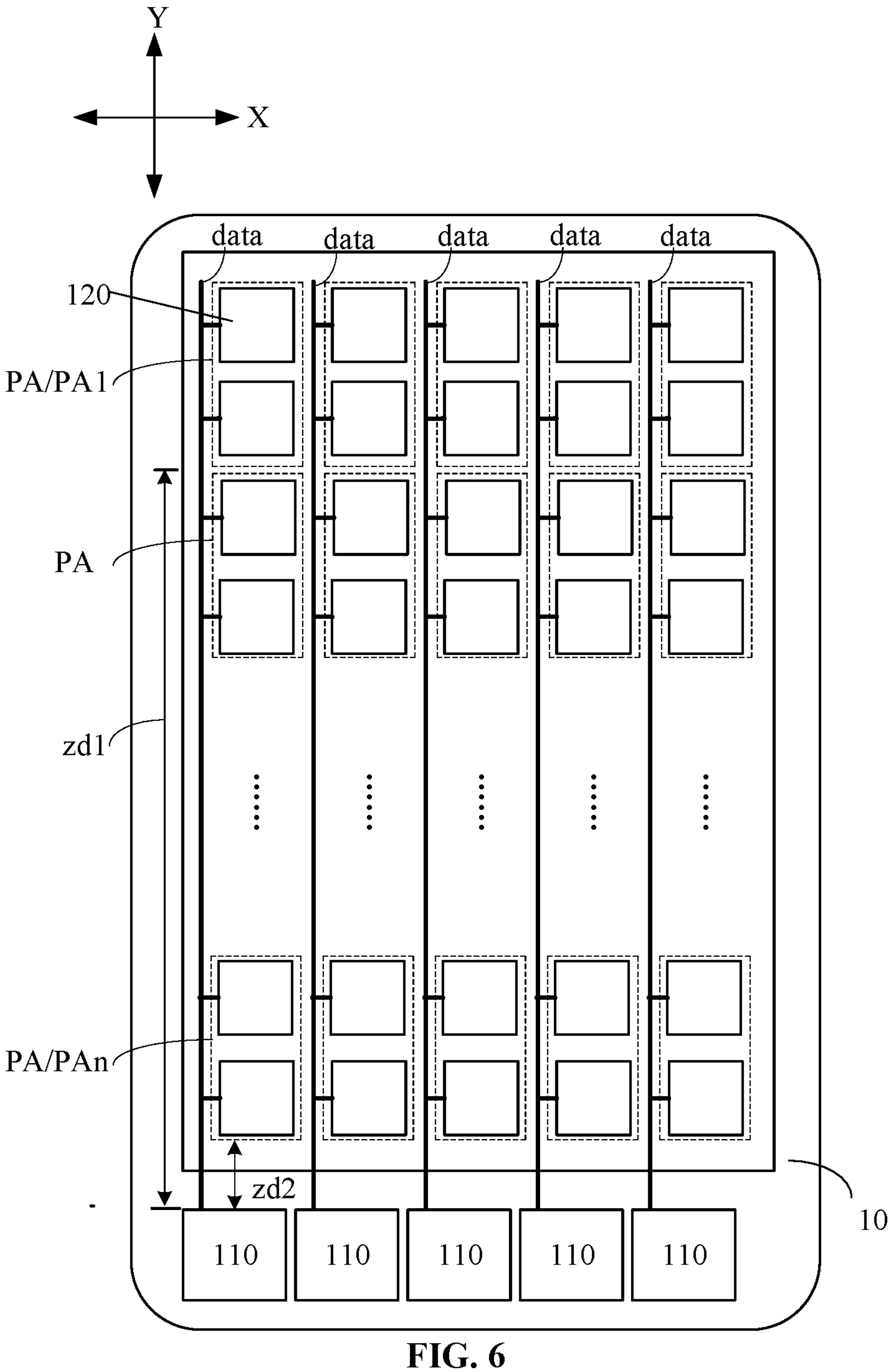
FIG. 6 illustrates another circuit schematic of a display panel according to various embodiments of the present disclosure.

FIG. 6 illustrates another circuit schematic of the display panel according to various embodiments of the present disclosure. Referring to FIG. 6, according to some embodiments of the present disclosure, optionally, the pre-charge circuit 110 may be electrically connected to a plurality of pixel circuits 120 arranged along the first direction Y through the data-signal line data. For example, in some embodiments, the pre-charge circuit 110 may be electrically connected to a column of pixel circuits 120 arranged along the first direction Y through the data-signal line data. The plurality of pixel circuits 120 may be divided into a quantity n of pixel circuit groups PA arranged sequentially along the first direction Y, where n is a positive integer. One pixel circuit group PA may include at least one pixel circuit 120. For convenience of description, the first pixel circuit group PA is represented by PA1, and the n-th pixel circuit group PA is represented by PAn.

Along the first direction Y, the minimum distance zd1 between the first pixel circuit group PA1 and the pre-charge circuit 110 may be greater than the minimum distance zd2 between the n-th pixel circuit group PAn and the pre-charge circuit 110. The minimum distance zd1 may, exemplarily, refer to the distance between the pre-charge circuit 110 and the pixel circuit 120 closest to the pre-charge circuit 110 in the first pixel circuit group PA1 along the first direction Y. Similarly, the minimum distance zd2 may refer to, exemplarily, the distance between the pre-charge circuit 110 and the pixel circuit 120 closest to the pre-charge circuit 110 in the n-th pixel circuit group PAn along the first direction Y. That is, along the first direction Y, the first pixel circuit group PA1 may be on the side of the n-th pixel circuit group PAn away from the pre-charge circuit 110. The load of the data-signal line data corresponding to the first pixel circuit group PA1 may be greater than the load of the data-signal line data corresponding to the n-th pixel circuit group PAn.

Referring to FIGS. 4-6, in some embodiments, the first driving module 101 may include the P-type transistor. When the first driving module 101 is the P-type transistor, the voltage value of the pre-charge voltage signal may be less than 0V, that is, may be close to the voltage value of the data signal. In such way, when the data-signal line data charges the pixel circuit, the potential of the data-signal line data may, exemplarily, reach desired target potential relatively quickly from the pre-charge potential, thereby shortening the time for the pixel circuit to enter the charging state or improving the charging efficiency of the pixel circuit at the initial stage of charging, and reducing the problem of insufficient charging of the pixel circuit.

Correspondingly, the voltage values of the pre-charge voltage signals corresponding to the pixel circuits in the first pixel circuit group PA1 to the n-th pixel circuit group PAn may increase progressively; that is, the absolute values of the voltage values of the pre-charge voltage signals corresponding to the pixel circuits in the first pixel circuit group PA1 to the n-th pixel circuit group PAn may decrease progressively. For example, before the data signal is written into any pixel circuit in the first pixel circuit group PA1, the pre-charge circuit 110 may provide a pre-charge voltage signal with a voltage value of −y1 volts to the data-signal line data; before the data signal is written into any pixel circuit in the second pixel circuit group PA, the pre-charge circuit 110 may provide a pre-charge voltage signal with a voltage value of −y2 volts to the data-signal line data; and similarly, before the data signal is written into any pixel circuit in the n-th pixel circuit group PAn, the pre-charge circuit 110 may provide a pre-charge voltage signal with a voltage value of −yn volts to the data-signal line data, where −y1<−y2<−yn, and y1, y2 and yn are all positive numbers. The absolute value |−y1| of −y1 is greater than the absolute value |−y2| of −y2, and the absolute value |−y2| of −y2 is greater than the absolute value |−yn| of −yn.

In such way, the loads of the data-signal line data corresponding to the first pixel circuit group PA1 to the n-th pixel circuit group PAn may decrease sequentially. However, since the absolute values of the voltage values of the pre-charge voltage signals corresponding to the pixel circuits in the first pixel circuit group PA1 to the n-th pixel circuit group PAn may also decrease, the pre-charge potentials at the connection points between the pixel circuits 120 and the data-signal line data in different pixel circuit groups PA1 may still be same as or similar to each other. In such way, when the data-signal line data charges the pixel circuits 120 in different pixel circuit group PA1, the potential of the data-signal line data may, exemplarily, reach desired target potential relatively quickly from same or similar pre-charge potential, thereby shortening the time for the pixel circuit to enter the charging state or improving the charging efficiency of the pixel circuit at the initial stage of charging, and reducing the problem of low actual brightness of the light-emitting element due to insufficient charging of the pixel circuit, and also being beneficial for making the charging time of pixel circuits at different positions to be consistent with each other and desirably improving the display effect of the display panel.

Referring to FIGS. 5-6, in some embodiments, the first driving module 101 may include the N-type transistor. When the first driving module 101 is the N-type transistor, the voltage value of the pre-charge voltage signal may be greater than 0V, that is, may be close to the voltage value of the data signal. In such way, when the data-signal line data charges the pixel circuit, the potential of the data-signal line data may reach desired target potential relatively quickly from the pre-charge potential, thereby shortening the time for the pixel circuit to enter the charging state or improving the charging efficiency of the pixel circuit at the initial stage of charging, and further reducing the problem of insufficient charging of the pixel circuit.

Correspondingly, when the first driving module 101 is the N-type transistor, the voltage values of the pre-charge voltage signals corresponding to the pixel circuits in the first pixel circuit group PA1 to the n-th pixel circuit group PAn may decrease progressively; that is, absolute values of the voltage values of the pre-charge voltage signals corresponding to the pixel circuits in the first pixel circuit group PA1 to the n-th pixel circuit group PAn may decrease progressively. For example, before the data signal is written into any pixel circuit in the first pixel circuit group PA1, the pre-charge circuit 110 may provide a pre-charge voltage signal with a voltage value of z1 volts to the data-signal line data; before the data signal is written into any pixel circuit in the second pixel circuit group PA, the pre-charge circuit 110 may provide a pre-charge voltage signal with a voltage value of z2 volts to the data-signal line data; similarly, before the data signal is written into any pixel circuit in the n-th pixel circuit group PAn, the pre-charge circuit 110 may provide a pre-charge voltage signal with a voltage value of zn volts to the data-signal line data, where z1>z2>zn, and z1, z2 and zn are all positive numbers.

In such way, the loads of the data-signal lines data corresponding to the first pixel circuit group PA1 to the n-th pixel circuit group PAn may decrease sequentially. However, since the absolute values of the voltage values of the pre-charge voltage signals corresponding to the pixel circuits in the first pixel circuit group PA1 to the n-th pixel circuit group PAn also decrease, the pre-charge potentials at the connection points between the pixel circuits 120 and the data-signal lines data in different pixel circuit groups PA1 may still be same or similar. Therefore, when the data-signal lines data charges the pixel circuits 120 in different pixel circuit groups PA1, the potentials of the data-signal lines data may, exemplarily, reach desired target potential relatively quickly from same or similar pre-charge potential, thereby shortening the time for the pixel circuits enter the charging state or improving the charging efficiency of the pixel circuits at the initial stage of charging, and reducing the problem of low actual brightness of the light-emitting element due to insufficient charging of the pixel circuit, and also being beneficial for making the charging time of pixel circuits at different positions to be consistent with each other and desirably improving the display effect of the display panel.

According to some embodiments of the present disclosure, optionally, the pre-charge circuit 110 may not only pre-charge the data-signal line data, but also provide the data signal with a controllable current value to the pixel circuit 120 through the data-signal line data. For example, the pre-charge circuit 110 may first pre-charge the data-signal line data. After the pre-charging is completed, the pre-charge circuit 110 may provide the data signal with a controllable current value to the pixel circuit 120 through the data-signal line data.

In the existing technology, the data signal transmitted by the data-signal line data may have a controllable voltage value, but an uncontrollable current value. In such way, the voltage drop of the data signal on the data-signal line data may be difficult to control, such that the voltage value of the data signal received by the pixel circuit 120 may deviate from a desired voltage value. Furthermore, the brightness of the light-emitting element driven by the pixel circuit 120 may deviate from desired brightness, and the problem of uneven display brightness of the display panel may easily occur.

In some embodiments of the present disclosure, the pre-charge circuit 110 may provide the data signal with a controllable current value to the pixel circuit 120 through the data-signal line data. In such way, the data-signal line may transmit the data signal with a controllable current value to the pixel circuit, thereby being beneficial for avoiding the data signal being affected by the voltage drop on the data-signal line. Therefore, the voltage value of the data signal received by the pixel circuit may be same as or close to desired voltage value, and furthermore the brightness of the light-emitting element driven by the pixel circuit may reach desired brightness, which may reduce the problem of uneven display brightness of the display panel and improve the display effect of the display panel.

In order to clearly describe the present disclosure, the circuit structure of the pre-charge circuit is exemplarily illustrated hereinafter.

Figure 7:
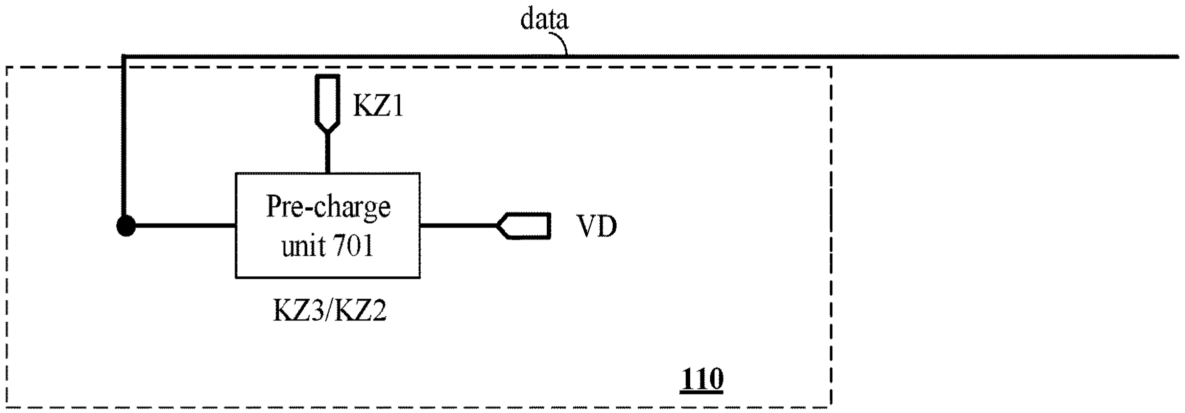
FIG. 7 illustrates a circuit schematic of a pre-charge circuit in a display panel according to various embodiments of the present disclosure.

FIG. 7 illustrates a circuit schematic of a pre-charge circuit in the display panel according to various embodiments of the present disclosure. As shown in FIG. 7, according to some embodiments of the present disclosure, optionally, the pre-charge circuit 110 may include a pre-charge unit 701. The control terminal of the pre-charge unit 701 may be electrically connected to a first control signal line KZ1, the first terminal of the pre-charge unit 701 may be electrically connected to a pre-charge voltage signal terminal VD, and the second terminal of the pre-charge unit 701 may be electrically connected to the data-signal line data. The pre-charge unit 701 may be configured to be turned on in conduction under the control of the first control signal line KZ1 and transmit the pre-charge voltage signal of the pre-charge voltage signal terminal VD to the data-signal line data.

In such way, by pre-charging the data-signal line data through the pre-charge unit 701, exemplarily, the data-signal line data may be configured to be at the pre-charge potential in advance. When the data-signal line data charges the pixel circuit, the potential of the data-signal line data may, exemplarily, reach desired target potential relatively quickly from the pre-charge potential, thereby shortening the time for the pixel circuit to enter the charging state or improving the charging efficiency of the pixel circuit during the initial charging period. When the time for the pixel circuit to enter the charging state is shortened or the charging efficiency at the initial stage of charging is improved, overall charging efficiency of the pixel circuit during the charging process may be improved, and the charging process may be accelerated, which may reduce the problem of low actual brightness of the light-emitting element due to insufficient charging of the pixel circuit and improve the display effect of the display panel.

Figure 8:
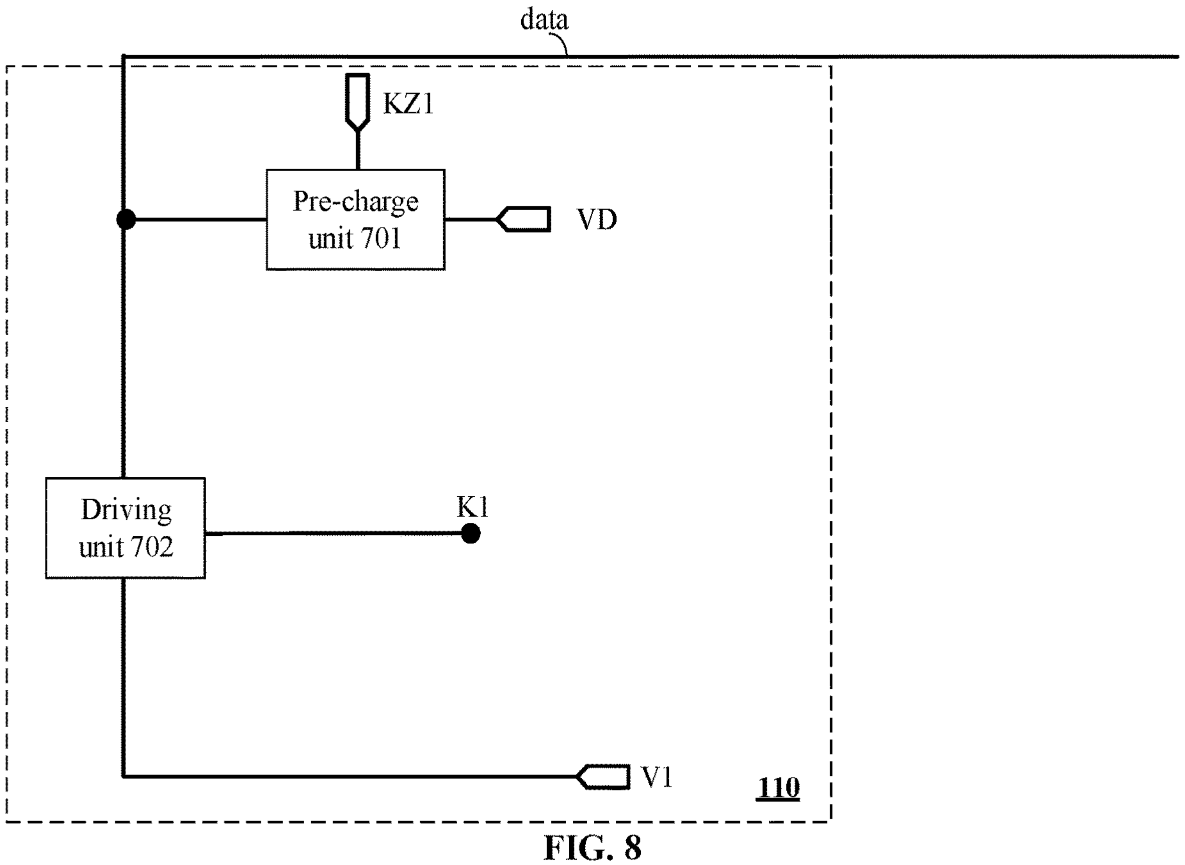
FIG. 8 illustrates another circuit schematic of a pre-charge circuit in a display panel according to various embodiments of the present disclosure.

FIG. 8 illustrates another circuit schematic of a pre-charge circuit in the display panel according to various embodiments of the present disclosure. Referring to FIG. 8, according to some embodiments of the present disclosure, optionally, the pre-charge circuit 110 may also include a driving unit 702. The control terminal of the driving unit 702 may be electrically connected to the first control node K1, the first terminal of the driving unit 702 may be electrically connected to a target voltage signal line V1, and the second terminal of the driving unit 702 may be electrically connected to the data-signal line data. The driving unit 702 may be configured to output an electrical signal under the control of the first control node K1 and driven by the target voltage signal provided by the target voltage signal line V1; and the electrical signal outputted by the driving unit 702 may be transmitted to the data-signal line data. The data signal may include an electrical signal outputted by the driving unit 702. In some embodiments, the voltage value of the target voltage signal transmitted by the target voltage signal line V1 may be greater than 0V. In other embodiments, the voltage value of the target voltage signal transmitted by the target voltage signal line V1 may be less than 0V, which may not be limited in the present disclosure.

The magnitude of the potential of the first control node K1 may affect the magnitude of the current of the electrical signal outputted by the driving unit 702. By adjusting the potential of the first control node K1, the current of the electrical signal outputted by the driving unit 702 may be adjusted.

The pre-charge circuit 110 may include the driving unit 702. The driving unit 702 may be turned on to be in conduction under the control of the first control node K1 at the target potential and output the data signal (e.g., electrical signal) of desired current value. Therefore, the pre-charge circuit 110 may transmit the data signal (e.g., electrical signal) with a controllable current value to the data-signal line data, which may be beneficial for making the voltage drop of the data signal on the data-signal line data to be controllable.

Figure 9:
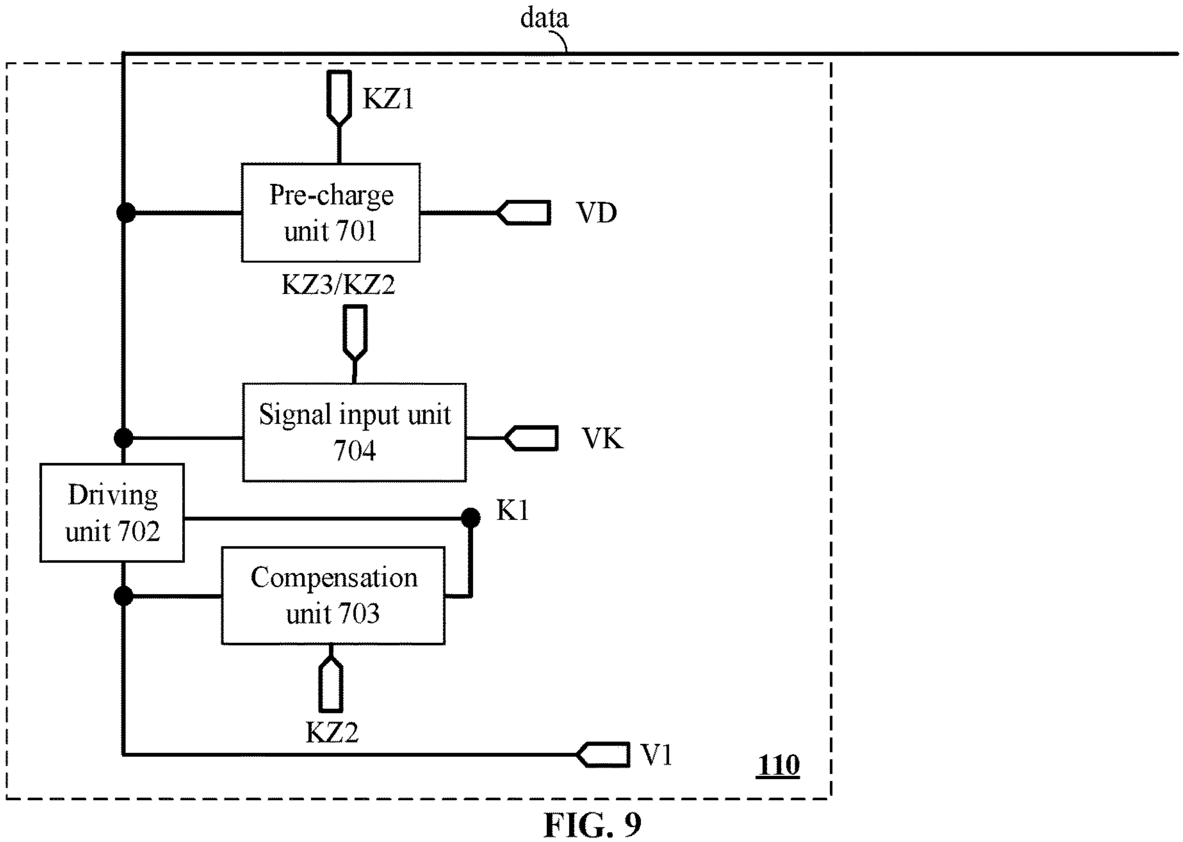
FIG. 9 illustrates another circuit schematic of a pre-charge circuit in a display panel according to various embodiments of the present disclosure.

FIG. 9 illustrates another circuit schematic of a pre-charge circuit in the display panel according to various embodiments of the present disclosure. Referring to FIG. 9, according to some embodiments of the present disclosure, optionally, the pre-charge circuit 110 may also include a compensation unit 703 and a signal input unit 704. The control terminal of the compensation unit 703 may be electrically connected to the second control signal line KZ2, the first terminal of the compensation unit 703 may be electrically connected to the first control node K1, and the second terminal of the compensation unit 703 may be electrically connected to the first terminal of the driving unit 702.

The control terminal of the signal input unit 704 may be electrically connected to a third control signal line KZ3, the first terminal of the signal input unit 704 may be electrically connected to a current control signal terminal VK, and the second terminal of the signal input unit 704 may be electrically connected to the second terminal of the driving unit 702. In a current control signal write stage, the compensation unit 703 may be configured to be in conduction under the control of the second control signal line KZ2, and the signal input unit 704 may be configured to be in conduction under the control of the third control signal line KZ3; the current control signal of the current control signal terminal VK may be transmitted to the first control node K1 sequentially through the signal input unit 704, the driving unit 702 and the compensation unit 703; and the threshold voltage of the driving unit 702 may be compensated.

For example, the control terminal of the driving unit 702 and the first terminal of the driving unit 702 may be connected through the compensation unit 703. When the difference between the potential of the control electrode (the first control node K1) of the driving unit 702 and the potential of the second terminal of the driving unit 702 is Vth1, that is, when the difference between the potential of the first control node K1 and the voltage value of the current control signal is Vth1, the driving unit 702 may be turned off to be in disconnection, and writing of the current control signal may be completed, where Vth1 denotes the threshold voltage of the driving unit 702.

In such way, through the cooperation of the signal input unit 704 and the compensation unit 703, the writing of the current control signal may be realized, but also the threshold voltage of the driving unit 702 may be compensated, which may reduce the influence of the threshold voltage of the driving unit 702 on the current of the data signal (e.g., electrical signal) outputted by the driving unit 702 and improve the accuracy of the current of the data signal outputted by the driving unit 702.

Figure 10:
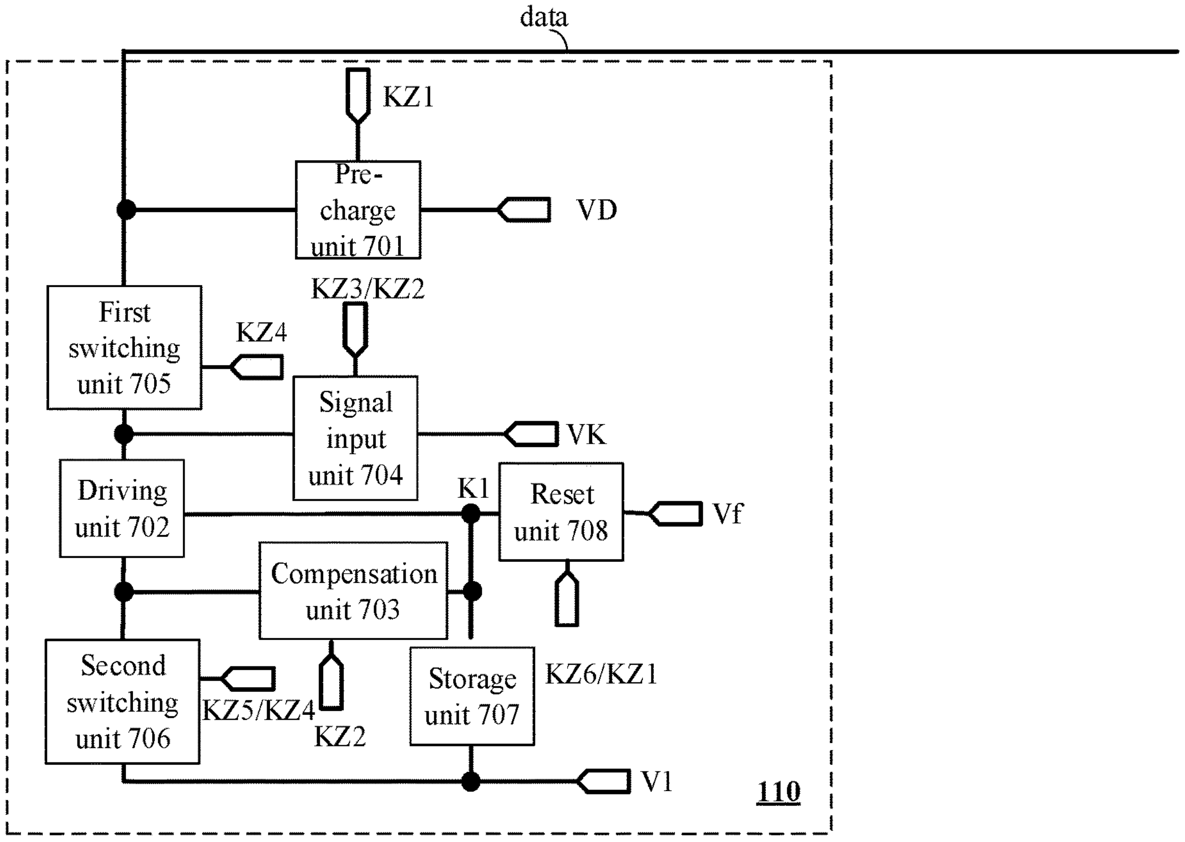
FIG. 10 illustrates another circuit schematic of a pre-charge circuit in a display panel according to various embodiments of the present disclosure.

FIG. 10 illustrates another circuit schematic of a pre-charge circuit in the display panel according to various embodiments of the present disclosure. Referring to FIG. 10, according to some embodiments of the present disclosure, optionally, the pre-charge circuit 110 may also include a first switching unit 705, a second switching unit 706, a storage unit 707 and a reset unit 708. The control terminal of the first switching unit 705 may be electrically connected to a fourth control signal line KZ; the first terminal of the first switching unit 705 may be electrically connected to the second terminal of the driving unit 702 and the second terminal of the signal input unit 704 respectively; and the second terminal of the first switching unit 705 may be electrically connected to the data-signal line data.

In such way, in the current control signal write stage that the current control signal of the current control signal terminal VK is written into the first control node K1, the first switching unit 705 may be turned off to be in disconnection under the control of the fourth control signal line KZA, which may effectively prevent the current control signal of the current control signal terminal VK from being transmitted to the data-signal line data.

The control terminal of the second switching unit 706 may be electrically connected to a fifth control signal line KZ5; the first terminal of the second switching unit 706 may be electrically connected to the first terminal of the driving unit 702 and the second terminal of the compensation unit 703 respectively; and the second terminal of the second switching unit 706 may be electrically connected to the target voltage signal line V1.

In such way, in the current control signal write stage, the second switching unit 706 may be turned off to be in disconnection under the control of the fifth control signal line KZ5, which may effectively prevent the target voltage signal of the target voltage signal line V1 from being written into the first control node K1 through the second switching unit 706, reduce interference to the writing of the current control signal and desirably ensure that the potential of the first control node K1 may reach the target potential.

The first terminal of the storage unit 707 may be electrically connected to the target voltage signal line V1, and the second terminal of the storage unit 707 may be electrically connected to the first control node K1. The storage unit 707 may be configured to maintain the potential of the first control node K1.

In such way, when the driving unit 702 outputs the data signal, the potential of the first control node K1 may be maintained through the storage unit 707, which may make the driving unit 702 continue to output the data signal with a relatively stable current.

The control terminal of the reset unit 708 may be electrically connected to the sixth control signal line KZ6, the first terminal of the reset unit 708 may be electrically connected to a reset signal line Vf, and the second terminal of the reset unit 708 may be electrically connected to the first control node K1. The reset unit 708 may be configured to be turned on in conduction under the control of the sixth control signal line KZ6 and transmit the reset signal of the reset signal line Vf to the first control node K1.

For example, before the current control signal is written into the first control node K1, the reset unit 708 may be turned on to be in conduction under the control of the sixth control signal line KZ6 and transmit the reset signal of the reset signal line Vf to the first control node K1 to reset the first control node K1.

In such way, before the current control signal is written to the first control node K1, by resetting the first control node K1, subsequent current control signal may be ensured to be successfully written to the first control node K1, for example, the potential of the first control node K1 may reach the target potential.

Referring to FIG. 10, in some embodiments, the third control signal line KZ3 may be reused as the second control signal line KZ2. That is, the control terminal of the signal input unit 704 may be electrically connected to the second control signal line KZ2, and the signal input unit 704 may be turned on to be in conduction or turned off to be in disconnection under the control of the second control signal line KZ2. In some embodiments, the fifth control signal line KZ5 may be reused as the fourth control signal line KZ4. That is, the control terminal of the second switching unit 706 may be electrically connected to the fourth control signal line KZ4, and the second switching unit 706 may be turned on to be in conduction or turned off to be in disconnection under the control of the fourth control signal line KZ4. In some embodiments, the sixth control signal line KZ6 may be reused as the first control signal line KZ1. That is, the control terminal of the reset unit 708 may be electrically connected to the first control signal line KZ1, and the reset unit 708 may be turned on to be in conduction or turned off to be in disconnection under the control of the first control signal line KZ1.

Obviously, in other embodiments, the third control signal line KZ3 may not be reused as the second control signal line KZ2, the fifth control signal line KZ5 may not be reused as the fourth control signal line KZ4, and the sixth control signal line KZ6 may not be reused as the first control signal line KZ1, which may not be limited in the present disclosure.

Figure 11:
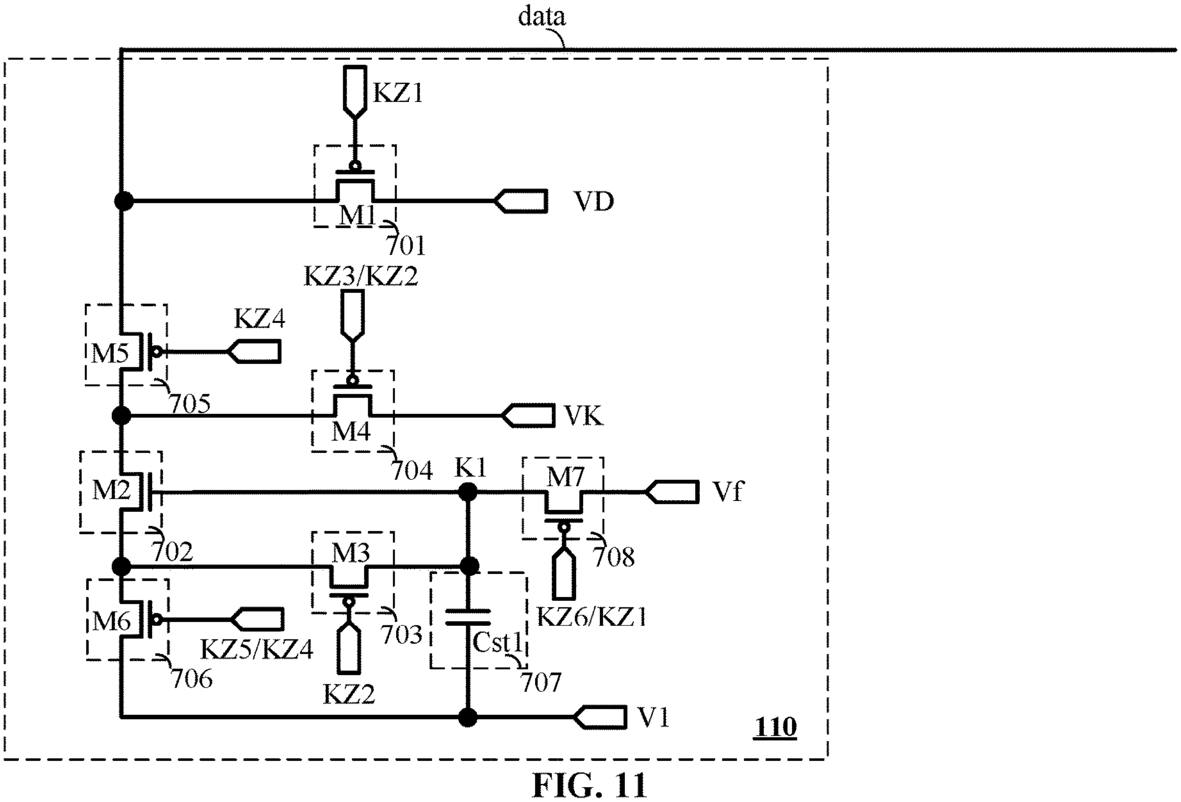
FIG. 11 illustrates another circuit schematic of a pre-charge circuit in a display panel according to various embodiments of the present disclosure.

FIG. 11 illustrates another circuit schematic of a pre-charge circuit in the display panel according to various embodiments of the present disclosure. Referring to FIG. 11, according to some embodiments of the present disclosure, optionally, the pre-charge circuit 110 may include the pre-charge unit 701, the driving unit 702, the compensation unit 703, the signal input unit 704, the first switching unit 705, the second switching unit 706, the storage unit 707, and the reset unit 708. The pre-charge unit 701 may include the first transistor M1, the driving unit 702 may include the second transistor M2, the compensation unit 703 may include the third transistor M3, the signal input unit 704 may include the fourth transistor M4, the first switching unit 705 may include the fifth transistor M5, the second switching unit 706 may include the sixth transistor M6, the storage unit 707 may include the first storage capacitor Cst1, and the reset unit 708 may include the seventh transistor M7. In some embodiments, the third control signal line KZ3 may be reused as the second control signal line KZ2, the fifth control signal line KZ5 may be reused as the fourth control signal line KZ4, and the sixth control signal line KZ6 may be reused as the first control signal line KZ1, which may be beneficial for reducing the quantity of signal lines in the display panel, simplifying the wiring design of the display panel and reducing costs.

The gate electrode of the first transistor M1 may be electrically connected to the first control signal line KZ1, the first electrode of the first transistor M1 may be electrically connected to the pre-charge voltage signal terminal VD, and the second electrode of the first transistor M1 may be electrically connected to the data-signal line data.

The gate electrode of the second transistor M2 may be electrically connected to the first control node K1, the first electrode of the second transistor M2 may be electrically connected to the target voltage signal line V1, and the second electrode of the second transistor M2 may be electrically connected to the data-signal line data.

The gate electrode of the third transistor M3 may be electrically connected to the second control signal line KZ2, the first electrode of the third transistor M3 may be electrically connected to the first control node K1, and the second electrode of the third transistor M3 may be electrically connected to the first electrode of the second transistor M2.

The gate electrode of the fourth transistor M4 may be electrically connected to the third control signal line KZ3, the first electrode of the fourth transistor M4 may be electrically connected to the current control signal terminal VK, and the second electrode of the fourth transistor M4 may be electrically connected to the second electrode of the second transistor M2.

The gate electrode of the fifth transistor M5 may be electrically connected to the fourth control signal line KZA; the first electrode of the fifth transistor M5 may be electrically connected to the second electrode of the second transistor M2 and the second electrode of the fourth transistor M4 respectively; and the second electrode of the fifth transistor M5 may be electrically connected to the data-signal line data.

The gate electrode of the sixth transistor M6 may be electrically connected to the fifth control signal line KZ5; the first electrode of the sixth transistor M6 may be electrically connected to the first electrode of the second transistor M2 and the second electrode of the third transistor M3 respectively; and the second electrode of the sixth transistor M6 may be electrically connected to the target voltage signal line V1.

The first plate of the first storage capacitor Cst1 may be electrically connected to the target voltage signal line V1, and the second plate of the first storage capacitor Cst1 may be electrically connected to the first control node K1.

The gate electrode of the seventh transistor M7 may be electrically connected to the sixth control signal line KZ6, the first electrode of the seventh transistor M7 may be electrically connected to the reset signal line Vf, and the second electrode of the seventh transistor M7 may be electrically connected to the first control node K1.

Figure 12:
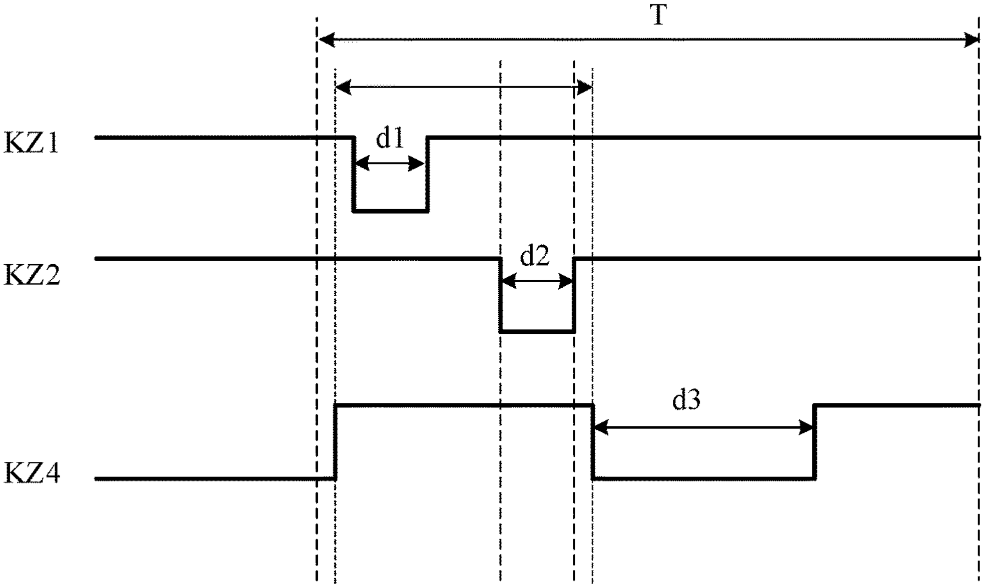
FIG. 12 illustrates a driving time sequence diagram of a pre-charge circuit in a display panel according to various embodiments of the present disclosure.

FIG. 12 illustrates a driving time sequence diagram of a pre-charge circuit in the display panel according to various embodiments of the present disclosure. Referring to FIGS. 11-12, according to some embodiments of the present disclosure, optionally, the pre-charge circuit 110 may include, within a period T for providing the data signal to a pixel circuit, a first reset state d1, a current control signal write stage d2 and a first data writing stage d3. It should be noted that, referring to FIGS. 11-12, the time sequence in FIG. 12 is that the third control signal line KZ3 may be reused as the second control signal line KZ2, the fifth control signal line KZ5 may be reused as the fourth control signal line KZ4, and the sixth control signal line KZ6 may be reused as the first control signal line KZ1, which is taken as an example for illustration. However, in other embodiments, the third control signal line KZ3 may not need to be reused as the second control signal line KZ2, the fifth control signal line KZ5 may not need to be reused as the fourth control signal line KZA, and the sixth control signal line KZ6 may not need to be reused as the first control signal line KZ1, which may not be limited in the present disclosure.

In the first reset stage d1, the first transistor M1 may be turned on to be in conduction under the control of the first control signal line KZ1, and the pre-charge voltage signal of the pre-charge voltage signal terminal VD may be transmitted to the data-signal line data to pre-charge the data-signal line data. In the first reset stage d1, the seventh transistor M7 may be turned on to be in conduction under the control of the first control signal line KZ1 (or the sixth control signal line KZ6), and the reset signal on the reset signal line Vf may be transmitted to the first control node K1 to reset the first control node K1.

In the current control signal write stage d2, the third transistor M3 and the fourth transistor M4 may be turned on to be in conduction under the control of the second control signal line KZ2, and the current control signal of the current control signal terminal VK may be written into the first control node K1 sequentially through the third transistor M3, the second transistor M2, and the fourth transistor M4, such that the first control node K1 may reach the target potential.

In the first data writing stage d3, the second transistor M2 may be turned on to be in conduction under the control of the first control node K1 at the target potential, the fifth transistor M5 and the sixth transistor M6 may be turned on to be in conduction under the control of the fourth control signal line KZ4 (or the fifth control signal line KZ5), and the second transistor M2 may output the electrical signal driven by the target voltage signal provided by the target voltage signal line V1. The data signal may include the electrical signal outputted by the second transistor M2. The electrical signal (i.e., data signal) outputted by the second transistor M2 may be transmitted to the data-signal line data through the fifth transistor M5.

Figure 13:
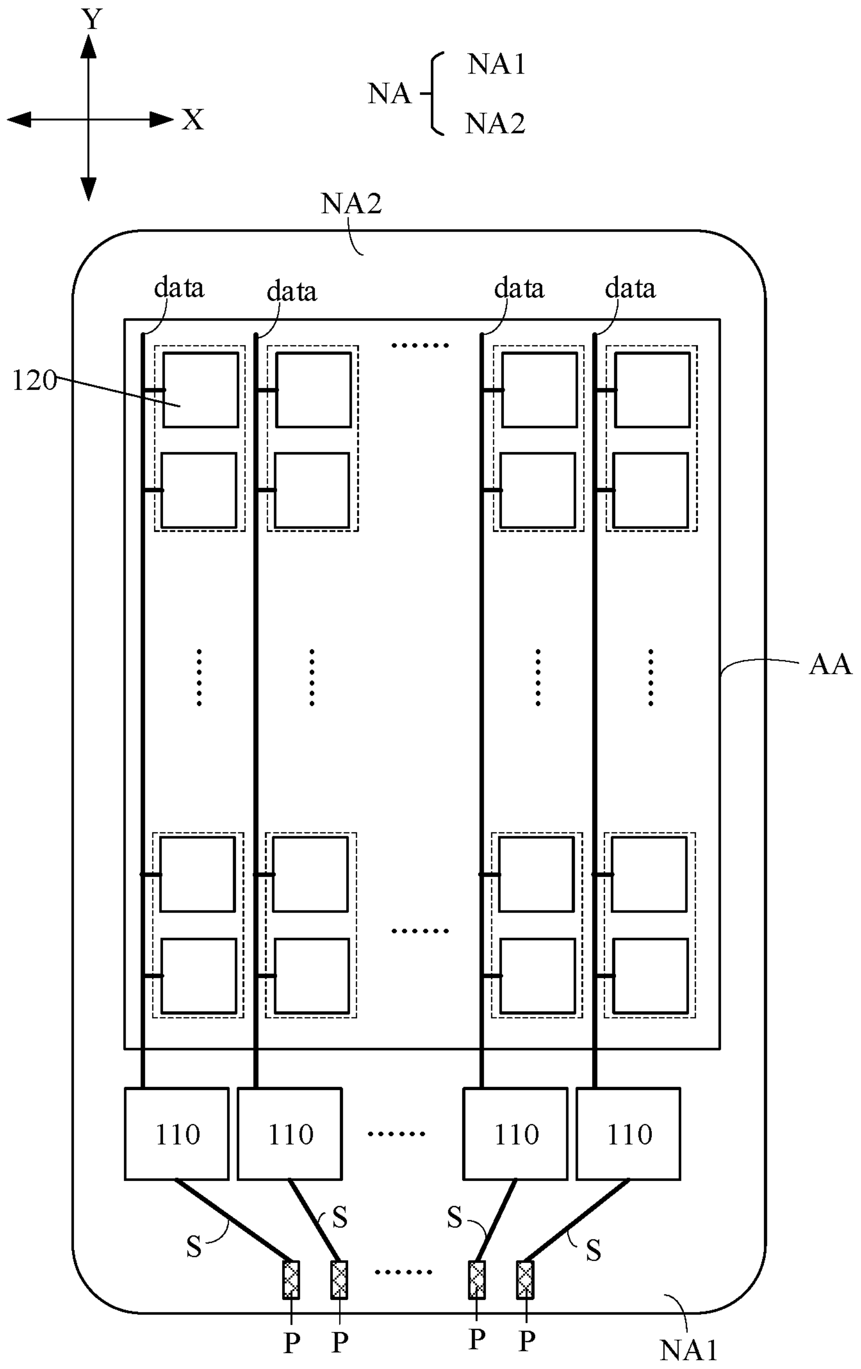
FIG. 13 illustrates another circuit schematic of a display panel according to various embodiments of the present disclosure.

FIG. 13 illustrates another circuit schematic of the display panel according to various embodiments of the present disclosure. Referring to FIG. 13, according to some embodiments of the present disclosure, optionally, the display panel 10 may include a plurality of fan-out lines S and a plurality of pre-charge circuits 110. In some embodiments, the display panel 10 may include the display region AA and the non-display region NA. The non-display region NA may include the first non-display region NA1 and the second non-display region NA2. Along the first direction Y, the first non-display region NA1, the display region AA and the second non-display region NA2 may be arranged sequentially. The first non-display region NA1 may be disposed with a plurality of current control signal pads P, and the plurality of fan-out lines S may be in the first non-display region NA1. The plurality of fan-out lines S may be electrically connected to the plurality of current control signal pads P in one-to-one correspondence. As shown in FIGS. 10 and 13, the fan-out line S may be electrically connected to the first terminal (the current control signal terminal VK) of the signal input unit 704 of at least one pre-charge circuit 110. The fan-out line S may be electrically connected to the first terminal of the signal input unit 704 of the pre-charge circuit 110, which is taken as an example in FIG. 13. The fan-out line S may be configured to provide the current control signal to the first terminal of the signal input unit 704.

For example, the current control signal pad P may be bound and connected to a driver chip (not shown in drawings) or a flexible circuit board (not shown in drawings); and the current control signal pad P may be configured to receive the current control signal from the driver chip. The current control signal pad P may provide the current control signal to the first terminal of the signal input unit 704 of the pre-charge circuit 110 through the fan-out line S.

Figure 14:
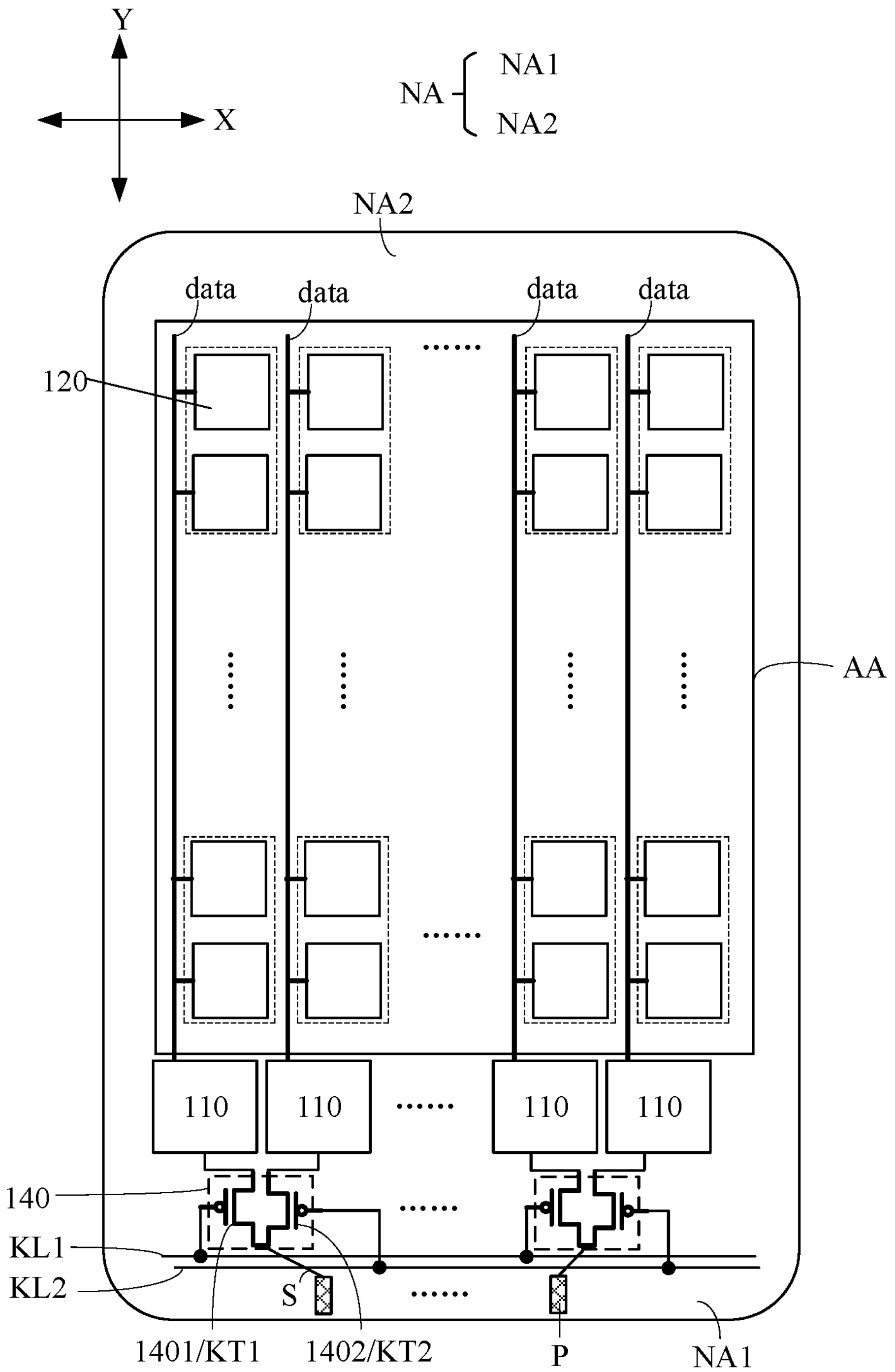
FIG. 14 illustrates another circuit schematic of a display panel according to various embodiments of the present disclosure.

FIG. 14 illustrates another circuit schematic of the display panel according to various embodiments of the present disclosure. Referring to FIG. 14, different from one embodiment shown in FIG. 13, according to other embodiments of the present disclosure, optionally, the display panel 10 may also include a first demultiplexer circuit 140. As shown in FIGS. 10 and 14, the fan-out line S may be electrically connected to the first terminals (the current control signal terminal VK) of the signal input units 704 of at least two pre-charge circuits 110 through the first demultiplexer circuit 140. One fan-out line S may sequentially write the current control signal to the first terminals of the signal input units 704 of at least two pre-charge circuits 110 through the first demultiplexer circuit 140. The first demultiplexer circuit 140 may include at least two channels (or branches). At least two channels in the first demultiplexer circuit 140 may be turned on to be in conduction in a time-sharing manner, such that one fan-out line S may write the current control signal to the first terminals of the signal input units 704 of at least two pre-charge circuits 110 through the first demultiplexer circuit 140 in a time-sharing manner.

In such way, by disposing the first demultiplexer circuit 140, one fan-out line S may be electrically connected to the first terminals of the signal input units 704 of at least two pre-charge circuits 110 through the first demultiplexer circuit 140, thereby ensuring that at least two pre-charge circuits 110 may write the current control signals while reducing the fan-out lines S and the quantity of current control signal pads P, and being beneficial for wiring design of the first non-display region NA1.

It should be noted that FIG. 14 shows an example that one first demultiplexer circuit 140 is electrically connected to two pre-charge circuits 110. In other embodiments, one first demultiplexer circuit 140 may also be electrically connected to more than two pre-charge circuits 110. That is, one fan-out line S may sequentially write the current control signal to the first terminals of the signal input units 704 of two or more pre-charge circuits 110 through the first demultiplexer circuit 140.

Referring to FIGS. 10 and 14, according to other embodiments of the present disclosure, optionally, the first demultiplexer circuit 140 may at least include the first switching element 1401 and the second switching element 1402. The first terminal of the first switching element 1401 and the first terminal of the second switching element 1402 in a same first demultiplexer circuit 140 may both be electrically connected to a same fan-out line S; and the second terminal of the first switching element 1401 and the second terminal of the second switching element 1402 may be electrically connected to the first terminals of the signal input units 704 of different pre-charge circuits 110 respectively. The first switching element 1401 and the second switching element 1402 may be turned on to be in conduction in a time-sharing manner. For example, when the first switching element 1401 is turned on to be in conduction, the second switching element 1402 may be turned off to be in disconnection. When the second switching element 1402 is turned on to be in conduction, the first switching element 1401 may be turned off to be in disconnection.

It should be noted that FIG. 14 shows an example that one first demultiplexer circuit 140 includes two switching elements (i.e., the first switching element 1401 and the second switching element 1402). In other embodiments, one first demultiplexer circuit 140 may include more than two switching elements. More than two switching elements in the first demultiplexer circuit 140 may be turned on to be in conduction in a time-sharing manner.

In such way, the first switching element 1401 and the second switching element 1402 may be connected to different pre-charge circuits 110; and the first switching element 1401 and the second switching element 1402 may be turned on to be in conduction in a time-sharing manner. Therefore, current control signals with different voltage values may be written to different pre-charge circuits 110 through one fan-out line S, which may be beneficial for providing data signals with different current values to different pixel circuits and also providing display flexibility.

It should be noted that one fan-out line S may also write current control signals with a same voltage value to different pre-charge circuits 110, which may be flexibly adjusted according to actual situation and may not be limited in embodiments of the present disclosure.

Referring to FIGS. 10 and 14, in some embodiments, optionally, the first switching element 1401 may include the first switching transistor KT1, and the second switching element 1402 may include the second switching transistor KT2. The gate terminal of the first switching transistor KT1 may be electrically connected to the first switching control signal line KL1, and the gate terminal of the second switching element 1402 may be electrically connected to the second switching control signal line KL2. In a same first demultiplexer circuit 140, the first terminal of the first switching transistor KT1 and the first terminal of the second switching element 1402 may both be electrically connected to a same fan-out line S; and the second terminal of the first switching transistor KT1 and the second terminal of the second switching transistor KT2 may be electrically connected to the first terminals of the signal input units 704 of different pre-charge circuits 110 respectively.

The first switching transistor KT1 may be turned on to be in conduction under the control of the first switching control signal line KL1, and the second switching transistor KT2 may be turned on to be in conduction under the control of the second switching control signal line KL2. When the first switching control signal line KL1 controls the first switching transistor KT1 to turn on to be in conduction, the second switching control signal line KL2 may control the second switching transistor KT2 to turn off to be in disconnection. When the second switching control signal line KL2 controls the second switching transistor KT2 to turn on to be in conduction, the first switching control signal line KL1 may control the first switching transistor KT1 to turn off to be disconnection. In such way, the first switching transistor KT1 and the second switching transistor KT2 may be turned on to be in conduction in a time-sharing manner.

In some embodiments, the gate electrodes of the first switching transistors KT1 in the plurality of first demultiplexer circuits 140 may be electrically connected to a same first switching control signal line KL1, and the gate electrodes of the second switching transistors KT2 in the plurality of first demultiplexer circuits 140 may be electrically connected to a same second switching control signal line KL2, which may reduce the quantity of the first switching control signal lines KL1 and the second switching control signal lines KL2 to simplify the wiring design.

Figure 15:
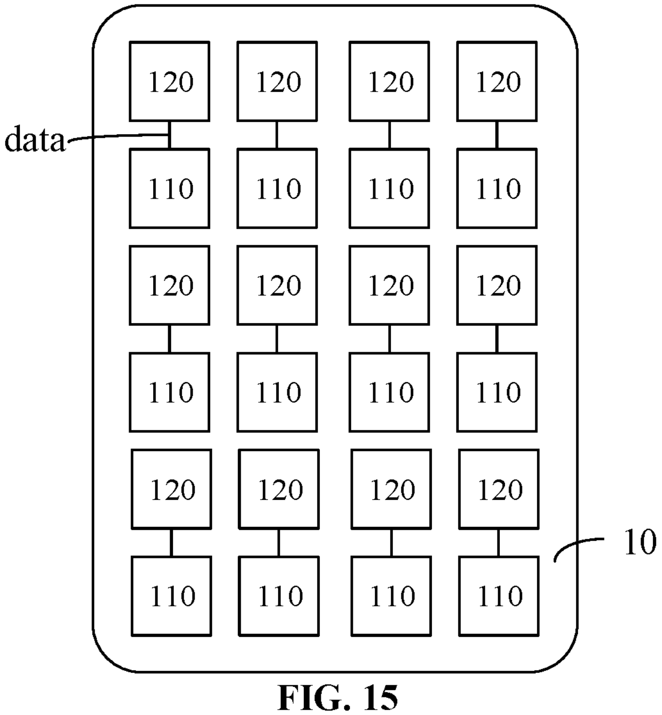
FIG. 15 illustrates another circuit schematic of a display panel according to various embodiments of the present disclosure.

FIG. 15 illustrates another circuit schematic of the display panel according to various embodiments of the present disclosure. Referring to FIG. 15, according to some embodiments of the present disclosure, optionally, the display panel 10 may include the plurality of pixel circuits 120 and the plurality of pre-charge circuits 110, and one pre-charge circuit 110 may be electrically connected to one pixel circuit 120 through the data-signal line data. One pre-charge circuit 110 may be configured to provide the pre-charge voltage signal to the data-signal line data connected to one pixel circuit 120 and provide the data signal to one pixel circuit 120.

Figure 16:
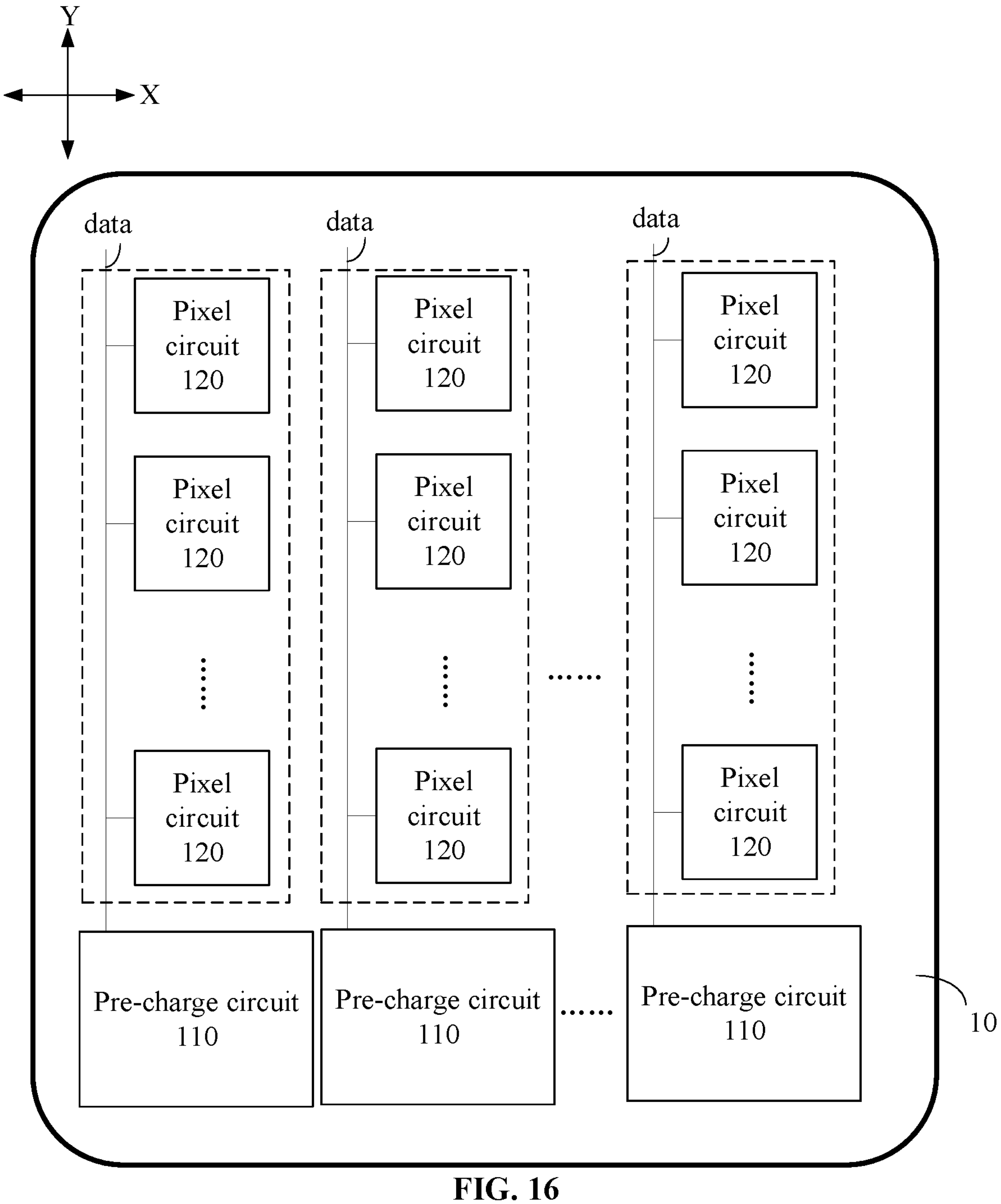
FIG. 16 illustrates another circuit schematic of a display panel according to various embodiments of the present disclosure.

FIG. 16 illustrates another circuit schematic of the display panel according to various embodiments of the present disclosure. Referring to FIG. 16, different from one embodiment shown in FIG. 15, according to other embodiments of the present disclosure, optionally, the display panel 10 may include a plurality of data-signal lines data extending along the first direction Y and arranged at intervals along the second direction X. The first direction Y may intersect the second direction X. Exemplarily, FIG. 16 shows an example that the first direction Y may be the column direction of the display panel and the second direction X may be the row direction of the display panel. In other embodiments, exemplarily, the first direction Y may also be the row direction of the display panel, and the second direction X may be the column direction of the display panel, which may not be limited in the present disclosure.

The display panel 10 may include the plurality of pre-charge circuits 110, and one pre-charge circuit 110 may be electrically connected to at least two pixel circuits 120 arranged along the first direction Y through one data-signal line data. One pre-charge circuit 110 may be configured to provide the pre-charge voltage signal to one data-signal line data, and provide data signals to at least two pixel circuits 120 arranged along the first direction Y. For example, when the first direction Y is the column direction of the display panel, one pre-charge circuit 110 may be electrically connected to the plurality of pixel circuits 120 in one column of pixel circuits 120 through one data-signal line data. One pre-charge circuit 110 may be configured to provide data signals to the plurality of pixel circuits 120 in one column of pixel circuits 120.

In such way, one pre-charge circuit 110 may be electrically connected to at least two pixel circuits 120 arranged along the first direction Y through one data-signal line data, and one pre-charge circuit 110 may be configured to provide data signals to at least two pixel circuits 120 arranged along the first direction Y, which may reduce the quantity of pre-charge circuits 110, thereby being beneficial for simplifying the wiring design of the display panel and reducing costs.

According to other embodiments of the present disclosure, optionally, one pre-charge circuit 110 may be configured to sequentially provide data signals to the plurality of pixel circuits 120 arranged along the first direction Y in a time-sharing manner according to the arrangement order of the plurality of pixel circuits 120 arranged along the first direction Y. For example, taking any column of pixel circuits 120 as an example, one column of pixel circuits 120 may include a number n of pixel circuits 120 spaced apart along the first direction Y, where n is an integer greater than 1. The pre-charge circuit 110 may sequentially provide data signals to the first pixel circuits 120 to the n-th pixel circuit 120 in one column of pixel circuits 120. For example, the pre-charge circuit 110 may first provide the data signal to the first pixel circuit 120 in one column of pixel circuits 120, and the pre-charge circuit 110 may then provide the data signal to the second pixel circuit 120 in one column of pixel circuits 120, and so on, until the pre-charge circuit 110 provides the data signal to the n-th pixel circuit 120 in one column of pixel circuits 120.

In such way, the pre-charge circuit 110 may sequentially provide data signals to the plurality of pixel circuits 120 arranged along the first direction Y in a time-sharing manner according to the arrangement order of the plurality of pixel circuits 120 arranged along the first direction Y. Therefore, different pixel circuits 120 arranged along the first direction Y may receive different or same data signals, which may be beneficial for supporting the display panel to display complex images.

Figure 17:
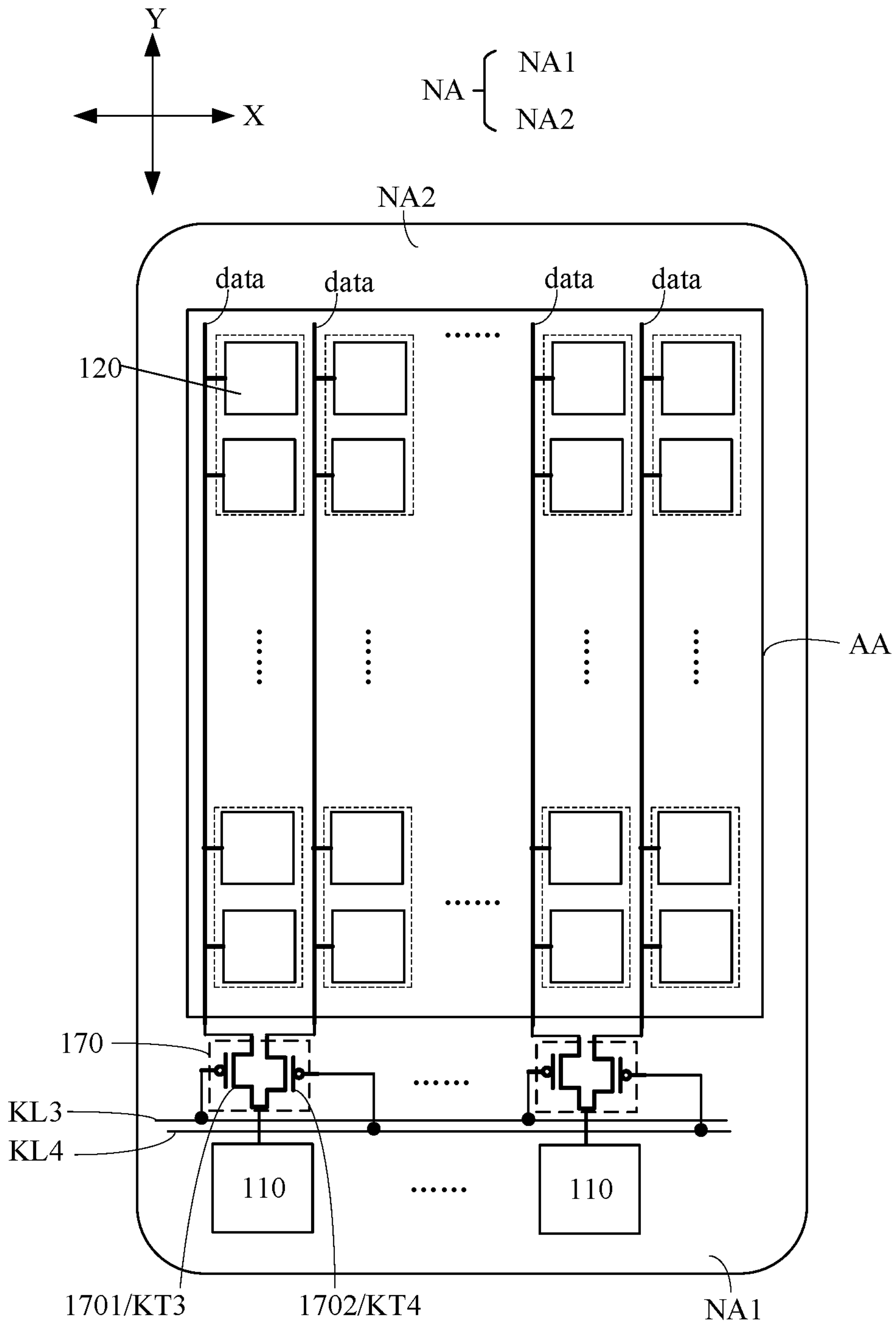
FIG. 17 illustrates another circuit schematic of a display panel according to various embodiments of the present disclosure.

FIG. 17 illustrates another circuit schematic of the display panel according to various embodiments of the present disclosure. Referring to FIG. 17, different from the embodiment shown in FIG. 16, according to some embodiments of the present disclosure, optionally, the display panel 10 may also include the second demultiplexer circuit 170. One pre-charge circuit 110 may be electrically connected to the plurality of data-signal lines data through the second demultiplexer circuit 170; and one data-signal line data may be electrically connected to at least two pixel circuits 120 arranged along the first direction Y. For example, when the first direction Y is the column direction of the display panel, one data-signal line data may be electrically connected to the plurality of pixel circuits 120 in one column of pixel circuits 120. That is, one pre-charge circuit 110 may correspond to the plurality of columns of pixel circuits 120.

The pre-charge circuit 110 may provide the pre-charge voltage signals and/or data signals to the plurality of data-signal lines data in a time-sharing manner through the second demultiplexer 170. Or the pre-charge circuit 110 may provide the pre-charge voltage signals and/or data signals to a part of the data-signal lines data in the plurality of data-signal lines data through the second demultiplexer 170.

The second demultiplexer circuit 170 may include a plurality of channels (or branches). In some embodiments, the plurality of channels in the second demultiplexer circuit 170 may be turned on to be in conduction in a time-shared manner, such that one pre-charge circuit 110 may provide the pre-charge voltage signals and/or data signals to the plurality of data-signal lines data in a time-sharing manner through the second demultiplexer 170. In other embodiments, some of the plurality of channels in the second demultiplexer circuit 170 may be turned on to be in conduction and others of the plurality of channels may be turned off to be in disconnection, such that one pre-charge circuit 110 may provide the pre-charge voltage signals and/or data signals to a part of the data-signal lines data in the plurality of data-signal lines data through the second demultiplexer 170.

In such way, by disposing the second demultiplexer circuit 170, one pre-charge circuit 110 may be electrically connected to the plurality of data-signal lines data through the second demultiplexer circuit 170, which may further reduce the quantity of pre-charge circuits 110 in the display panel, thereby being beneficial for simplifying the wiring design of the display panel and reducing costs.

Referring to FIG. 17, according to other embodiments of the present disclosure, optionally, the second demultiplexer circuit 170 may at least include the third switching element 1701 and the fourth switching element 1702. In a same second demultiplexer circuit 170, the first terminal of the third switching element 1701 and the first terminal of the fourth switching element 1702 may both be electrically connected to a same pre-charge circuit 110; and the second terminal of the third switching element 1701 and the second terminal of the fourth switching element 1702 may be electrically connected to different data-signal lines data respectively.

In some embodiments, the third switching element 1701 and the fourth switching element 1702 may be turned on to be in conduction in a time-sharing manner. The pre-charge circuit 110 may first provide pre-charge voltage signals to the plurality of data-signal lines data, and then provide data signals to the plurality of data-signal lines data. For example, in the stage that the pre-charge circuit 110 provides the pre-charge voltage signal, when the third switching element 1701 is turned on to be in conduction, the pre-charge circuit 110 may provide the pre-charge voltage signal to the data-signal line data connected to the third switching element 1701, and the fourth switching element 1702 may be turned off to be in disconnection. In the stage that the pre-charge circuit 110 provides the pre-charge voltage signal, when the fourth switching element 1702 is turned on to be in conduction, the pre-charge circuit 110 may provide the pre-charge voltage signal to the data-signal line data connected to the fourth switching element 1702, and the third switching element 1701 may be turned off to be in disconnection.

Similarly, in the stage that the pre-charge circuit 110 provides the data signal, when the third switching element 1701 is turned on to be in conduction, the pre-charge circuit 110 may provide the data signal to the data-signal line data connected to the third switching element 1701, and the fourth switching element 1702 may be turned off to be in disconnection. In the stage that the pre-charge circuit 110 provides the data signal, when the fourth switching element 1702 is turned on to be in conduction, the pre-charge circuit 110 may provide the data signal to the data-signal line data connected to the fourth switching element 1702, and the third switching element 1701 may be turned off to be in disconnection.

In such way, the third switching element 1701 and the fourth switching element 1702 may be connected to different data-signal lines data; and the third switching element 1701 and the fourth switching element 1702 may be turned on to be in conduction in a time-sharing manner. Therefore, different pre-charge voltage signals and/or data signals may be written into different data-signal lines data through one pre-charge circuit 110, which may be beneficial for providing different pre-charge voltage signals and/or data signals to different pixel circuits and also providing display flexibility.

It should be noted that FIG. 17 shows an example that one second demultiplexer circuit 170 includes two switching elements (i.e., the third switching element 1701 and the fourth switching element 1702). In other embodiments, one second demultiplexer circuit 170 may include more than two switching elements. When the second demultiplexer circuit 170 includes the plurality of switching elements, only some of the switching elements may be turned on to be in conduction and others of the switching elements may be turned off to be in disconnection. That is, one pre-charge circuit 110 may provide the pre-charge voltage signals and/or data signals to a part of the data-signal lines data in the plurality of data-signal lines data through the second demultiplexer 170.

Referring to FIG. 17, in some embodiments, optionally, the third switching element 1701 may include the third switching transistor KT3, and the fourth switching element 1702 may include the fourth switching transistor KT4. The gate electrode of the third switching transistor KT3 may be electrically connected to the third switching control signal line KL3, and the gate electrode of the fourth switching element 1702 may be electrically connected to the fourth switching control signal line KL4. In a same second demultiplexer circuit 170, the first terminal of the third switching transistor KT3 and the first terminal of the fourth switching element 1702 may both be electrically connected to a same pre-charge circuit 110; and the second terminal of the third switching transistor KT3 and the second terminal of the fourth switching transistor KT4 may be electrically connected to different data-signal lines data respectively.

The third switching transistor KT3 may be turned on to be in conduction under the control of the third switching control signal line KL3, and the fourth switching transistor KT4 may be turned on to be in conduction under the control of the fourth switching control signal line KL4.

In some embodiments, when the third switching control signal line KL3 controls the third switching transistor KT3 to turn on to be in conduction, the fourth switching control signal line KL4 may control the fourth switching transistor KT4 to turn off to be in disconnection. When the fourth switching control signal line KL4 controls the fourth switching transistor KT4 to turn on to be in conduction, the third switching control signal line KL3 may control the third switching transistor KT3 to turn off to be in disconnection. In such way, it realizes that the third switching transistor KT3 and the fourth switching transistor KT4 may be turned on to be in conduction in a time-sharing manner.

In some embodiments, the gate electrodes of the third switching transistors KT3 in the plurality of second demultiplexer circuits 170 may be electrically connected to a same third switching control signal line KL3, and the gate electrodes of the fourth switching transistors KT4 in the plurality of second demultiplexer circuits 170 may be electrically connected to a same fourth switching control signal line KL4, which may reduce the quantity of the third switching control signal lines KL3 and the fourth switching control signal lines KL4 and simplify the wiring design.

Figure 18:
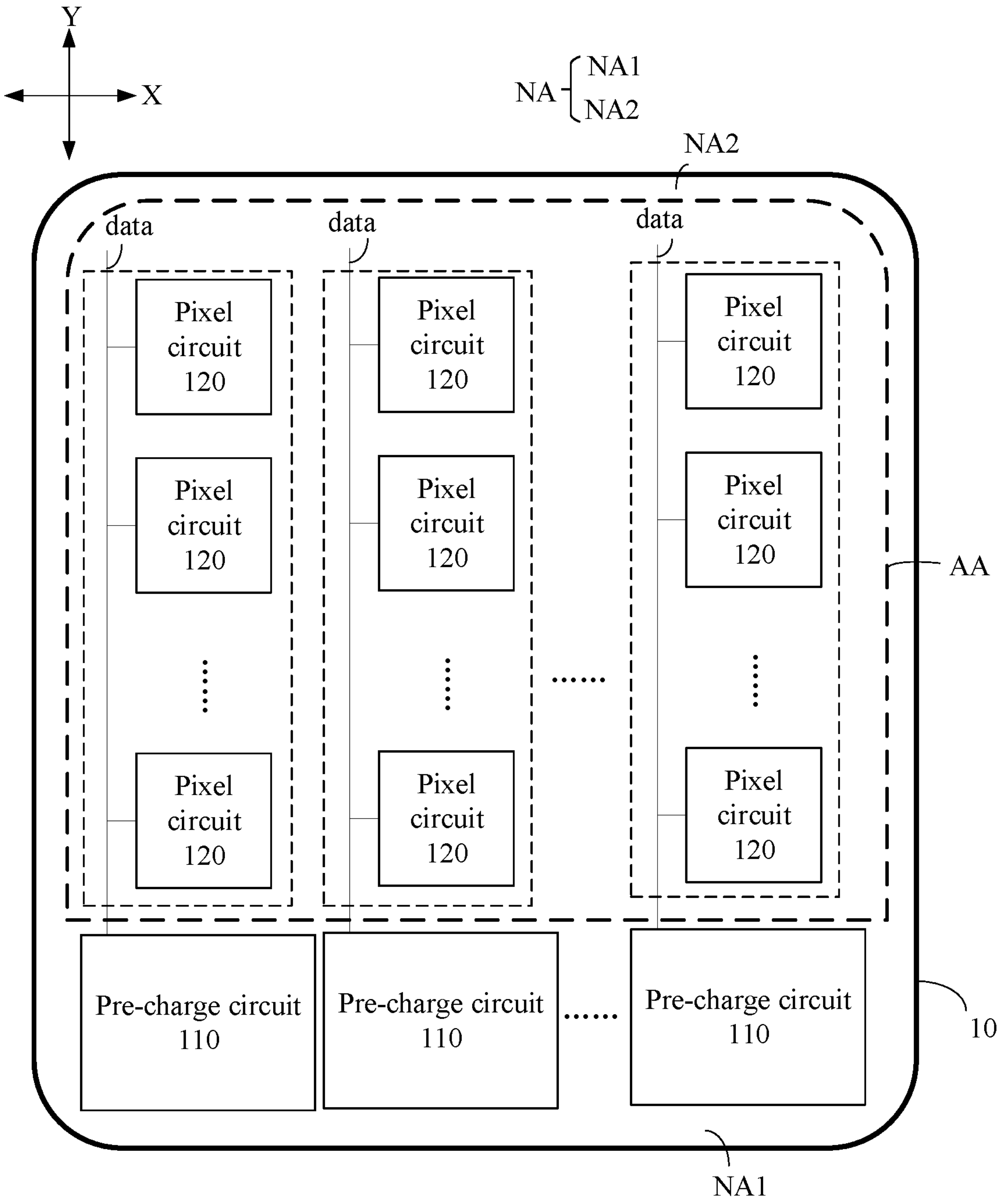
FIG. 18 illustrates another circuit schematic of a display panel according to various embodiments of the present disclosure.

FIG. 18 illustrates another circuit schematic of the display panel according to various embodiments of the present disclosure. Referring to FIG. 18, according to some embodiments of the present disclosure, optionally, the display panel 10 may include the display region AA and the non-display region NA. The display region AA may be disposed with light-emitting elements (not shown in drawings), and the display region AA may display images normally. The pixel circuit 120 may be in the display region AA, and the pre-charge circuit 110 may be in the non-display region NA. In some embodiments, the pre-charge circuit 110 in the non-display region NA may be electrically connected to the pixel circuit 120 in the display region AA.

In such way, since the pre-charge circuit 110 is in the non-display region NA, light blocking of the display region AA by the pre-charge circuit 110 may be reduced, which ensures that the display region AA has higher opening ratio.

It should be noted that the pre-charge circuit 110 may also be in the display region AA, which may not be limited in embodiment of the present disclosure.

Referring to FIG. 18, according to some embodiments of the present disclosure, optionally, the non-display region NA may include the first non-display region NA1 and the second non-display region NA2. Along the first direction Y, the first non-display region NA1, the display region AA and the second non-display region NA2 may be arranged sequentially; the first non-display region NA1 may be disposed with soldering pads (not shown in drawings), and the soldering pads may be configured to bond with the driver chip or flexible circuit board. That is, the first non-display region NA1 may be the lower frame of the display panel, and the second non-display region NA2 may be the upper frame of the display panel. The pre-charge circuit 110 may be in the first non-display region NA1 and/or the second non-display region NA2. FIG. 18 shows an example that the plurality of pre-charge circuits 110 may be in the first non-display region NA1. In other embodiments, the plurality of pre-charge circuits 110 may also be in the second non-display region NA2; or a part of the pre-charge circuits 110 may be in the first non-display region NA1, and another part of the pre-charge circuits 110 may be in the second non-display region NA2.

As shown in FIG. 18, the plurality of pre-charge circuits 110 in the first non-display region NA1 may be arranged in at least one row along the second direction X. One pre-charge circuit 110 in the first non-display region NA1 may be electrically connected to the plurality of pixel circuits 120 arranged along the first direction Y through one data-signal line data. One pre-charge circuit 110 may be configured to provide data signals to the plurality of pixel circuits 120 arranged along the first direction Y in a time-sharing manner.

In such way, since the pre-charge circuit 110 is in the first non-display region NA1, the light blocking of the display region AA by the pre-charge circuit 110 may be reduced, which ensures that the display region AA has a higher opening ratio. In addition, since the first non-display region NA1 is relatively close to the driver chip, disposing the pre-charge circuit 110 in the first non-display region NA1 may facilitate the pre-charge circuit 110 to obtain the control signal from the driver chip, including the current control signal inputted from the current control signal terminal and/or the control signal that controls the on/off of the transistor in the pre-charge circuit 110.

Figure 19:
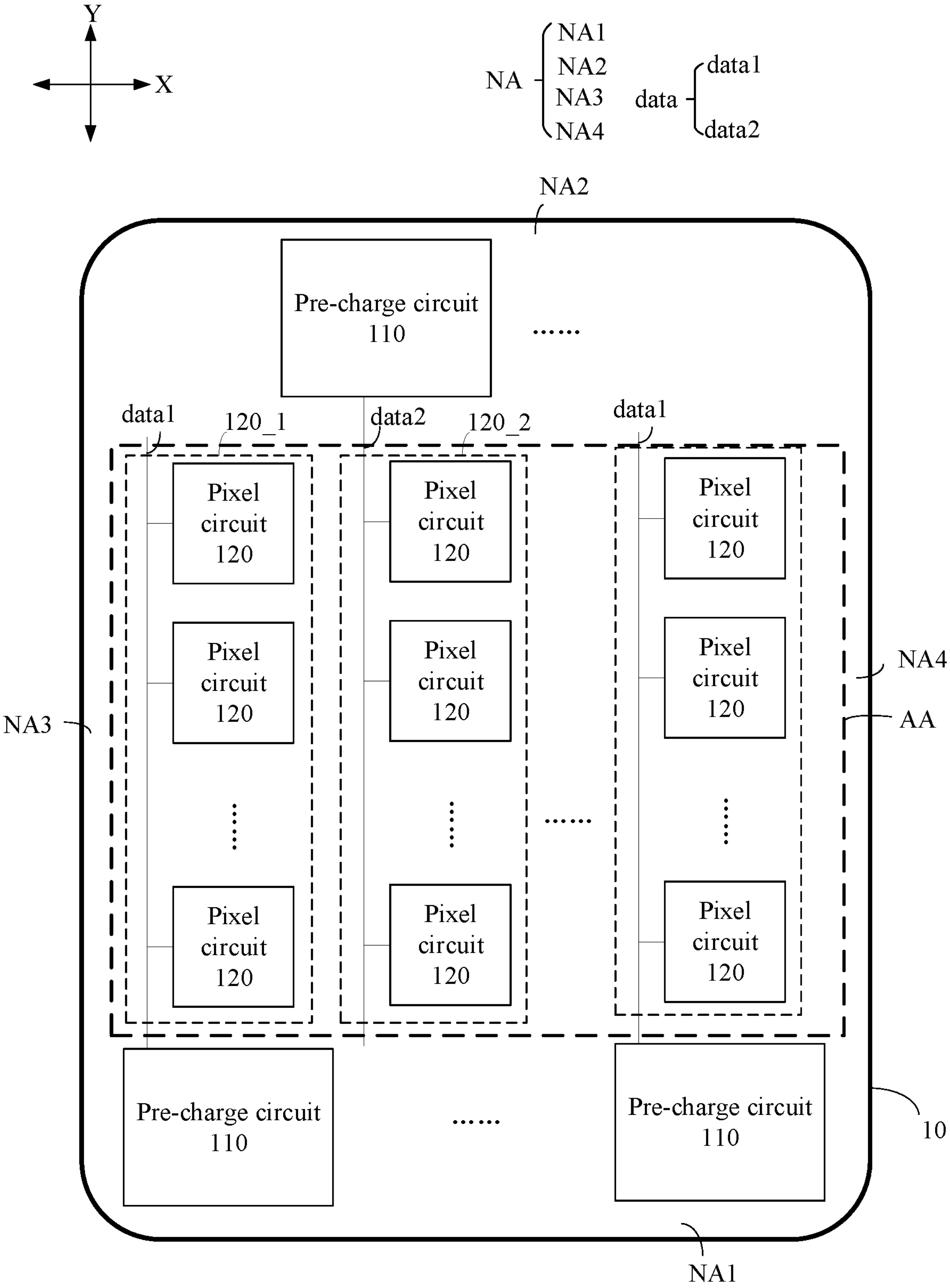
FIG. 19 illustrates another circuit schematic of a display panel according to various embodiments of the present disclosure.

FIG. 19 illustrates another circuit schematic of the display panel according to various embodiments of the present disclosure. Referring to FIG. 19, different from one embodiment shown in FIG. 18, according to other embodiments of the present disclosure, optionally, in the plurality of pre-charge circuits 110, a part of the pre-charge circuits 110 may be in the first non-display region NA1, and another part of the pre-charge circuits 110 may be in the second non-display region NA2.

The data-signal lines data may include the first data-signal line data1 and the second data-signal line data2. The pre-charge circuit 110 in the first non-display region NA1 may be electrically connected to the plurality of pixel circuits 120 arranged along the first direction Y through one first data-signal line data1; and the pre-charge circuit 110 in the second non-display region NA2 may be electrically connected to the plurality of pixel circuits 120 arranged along the first direction Y through one second data-signal line data2.

Along the second direction X, the first data-signal lines data1 and the second data-signal lines data2 may be alternately arranged. For example, along the second direction X, an odd-numbered column pixel circuit 120_1 may be electrically connected to the first data-signal line data1, and an even-numbered column pixel circuit 120_2 may be electrically connected to the second data-signal line data2; or along the second direction X, an even-numbered column pixel circuit 120_2 may be electrically connected to the first data-signal line data1, and an odd-numbered column pixel circuit 120_1 may be electrically connected to the second data-signal line data2.

In such way, a part of the pre-charge circuits 110 may be in the first non-display region NA1, and another part of the pre-charge circuits 110 may be in the second non-display region NA2. Along the second direction X, the first data-signal lines data1 and the second data-signal lines data2 may be alternately arranged. On the one hand, a relatively large distance may be between two adjacent pre-charge circuits 110 in the first non-display region NA1, and a relatively large distance may be between two adjacent pre-charge circuits 110 in the second non-display region NA2, which may effectively prevent short circuit between two adjacent pre-charge circuits 110. On the other hand, sufficient space may be configured to arrange the pre-charge circuits 110, and a larger quantity of pre-charge circuits 110 may be arranged.

Referring to FIG. 19, according to some embodiments of the present disclosure, optionally, the non-display region NA may include the third non-display region NA3 and the fourth non-display region NA4. Along the second direction X, the third non-display region NA3, the display region AA and the fourth non-display region NA4 may be arranged sequentially. That is, the third non-display region NA3 may be the left frame of the display panel, and the fourth non-display region NA4 may be the right frame of the display panel. In other embodiments, the plurality of pre-charge circuits 110 may also be in the third non-display region NA3 and/or the fourth non-display region NA4, which may not be limited in embodiment of the present disclosure.

Figure 20:
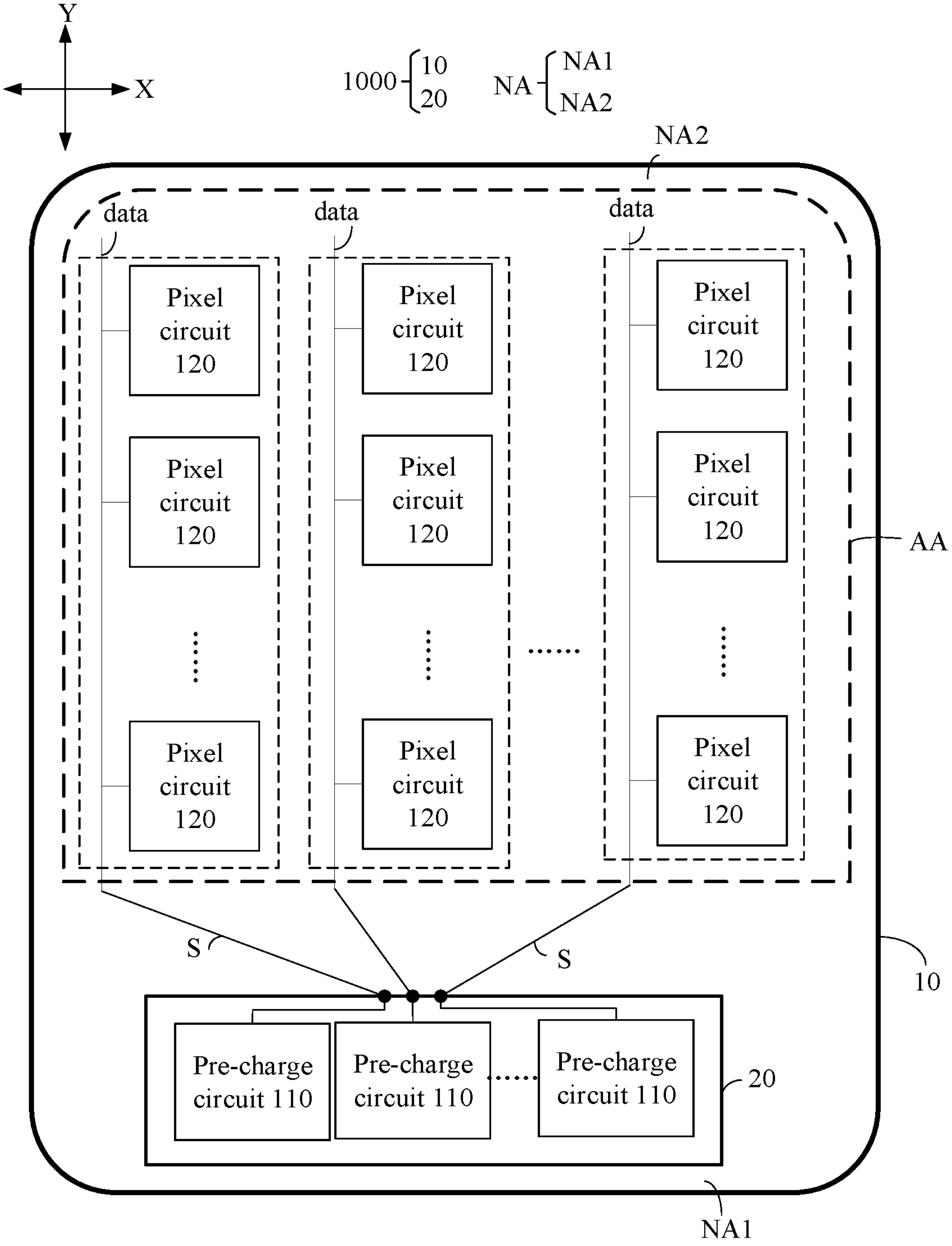
FIG. 20 illustrates a circuit connection schematic of a display apparatus configured in a display panel according to various embodiments of the present disclosure.

FIG. 20 illustrates a circuit connection schematic of a display apparatus configured in the display panel according to various embodiments of the present disclosure. Referring to FIG. 19, according to some embodiments of the present disclosure, optionally, the display apparatus 1000 may include the display panel 10 and the driver chip 20; and the pre-charge circuit 110 may also be at the driver chip 20, which may not be limited in the present disclosure. For example, in some embodiments, the display panel 10 may include the display region AA and the non-display region NA. The display region AA may be disposed with the data-signal line data and the pixel circuit 120, and the non-display region NA may be disposed with the fan-out line S. The pre-charge circuit 110 in the driver chip 20 may be electrically connected to the pixel circuit 120 sequentially through the fan-out line S and the data-signal line data.

Figure 21:
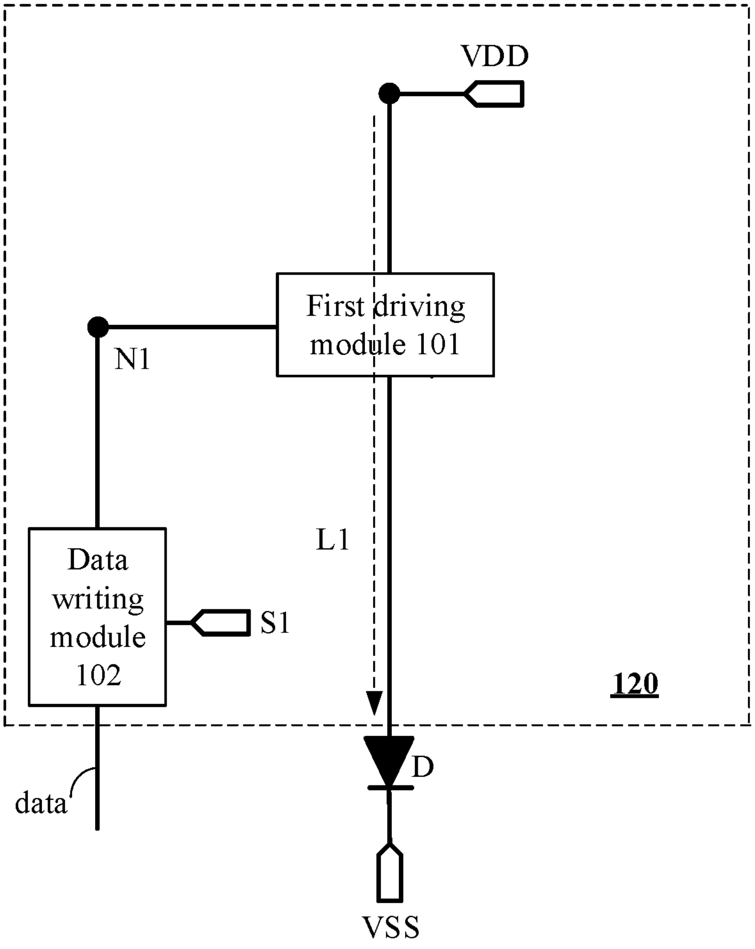
FIG. 21 illustrates another circuit schematic of a pixel circuit in a display panel according to various embodiments of the present disclosure.

FIG. 21 illustrates another circuit schematic of a pixel circuit in the display panel according to various embodiments of the present disclosure. Referring to FIG. 21, according to some embodiments of the present disclosure, optionally, the pixel circuit 120 may include the first driving branch L1; and the first driving branch L1 may be connected to the light-emitting element D. The first driving branch L1 may be configured to drive the light-emitting element D to emit light. The first driving branch L1 may include the first driving module 101. The control terminal of the first driving module 101 may be electrically connected to the first node N1, the first terminal of the first driving module 101 may be electrically connected to the first power supply voltage signal line VDD, and the second terminal of the first driving module 101 may be electrically connected to the first electrode of the light-emitting element D. The light-emitting element D may include the first electrode and the second electrode. The second electrode of the light-emitting element D may be electrically connected to the second power supply voltage signal line VSS. Exemplarily the first electrode of the light-emitting element D may be the anode of the light-emitting element D, and the second electrode of the light-emitting element D may be the cathode of the light-emitting element D. Exemplarily, the first power supply voltage signal line VDD may be configured to transmit a power supply voltage signal with a forward voltage value, that is, a power supply voltage signal with a voltage value greater than 0V.

The pixel circuit 120 may also include a data writing module 102. The control terminal of the data writing module 102 may be electrically connected to the first scan signal line S1; the first terminal of the data writing module 102 may be electrically connected to the data-signal line data; and the second terminal of the data writing module 102 may be electrically connected to the first node N1. The data writing module 102 may be configured to transmit the data signal of the data-signal line data to the first node N1. The first driving module 101 may be turned on to be in conduction in response to the conduction level of the first node N1, and the first driving module 101 may provide the driving current to the light-emitting element D to drive the light-emitting element D to emit light.

In embodiment of the present disclosure, the data signal transmitted by the data-signal line data may be a data signal with a controllable current value. That is, the current value of the data signal transmitted by the data-signal line data may be adjusted, such as the current value may reach a desired current value. Desired current value may be any set current value, and the size of desired current value may be flexibly adjusted according to actual situation, which may not be limited in embodiments of the present disclosure.

In such way, since the data-signal line transmits the data signal with a controllable current value to the data writing module in the pixel circuit, it is beneficial for preventing the data signal from being affected by the voltage drop on the data-signal line. Therefore, the voltage value of the data signal received by the pixel circuit may be same as or close to desired voltage value, thereby making the brightness of the light-emitting element driven by the pixel circuit to reach desired brightness, reducing the problem of uneven display brightness of the display panel, and improving the display effect of the display panel.

Figure 22:
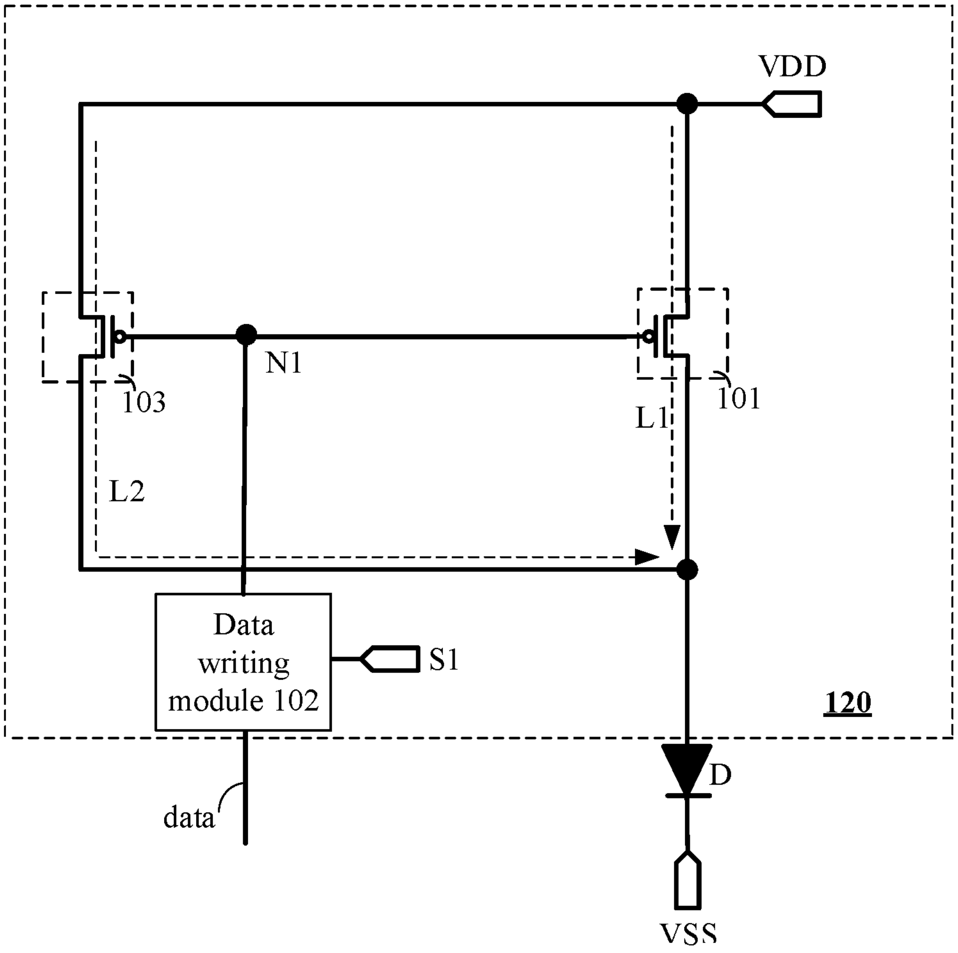
FIG. 22 illustrates another circuit schematic of a pixel circuit in a display panel according to various embodiments of the present disclosure.

FIG. 22 illustrates another circuit schematic of a pixel circuit in the display panel according to various embodiments of the present disclosure. Referring to FIG. 22, according to some embodiments of the present disclosure, optionally, the pixel circuit 120 may also include the second driving branch L2; and the second driving branch L2 may be connected to the light-emitting element D and configured to drive the light-emitting element D to emit light. In some embodiments, the first driving branch L1 and the second driving branch L2 may jointly drive the light-emitting element D to emit light to increase the driving current outputted by the pixel circuit 120. Therefore, the brightness of the light-emitting element D may reach relatively high brightness, thereby increasing the brightness adjustment range of the light-emitting element D.

For example, the second driving branch L2 may include the second driving module 103. The control terminal of the second driving module 103 may be electrically connected to the first node N1, the first terminal of the second driving module 103 may be electrically connected to the first power supply voltage signal line VDD, and the second terminal of the second driving module 103 may be electrically connected to the first electrode of the light-emitting element D. For example, in the light-emitting stage, the first driving module 101 may be turned on to be in conduction in response to the conduction level of the first node N1, the second driving module 103 may also be turned on to be in conduction in response to the conduction level of the first node N1, the first driving module 101 may provide the driving current $I_1$ to the light-emitting element D, and the second driving module 103 may provide the driving current $I_2$ to the light-emitting element D. The light-emitting element D may receive the driving current I=I1+I2, and the light-emitting element D may emit light.

In such way, the first driving module 101 and the second driving module 103 may jointly drive the light-emitting element D to emit light to increase the driving current outputted by the pixel circuit 120. Therefore, the brightness of the light-emitting element D may reach relatively high brightness, thereby increasing the brightness adjustment range of the light-emitting element D.

Referring to FIG. 22, according to some embodiments of the present disclosure, optionally, both the first driving module 101 and the second driving module 103 may include same type of transistors, such that the conduction level of the first node N1 may simultaneously control the first driving module 101 and the second driving module 103 to be turned on to be in conduction or turned off to be in disconnection. For example, both the first driving module 101 and the second driving module 103 may include P-type transistors.

Correspondingly, exemplarily, during the light-emitting stage, both the first driving module 101 and the second driving module 103 may be turned on to be in conduction in response to the low level of the first node N1; and the first driving module 101 and the second driving module 103 may jointly drive the light-emitting element D to emit light.

Figure 23:
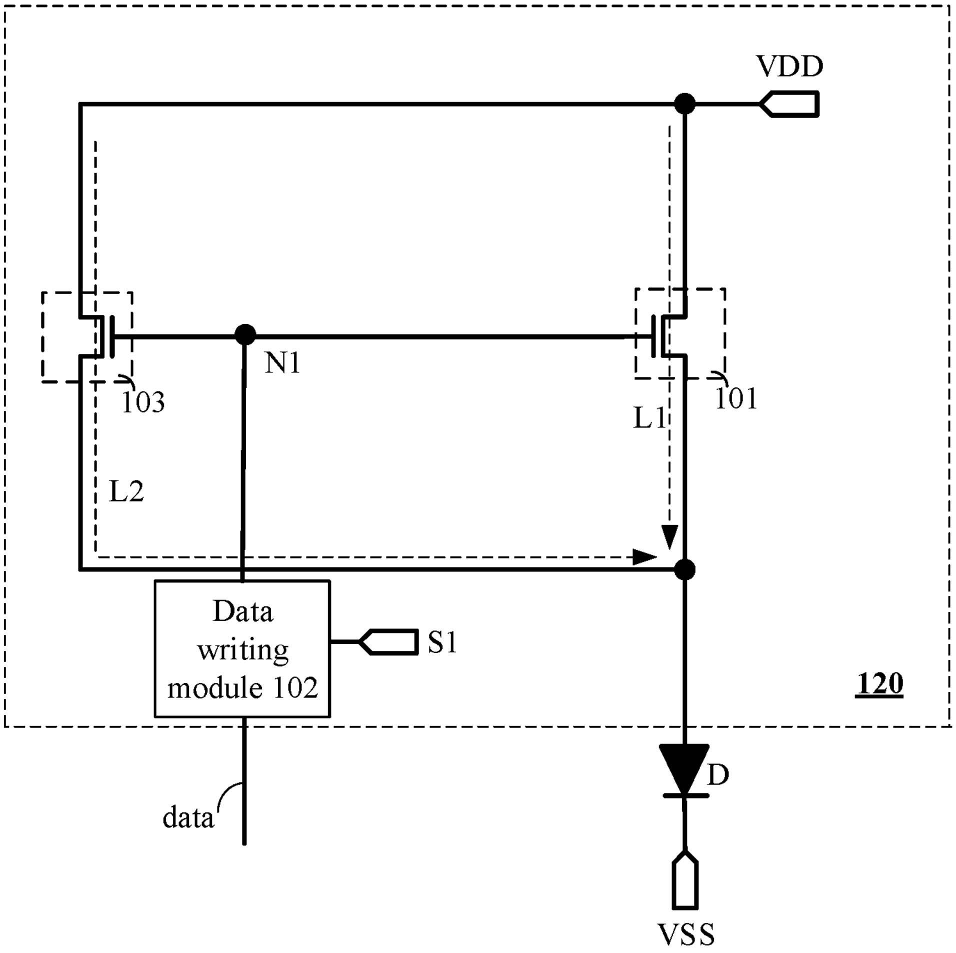
FIG. 23 illustrates another circuit schematic of a pixel circuit in a display panel according to various embodiments of the present disclosure.

FIG. 23 illustrates another circuit schematic of a pixel circuit in the display panel according to various embodiments of the present disclosure. As shown in FIG. 23, according to other embodiments of the present disclosure, optionally, both the first driving module 101 and the second driving module 103 may include N-type transistors.

Correspondingly, exemplarily, in the light-emitting stage, both the first driving module 101 and the second driving module 103 may be turned on to be in conduction in response to the high level of the first node N1; and the first driving module 101 and the second driving module 103 may jointly drive the light-emitting element D to emit light.

Figure 24:
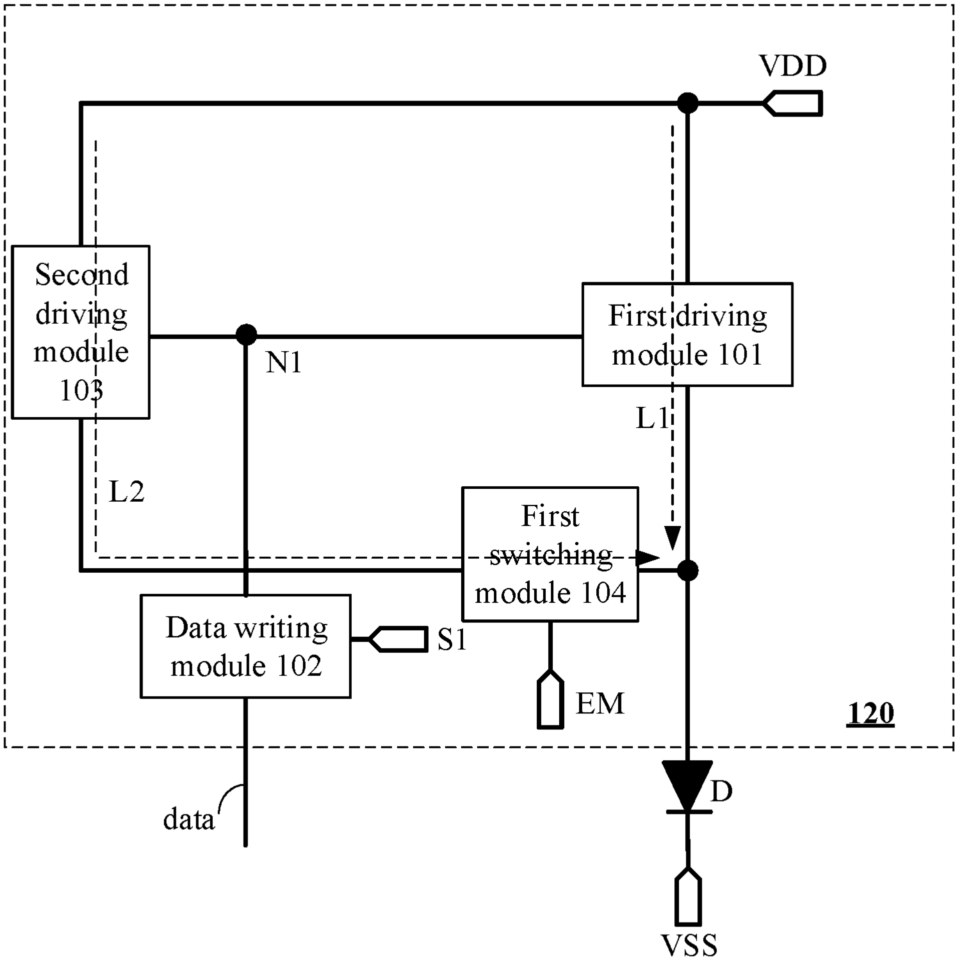
FIG. 24 illustrates another circuit schematic of a pixel circuit in a display panel according to various embodiments of the present disclosure.

FIG. 24 illustrates another circuit schematic of a pixel circuit in the display panel according to various embodiments of the present disclosure. Referring to FIG. 24, according to some embodiments of the present disclosure, optionally, the second driving branch L2 may also include the first switching module 104. The control terminal of the first switching module 104 may be electrically connected to a light-emitting control signal line EM, the first terminal of the first switching module 104 may be electrically connected to the second terminal of the second driving module 103, and the second terminal of the first switching module 104 may be electrically connected to the first electrode of the light-emitting element D. The first switching module 104 may be turned on to be in conduction or turned off to be in disconnection under the control of the light-emitting control signal line EM. In some embodiments, by controlling the first switching module 104 to be turned on to be in conduction or turned off to be in disconnection, whether the second driving branch L2 provides the driving current to the light-emitting element D may be controlled. For example, when the light-emitting element D emits light (i.e., the light-emitting stage), the first switching module 104 may be turned on to be in conduction under the control of the light-emitting control signal line EM. Furthermore, the first driving branch L1 and the second driving branch L2 may jointly drive the light-emitting element D to emit light, thereby increasing the driving current outputted by the pixel circuit 120.

For another example, in other embodiments, in the stage when the light-emitting element D emits light (i.e., the light-emitting stage), the first switching module 104 may be turned off to be in disconnection under the control of the light-emitting control signal line EM. Furthermore, the first switching module 104 may prevent the driving current of the second driving module 103 from flowing to the first electrode of the light-emitting element D; and only the first driving branch L1 may drive the light-emitting element D to emit light.

In such way, by adding the first switching module 104, whether the second driving branch L2 provides the driving current to the light-emitting element D may be controlled, thereby increasing the brightness adjustment range of the light-emitting element and satisfying requirements of various brightness situations.

Figure 25:
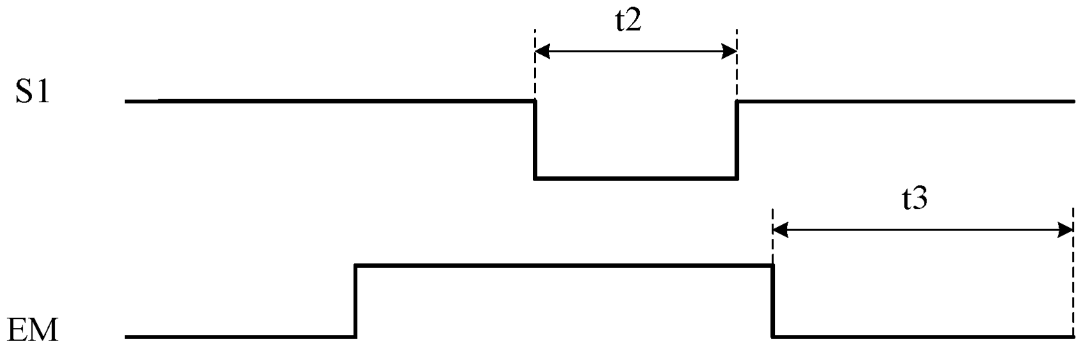
FIG. 25 illustrates a driving time sequence diagram of a pixel circuit in a display panel according to various embodiments of the present disclosure.

FIG. 25 illustrates a driving time sequence diagram of a pixel circuit in the display panel according to various embodiments of the present disclosure. In the driving time sequence diagram shown in FIG. 25, the data writing module 102 and the first switching module 104 in FIG. 24 are both P-type transistors, which is taken as an example for illustration. As shown in FIGS. 24-25, according to some embodiments of the present disclosure, optionally, the stage that the data writing module 102 is turned on to be in conduction refers to the data writing stage t2. In the data writing stage t2, the data writing module 102 may be turned on to be in conduction in response to the conduction level (e.g., low level) of the first scan signal line S1; and the data writing module 102 may transmit the data signal of the data-signal line data to the first node N1 to realize writing of the data signal.

The first switching module 104 may be configured to turn off to be in disconnection in the stage when the data writing module 102 is turned on to be in conduction (i.e., the data writing stage t2). For example, in the data writing stage t2, the first switching module 104 may be turned off to be in disconnection in response to the cut-off level (e.g., high level) of the light-emitting control signal line EM.

In such way, since the first switching module 104 is turned off to be in disconnection in the data writing stage t2, the data signal of the data-signal line data may be effectively prevented from being shunted to the first electrode of the light-emitting element D through the first switching module 104. Therefore, the data signal of the data-signal line data may be written into the first node N1, thereby ensuring that the first node N1 may reach desired potential.

Referring to FIGS. 24 and 25, according to some embodiments of the present disclosure, optionally, the stage that the light-emitting element D emits light refers to the light-emitting stage t3. In the light-emitting stage t3, the data writing module 102 may be turned off to be in disconnection in response to the cut-off level (e.g., high level) of the first scan signal line S1, the first driving module 101 may be turned on to be in conduction in response to the conduction level of the first node N1, the second driving module 103 may also be turned on to be in conduction in response to the conduction level of the first node N1, and the first switching module 104 may be turned on to be in conduction in response to the conduction level (e.g., low level) of the light-emitting control signal line EM. The first driving module 101 may provide the driving current $I_1$ to the light-emitting element D. The driving current $I_2$ of the second driving module 103 may be transmitted to the light-emitting element D through the first switching module 104. The light-emitting element D may receive the driving current $I=I_1+I_2$, and the light-emitting element D may emit light.

Figure 26:
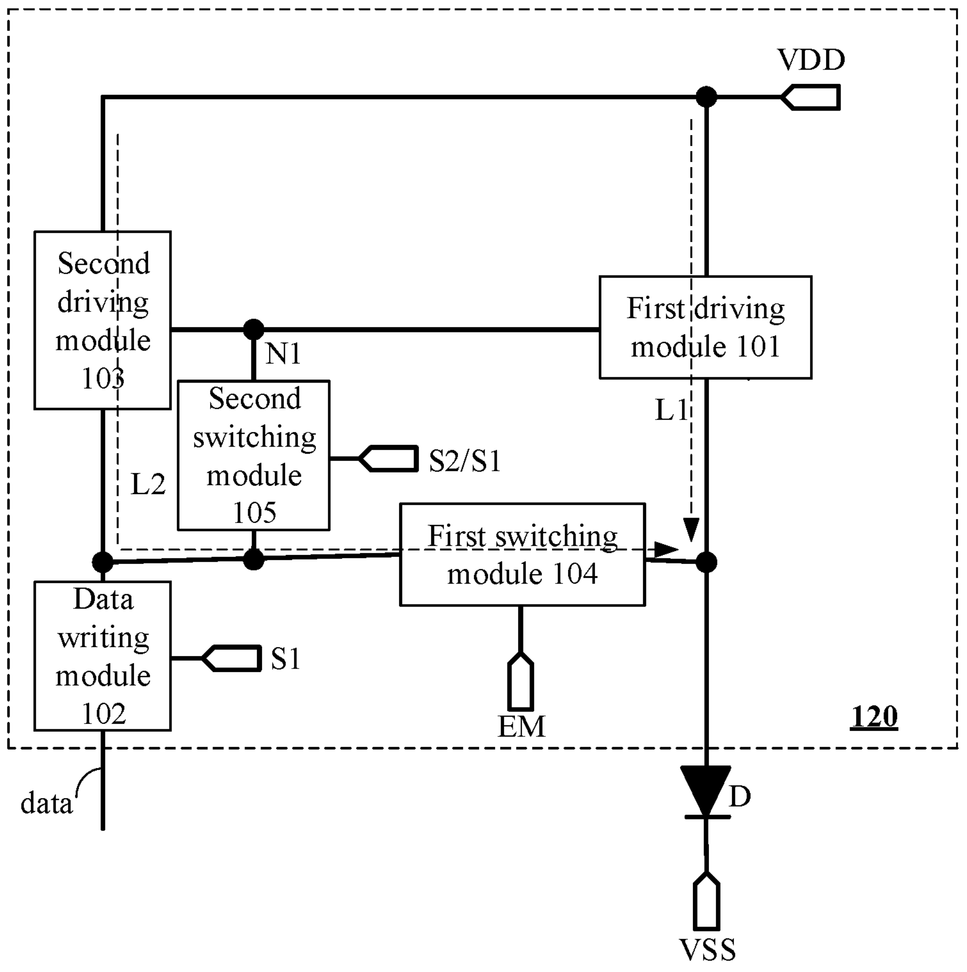
FIG. 26 illustrates a circuit connection schematic of a pixel circuit in a display panel according to various embodiments of the present disclosure.

FIG. 26 illustrates a circuit connection schematic of a pixel circuit in the display panel according to various embodiments of the present disclosure. Referring to FIG. 26, according to some embodiments of the present disclosure, optionally, the pixel circuit 120 may also include the second switching module 105. The control terminal of the second switching module 105 may be electrically connected to the second scan signal line S2; the first terminal of the second switching module 105 may be electrically connected to the second terminal of the data writing module 102; and the second terminal of the second switching module 105 may be electrically connected to the first node N1. The second switching module 105 may be configured to turn on to be in conduction in the stage when the data writing module 102 is turned on to be in conduction (i.e., the data writing stage). In the data writing stage, the data writing module 102 may be turned on to be in conduction in response to the conduction level of the first scan signal line S1, the second switching module 105 may be turned on to be in conduction in response to the conduction level of the second scan signal line S2, and the data signal of the data-signal line data may be written to the first node N1 sequentially through the data writing module 102 and the second switching module 105, thereby completing the writing of the data signal.

Referring to FIG. 26, according to some embodiments of the present disclosure, optionally, the second scan signal line S2 and the first scan signal line S1 may be same scan signal line. For example, the second scan signal line S2 may be reused as the first scan signal line S1, or the first scan signal line S1 and the second scan signal line S2 may transmit same scan signal. That is, in the data writing stage, both the data writing module 102 and the second switching module 105 may be turned on to be in conduction in response to the conduction level of the first scan signal line S1, and the data signal of the data-signal line data may be written to the first node N1 sequentially through the data writing module 102 and the second switching module 105, thereby completing the writing of the data signal.

In such way, since the second scan signal line S2 and the first scan signal line S1 are same scan signal line, the quantity of scan signal lines in the display panel may be reduced, and the quantity of gate-driving circuits configured to provide scan signals in the display panel may be reduced, which may be beneficial for simplifying the wiring design and reducing the production cost of the display panel.

In other embodiments of the present disclosure, the second scan signal line S2 and the first scan signal line S1 may also be different scan signal lines, which may not be limited in the present disclosure.

Figure 27:
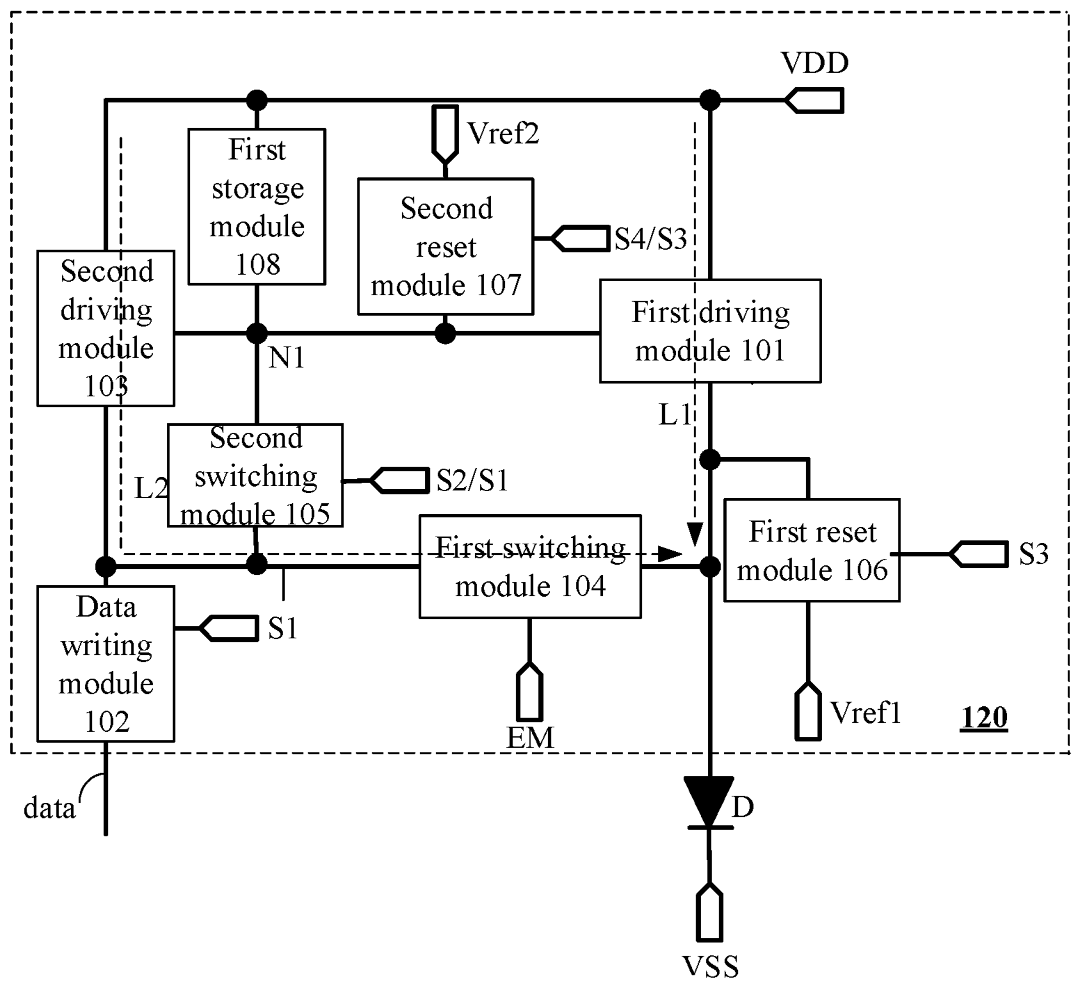
FIG. 27 illustrates another circuit connection schematic of a pixel circuit in a display panel according to various embodiments of the present disclosure.

FIG. 27 illustrates another circuit connection schematic of a pixel circuit in the display panel according to various embodiments of the present disclosure. Referring to FIG. 27, according to some embodiments of the present disclosure, optionally, the pixel circuit 120 may also include the first reset module 106. The control terminal of the first reset module 106 may be electrically connected to the third scan signal line S3; the first terminal of the first reset module 106 may be electrically connected to the first reset signal line Vref1; and the second terminal of the first reset module 106 may be electrically connected to the first electrode of the light-emitting element D. The first reset module 106 may be configured to reset the first electrode of the light-emitting element D. The first reset module 106 may be turned on to be in conduction in response to the conduction level of the third scan signal line S3, and the first reset signal of the first reset signal line Vref1 may be transmitted to the first electrode of the light-emitting element D to reset the first electrode of the light-emitting element D. For example, the voltage value of the first reset signal may be less than 0V, that is, a negative voltage value.

In such way, by adding the first reset module 106 to reset the first electrode of the light-emitting element D, the residual charge at the first electrode of the light-emitting element D may be released, which may effectively improve the image retention phenomenon.

Referring to FIG. 27, according to some embodiments of the present disclosure, optionally, the pixel circuit 120 may also include the second reset module 107. The control terminal of the second reset module 107 may be electrically connected to the fourth scan signal line S4; the first terminal of the second reset module 107 may be electrically connected to the second reset signal line Vref2; and the second terminal of the second reset module 107 may be electrically connected to the first node N1. The second reset module 107 may be configured to reset the first node N1. The second reset module 107 may be turned on to be in conduction in response to the conduction level of the fourth scan signal line S4 and transmit the second reset signal of the second reset signal line Vref2 to the first node N1 to reset the first node N1. For example, the voltage value of the second reset signal may be less than 0V, that is, a negative voltage value.

In such way, by adding the second reset module 107 to reset the first node N1, it ensures that subsequent data signals may be successfully written to the first node N1, thereby ensuring normal light-emitting of the light-emitting element and normal display of the display panel.

Referring to FIG. 27, according to some embodiments of the present disclosure, optionally, in the stage that the second reset module 107 is turned on to be in conduction, the second switching module 105 may be turned off to be in disconnection in response to the cutoff level of the second scan signal line S2. That is, when the first node N1 is reset, the second switching module 105 may be turned off to be in disconnection.

In such way, since the second switching module 105 is turned off to be in disconnection when the first node N1 is reset, the second reset signal written to the first node N1 may be effectively prevented from being shunted to other positions in the pixel circuit through the second switching module 105, which may ensure that the potential of the first node N1 may be reset to desired potential, thereby improving resetting effect of the first node N1.

Referring to FIG. 27, according to some embodiments of the present disclosure, optionally, in the stage that the first reset module 106 is turned on to be in conduction, the first switching module 104 may be turned off to be in disconnection in response to the cutoff level of the light-emitting control signal line EM. That is, when the first electrode of the light-emitting element D is reset, the first switching module 104 may be turned off to be in disconnection.

In such way, when the first electrode of the light-emitting element D is reset, the first switching module 104 may be turned off to be in disconnection. Therefore, the first reset signal written to the first electrode of the light-emitting element D may be effectively prevented from being shunted to other positions of the pixel circuit through the first switching module 104, which may ensure that the potential of the first electrode of the light-emitting element D may be reset to desired potential, thereby improving the resetting effect of the first electrode of the light-emitting element D.

Referring to FIG. 27, according to some embodiments of the present disclosure, optionally, the third scan signal line S3 and the fourth scan signal line S4 may be same scan signal line. For example, the fourth scan signal line S4 may be reused as the third scan signal line S3, or the third scan signal line S3 and the fourth scan signal line S4 may transmit same scan signal.

That is, both the first reset module 106 and the second reset module 107 may be turned on to be in conduction in response to the conduction level of the third scan signal line S3. The first reset module 106 may transmit the first reset signal of the first reset signal line Vref1 to the first electrode of the light-emitting element D to reset the first electrode of the light-emitting element D. The second reset module 107 may transmit the second reset signal of the second reset signal line Vref2 to the first node N1 to reset the first node N1.

In such way, since the third scan signal line S3 and the fourth scan signal line S4 are same scan signal line, the quantity of scan signal lines in the display panel may be reduced, and the quantity of gate-driving circuits configured to provide scan signals in the display panel may be reduced, which may be beneficial for simplifying the wiring design and reducing the production cost of the display panel.

In other embodiments of the present disclosure, the third scan signal line S3 and the fourth scan signal line S4 may also be different scan signal lines, which may not be limited in the present disclosure.

According to some embodiments of the present disclosure, optionally, the second reset signal line Vref2 may be reused as the first reset signal line Vref1. That is, the first reset module 106 may transmit the first reset signal of the first reset signal line Vref1 to the first electrode of the light-emitting element D to reset the first electrode of the light-emitting element D. The second reset module 107 may transmit the first reset signal of the first reset signal line Vref1 to the first node N1 to reset the first node N1.

In such way, since the second reset signal line Vref2 may be reused as the first reset signal line Vref1, the quantity of reset signal lines in the display panel may be reduced, which may be beneficial for simplifying the wiring design and reducing the production cost of the display panel.

According to some embodiments of the present disclosure, optionally, the second reset signal line Vref2 may not be reused as the first reset signal line Vref1. That is, the first reset signal line Vref1 and the second reset signal line Vref2 may be different reset signal lines. For example, the voltage value of the first reset signal transmitted by the first reset signal line Vref1 may be different from the voltage value of the second reset signal transmitted by the second reset signal line Vref2. In such way, both the first node N1 and the first electrode of the light-emitting element D may be reset to respective desired potentials.

Figure 28:
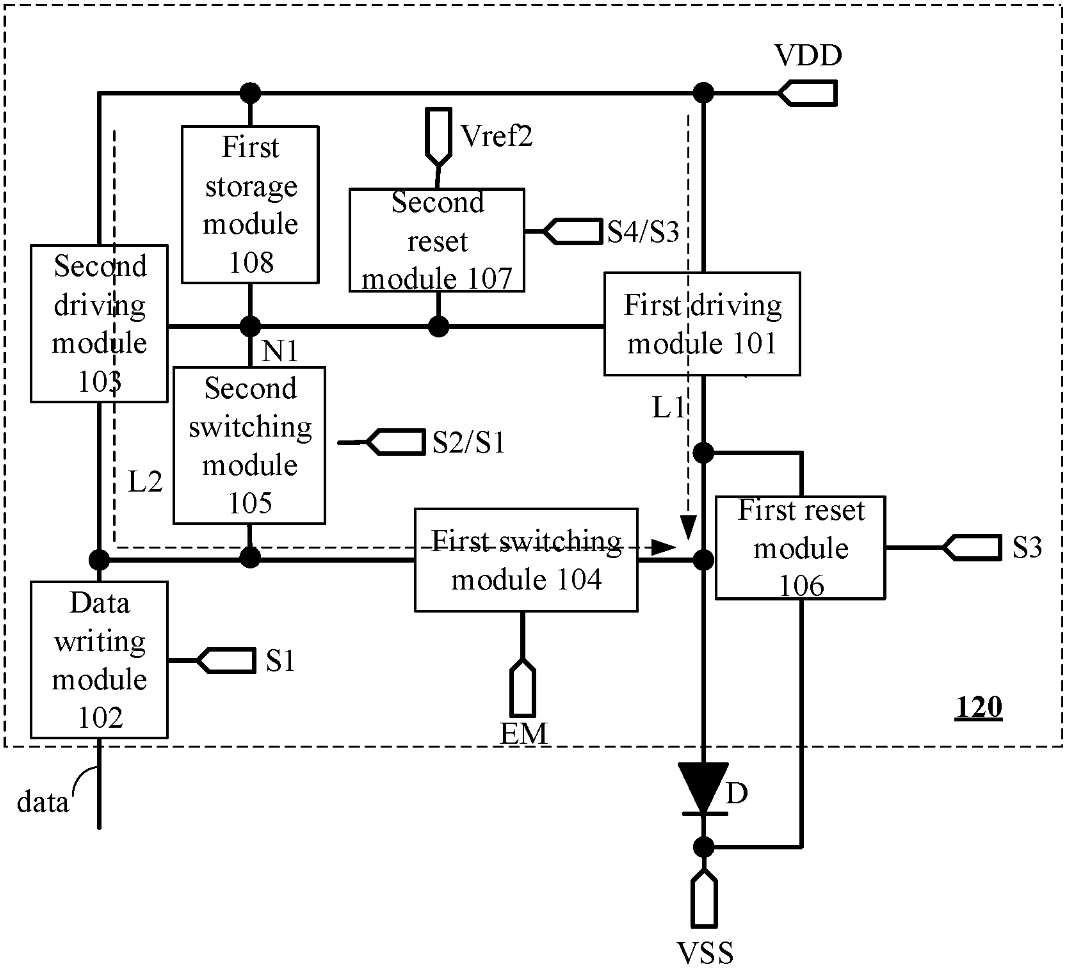
FIG. 28 illustrates another circuit connection schematic of a pixel circuit in a display panel according to various embodiments of the present disclosure.

FIG. 28 illustrates another circuit connection schematic of a pixel circuit in the display panel according to various embodiments of the present disclosure. Referring to FIG. 28, different from one embodiment shown in FIG. 27, according to other embodiments of the present disclosure, optionally, the first reset signal line Vref1 may be reused as the second power supply voltage signal line VSS.

For example, the control terminal of the first reset module 106 may be electrically connected to the third scan signal line S3; the first terminal of the first reset module 106 may be electrically connected to the first reset signal line Vref1; and the second terminal of the first reset module 106 may be electrically connected to the first electrode of the light-emitting element D. The first reset module 106 may be configured to reset the first electrode of the light-emitting element D. The control terminal of the second reset module 107 may be electrically connected to the fourth scan signal line S4; the first terminal of the second reset module 107 may be electrically connected to the second reset signal line Vref2; and the second terminal of the second reset module 107 may be electrically connected to the first node N1. The second reset module 107 may be configured to reset the first node N1.

The second electrode of the light-emitting element D may be electrically connected to the second power supply voltage signal line VSS, and the second power supply voltage signal line VSS may be reused as the first reset signal line Vref1. For example, the second electrode of the light-emitting element D may be the cathode of the light-emitting element D. The voltage value of the second power supply voltage signal transmitted by the second power supply voltage signal line VSS may be less than 0V. That is, the second power supply voltage signal line VSS may not only provide the second power supply voltage signal with a negative voltage value to the second electrode of the light-emitting element D, and the second power supply voltage signal may also be configured to reset the first electrode of the light-emitting element D.

In such way, by reusing the second power supply voltage signal line VSS as the first reset signal line Vref1, the quantity of reset signal lines in the display panel may be reduced, which may be beneficial for simplifying the wiring design and reducing the production cost of the display panel.

In the embodiment shown in FIG. 28, the third scan signal line S3 and the fourth scan signal line S4 may also be same scan signal line. For example, the fourth scan signal line S4 may be reused as the third scan signal line S3, or the third scan signal line S3 may be reused as the fourth scan signal line S4. In such way, the quantity of scan signal lines in the display panel may be reduced, and the quantity of gate-driving circuits for providing scan signals in the display panel may be reduced, which may be beneficial for simplifying the wiring design and reducing the production cost of the display panel.

Obviously, in the embodiment shown in FIG. 28, the third scan signal line S3 and the fourth scan signal line S4 may also be different scan signal lines. That is, the third scan signal line S3 may not be reused as the fourth scan signal line S4, which may not be limited in the present disclosure.

As shown in FIG. 27 or FIG. 28, according to some embodiments of the present disclosure, optionally, the pixel circuit 120 may also include the first storage module 108. The first terminal of the first storage module 108 may be electrically connected to the first power supply voltage signal line VDD, and the second terminal of the first storage module 108 may be electrically connected to the first node N1. The first storage module 108 may be configured to maintain the potential of the first node N1. For example, in the light-emitting stage, the first storage module 108 may maintain the first node N1 at the conduction level, thereby ensuring that the first driving module 101 and the second driving module 103 may maintain the conduction level. The first driving module 101 and the second driving module 103 may continuously provide the driving current to the first electrode of the light-emitting element D, thereby making the light-emitting element D to maintain light emission and increasing the light-emitting time of the light-emitting element D.

Figure 29:
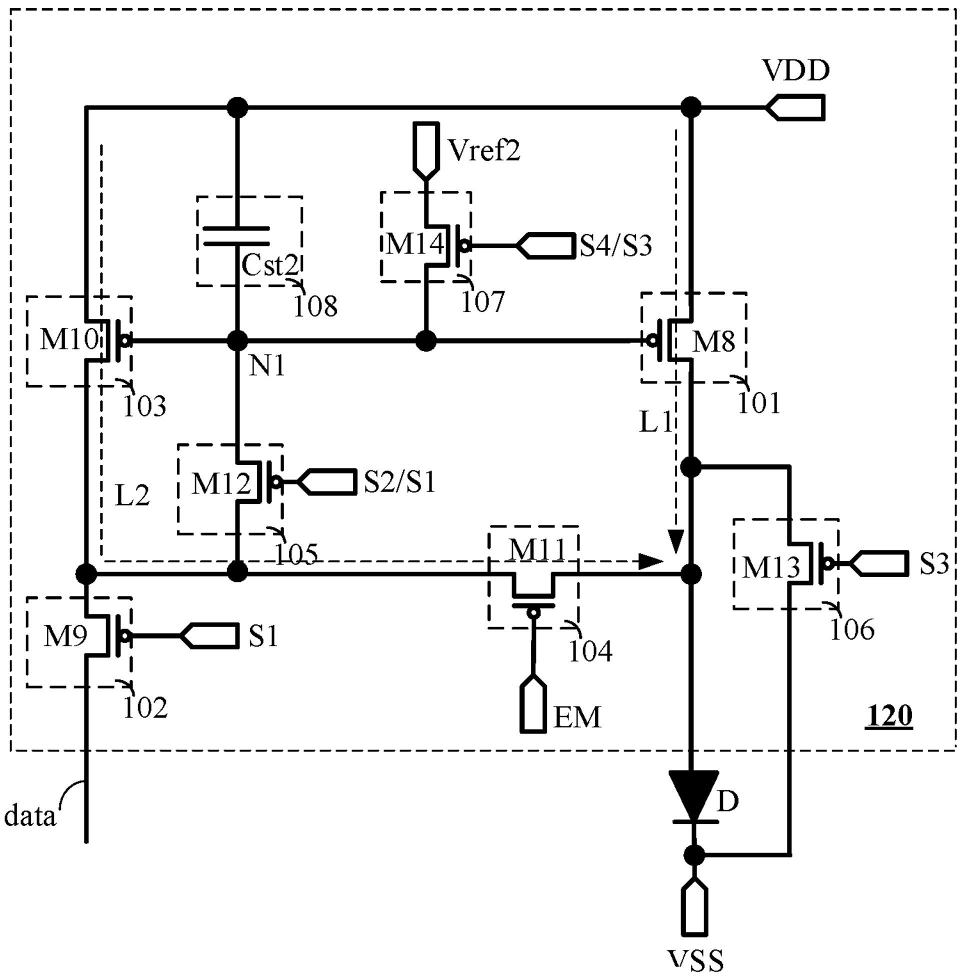
FIG. 29 illustrates another circuit connection schematic of a pixel circuit in a display panel according to various embodiments of the present disclosure.

FIG. 29 illustrates another circuit connection schematic of a pixel circuit in the display panel according to various embodiments of the present disclosure. Referring to FIG. 29, according to some embodiments of the present disclosure, optionally, the pixel circuit 120 may include the first driving module 101, the data writing module 102, the second driving module 103, the first switching module 104, the second switching module 105, the first reset module 106, the second reset module 107 and the first storage module 108. In FIG. 29, the first terminal of the first reset module 106 is connected to the second power supply voltage signal line VSS, that is, the second power supply voltage signal line VSS is reused as the first reset signal line Vref1, which is taken as an example for illustration. In other embodiments, the second power supply voltage signal line VSS may not be reused as the first reset signal line Vref1, and the first terminal of the first reset module 106 may be connected to the first reset signal line Vref1, which may not be limited in the present disclosure.

The first driving module 101 may include the eighth transistor M8, the data writing module 102 may include the ninth transistor M9, the second driving module 103 may include the tenth transistor M10, the first switching module 104 may include the eleventh transistor M11, the second switching module 105 may include the twelfth transistor M12, and the first reset module 106 may include the thirteenth transistor M13, the second reset module 107 may include the fourteenth transistor M14, and the first storage module 108 may include the second storage capacitor Cst2.

The gate electrode of the eighth transistor M8 may be electrically connected to the first node N1; the first electrode of the eighth transistor M8 may be electrically connected to the first power supply voltage signal line VDD; and the second electrode of the eighth transistor M8 may be electrically connected to the first electrode of the light-emitting element D.

The gate electrode of the ninth transistor M9 may be electrically connected to the first scan signal line S1; the first electrode of the ninth transistor M9 may be electrically connected to the data-signal line data; and the second electrode of the ninth transistor M9 may be electrically connected to the second node N2.

The gate electrode of the tenth transistor M10 may be electrically connected to the first node N1; the first electrode of the tenth transistor M10 may be electrically connected to the first power supply voltage signal line VDD; and the second electrode of the tenth transistor M10 may be electrically connected to the second node N2.

The gate electrode of the eleventh transistor M11 may be electrically connected to the light emission control signal line EM; the first electrode of the eleventh transistor M11 may be electrically connected to the second node N2; and the second electrode of the eleventh transistor M11 may be electrically connected to the first electrode of the light-emitting element D.

The gate electrode of the twelfth transistor M12 may be electrically connected to the second scan signal line S2; the first electrode of the twelfth transistor M12 may be electrically connected to the second node N2; and the second electrode of the twelfth transistor M12 may be electrically connected to the first node N1.

The gate electrode of the thirteenth transistor M13 may be electrically connected to the third scan signal line S3; the first electrode of the thirteenth transistor M13 may be electrically connected to the second power supply voltage signal line VSS; and the second electrode of the thirteenth transistor M13 may be electrically connected to the first electrode of the light-emitting element D.

The gate electrode of the fourteenth transistor M14 may be electrically connected to the fourth scan signal line S4; the first electrode of the fourteenth transistor M14 may be electrically connected to the second reset signal line Vref2; and the second electrode of the fourteenth transistor M14 may be electrically connected to the first node N1.

The first plate of the second storage capacitor Cst2 may be electrically connected to the first power supply voltage signal line VDD, and the second plate of the second storage capacitor Cst2 may be electrically connected to the first node N1.

In some embodiments, the second scan signal line S2 may be reused as the first scan signal line S1.

In some embodiments, the fourth scan signal line S4 may be reused as the third scan signal line S3.

Figure 30:
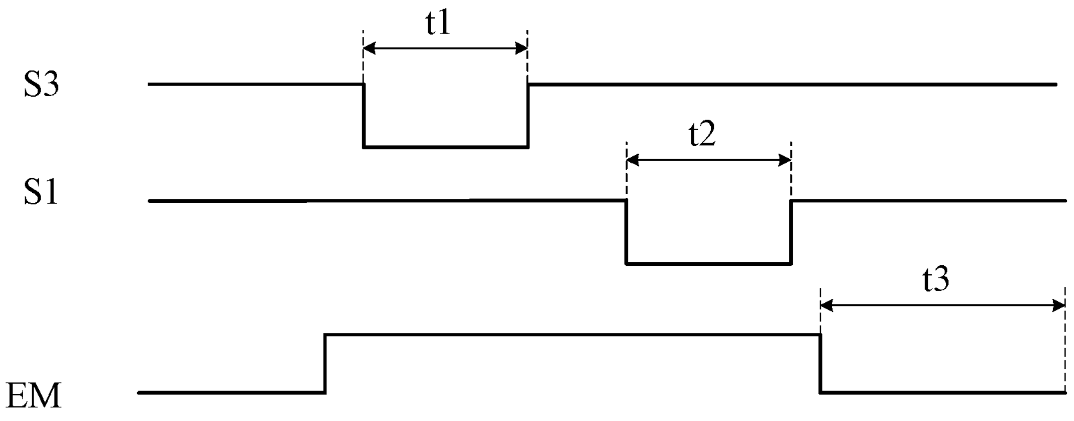
FIG. 30 illustrates another driving time sequence diagram of a pixel circuit in a display panel according to various embodiments of the present disclosure.

FIG. 30 illustrates another driving time sequence diagram of a pixel circuit in the display panel according to various embodiments of the present disclosure. As shown in FIGS. 29-30, according to some embodiments of the present disclosure, optionally, the working process of the pixel circuit 100 may include a reset stage t1, a data writing stage t2, and a light-emitting stage t3. It should be noted that, as shown in FIGS. 29-30, the time sequence shown in FIG. 30 is shown by reusing the second scan signal line S2 as the first scan signal line S1 and reusing the fourth scan signal line S4 as the third scan signal line S3, which is taken as an example for illustration. In other embodiments, the second scan signal line S2 may not be reused as the first scan signal line S1, and the fourth scan signal line S4 may not be reused as the third scan signal line S3, which may not be limited in the present disclosure.

In the reset stage t1, the thirteenth transistor M13 and the fourteenth transistor M14 may be turned on to be in conduction in response to the conduction level of the third scan signal line S3; the ninth transistor M9 and the twelfth transistor M12 may be turned off to be in disconnection in response to the cut-off level of the first scan signal line S1; and the eleventh transistor M11 may be turned off to be in disconnection in response to the cut-off level of the light emission control signal line EM. The thirteenth transistor M13 may transmit the second power supply voltage signal of the second power supply voltage signal line VSS to the first electrode of the light-emitting element D to reset the first electrode of the light-emitting element D. The fourteenth transistor M14 may transmit the second reset signal of the second reset signal line Vref2 to the first node N1 to reset the first node N1.

In the data writing stage t2, the ninth transistor M9 and the twelfth transistor M12 may be turned on to be in conduction in response to the conduction level of the first scan signal line S1; the eleventh transistor M11 may be turned off to be in disconnection in response to the cut-off level of the light emission control signal line EM; and the thirteenth transistor M13 and the fourteenth transistor M14 may be turned off to be in disconnection in response to the cut-off level of the third scan signal line S3. The data signal of the data-signal line data may be written into the first node N1 sequentially through the ninth transistor M9 and the twelfth transistor M12. The second storage capacitor Cst2 may maintain the potential of the first node N1.

In the light-emitting stage t3, the eighth transistor M8 and the tenth transistor M10 may be turned on to be in conduction in response to the conduction level of the first node N1; the ninth transistor M9 and the twelfth transistor M12 may be turned off to be in disconnection in response to the cut-off level of the first scan signal line S1; the eleventh transistor M11 may be turned on to be in conduction in response to the conduction level of the light emission control signal line EM; and the thirteenth transistor M13 and the fourteenth transistor M14 may be turned off to be in disconnection in response to the cut-off level of the third scan signal line S3. The eighth transistor M8 may provide the driving current to the first electrode of the light-emitting element D; and the driving current of the tenth transistor M10 may be transmitted to the first electrode of the light-emitting element D through the eleventh transistor M11. The eighth transistor M8 and the tenth transistor M10 may jointly drive the light-emitting element D to emit light.

In the existing technology, a large quantity of transistors may be on the driving branch between the first power supply voltage signal line VDD and the second power supply voltage signal line VSS; and each transistor may divide the voltage (that is, generate certain voltage drop). Therefore, if the brightness of the light-emitting element D can still reach desired brightness after voltage division of the plurality of transistors, a relatively large voltage difference (i.e., cross-voltage) between the first power supply voltage signal and the second power supply voltage signal may be needed, which may result in high power consumption.

In some embodiments of the present disclosure, the first driving branch L1 may only have the first driving module 101 (the eighth transistor M8); and the second driving branch L2 may only have the second driving module 103 (the tenth transistor M10) and the first switching module 104 (the eleventh transistor M11). That is, the quantity of transistors on the first driving branch L1 and/or the second driving branch L2 may be reduced. Therefore, the voltage division of the transistors on the first driving branch L1 and/or the second driving branch L2 may be reduced, which may be beneficial for reducing the cross-voltage between the first power supply voltage signal and the second power supply voltage signal and reducing power consumption.

Figure 31:
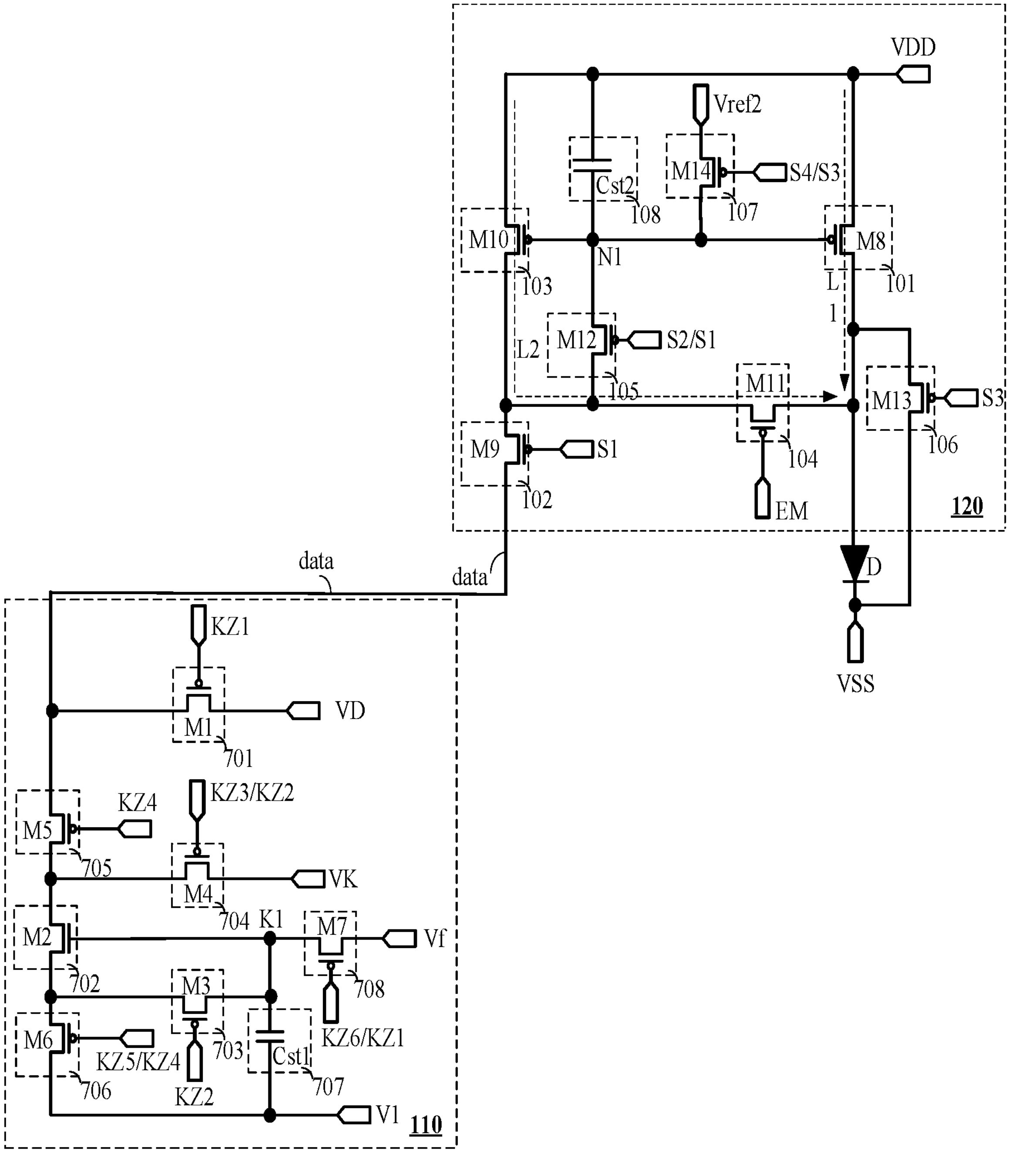
FIG. 31 illustrates a circuit connection schematic of a pixel circuit and a pre-charge circuit according to various embodiments of the present disclosure.

FIG. 31 illustrates a circuit connection schematic of the pixel circuit and the pre-charge circuit according to various embodiments of the present disclosure. Referring to FIG. 31, due to the current sink problem, when the transistor type of the first driving module 101 in the pixel circuit 120 is same as the transistor type of the driving unit 702 in the pre-charge circuit 110, the data signal outputted by the pre-charge circuit 110 may be difficult to write into the pixel circuit 120.

In some embodiments, the transistor type of the first driving module 101 in the pixel circuit 120 and the transistor type of the driving unit 702 in the pre-charge circuit 110 may be different. For example, referring to FIG. 31, according to some embodiments of the present disclosure, optionally, the first driving module 101 may include the P-type transistor, and the driving unit 702 may include the N-type transistor.

In such way, the first driving module 101 may be the P-type transistor and the driving unit 702 may be the N-type transistor, and the transistor types of the first driving module 101 and the driving unit 702 may be different. Therefore, the current sink problem may be desirably reduced, and the data signal outputted by the pre-charge circuit 110 may be desirably written into the pixel circuit 120.

According to some embodiments of the present disclosure, optionally, the pixel circuit 120 may also include the second driving module 103. Both the first driving module 101 and the second driving module 103 may include transistors of a same type. For example, when the first driving module 101 is the P-type transistor, the second driving module 103 may also be the P-type transistor.

According to other embodiments of the present disclosure, optionally, the first driving module 101 may include the N-type transistor, and the driving unit 702 may include the P-type transistor.

In such way, the first driving module 101 may be the N-type transistor and the driving unit 702 may be the P-type transistor; and the transistor types of the first driving module 101 and the driving unit 702 may be different. Therefore, the current sink problem may be desirably improved, and the data signal outputted by the pre-charge circuit 110 may be desirably written into the pixel circuit 120.

In addition, the current voltage range of the signal outputted from the driver chip may be based on the operating voltage range of the P-type transistor. Therefore, if the driving unit 702 is the P-type transistor, the current control signal with a desired voltage value may be provided to the current control signal terminal based on a commonly used driving chip, and there is no need to fabricate the driving chip, thereby reducing production costs.

According to some embodiments of the present disclosure, optionally, the pixel circuit 120 may also include the second driving module 103; and both the first driving module 101 and the second driving module 103 may include transistors of a same type. For example, when the first driving module 101 is the N-type transistor, the second driving module 103 may also be the N-type transistor.

Referring to FIG. 31, according to some embodiments of the present disclosure, optionally, the width-to-length ratio of the channel region of the driving transistor (i.e., the second transistor M2) in the pre-charge circuit 110 may be greater than the width-to-length ratio of the channel region of the driving transistor (i.e., the eighth transistor M8 or the tenth transistor M10) in the pixel circuit 120. That is, the second transistor M2 may have a relatively large width-to-length ratio of the channel region.

In such way, the second transistor M2 may have a relatively large width-to-length ratio of the channel region. Therefore, the second transistor M2 may have a strong driving capability, such as being able to output a relatively large current, thereby desirably ensuring the data signal to be inputted to the pixel circuit and desirably ensuring the smooth writing of the data signal.

It should be noted that in other embodiments, the width-to-length ratio of the channel region of the driving transistor (i.e., the second transistor M2) in the pre-charge circuit 110 may be less than or equal to the width-to-length ratio of the channel region of the driving transistor (i.e., the eighth transistor M8 or the tenth transistor M10) in the pixel circuit 120, which may not be limited in the present disclosure.

Referring to FIG. 31, according to some embodiments of the present disclosure, optionally, the capacitance of the storage capacitor (i.e., the first storage capacitor Cst1) in the pre-charge circuit 110 may be less than the capacitance value of the storage capacitor (i.e., the second storage capacitor Cst2) in the pixel circuit 120.

The first storage capacitor Cst1 may maintain the potential of the first control node K1 for a relatively short time. Therefore, selecting the first storage capacitor Cst1 with a smaller capacitance may maintain the potential of the first control node K1 while reducing the size of the first storage capacitor Cst1 and the wiring space occupied by the first storage capacitor Cst1.

It should be noted that in other embodiments, the capacitance of the storage capacitor (i.e., the first storage capacitor Cst1) in the pre-charge circuit 110 may be greater than or equal to the capacitance of the storage capacitor (i.e., the second storage capacitor Cst2) in the pixel circuit 120, which may not be limited in the present disclosure.

Figure 32:
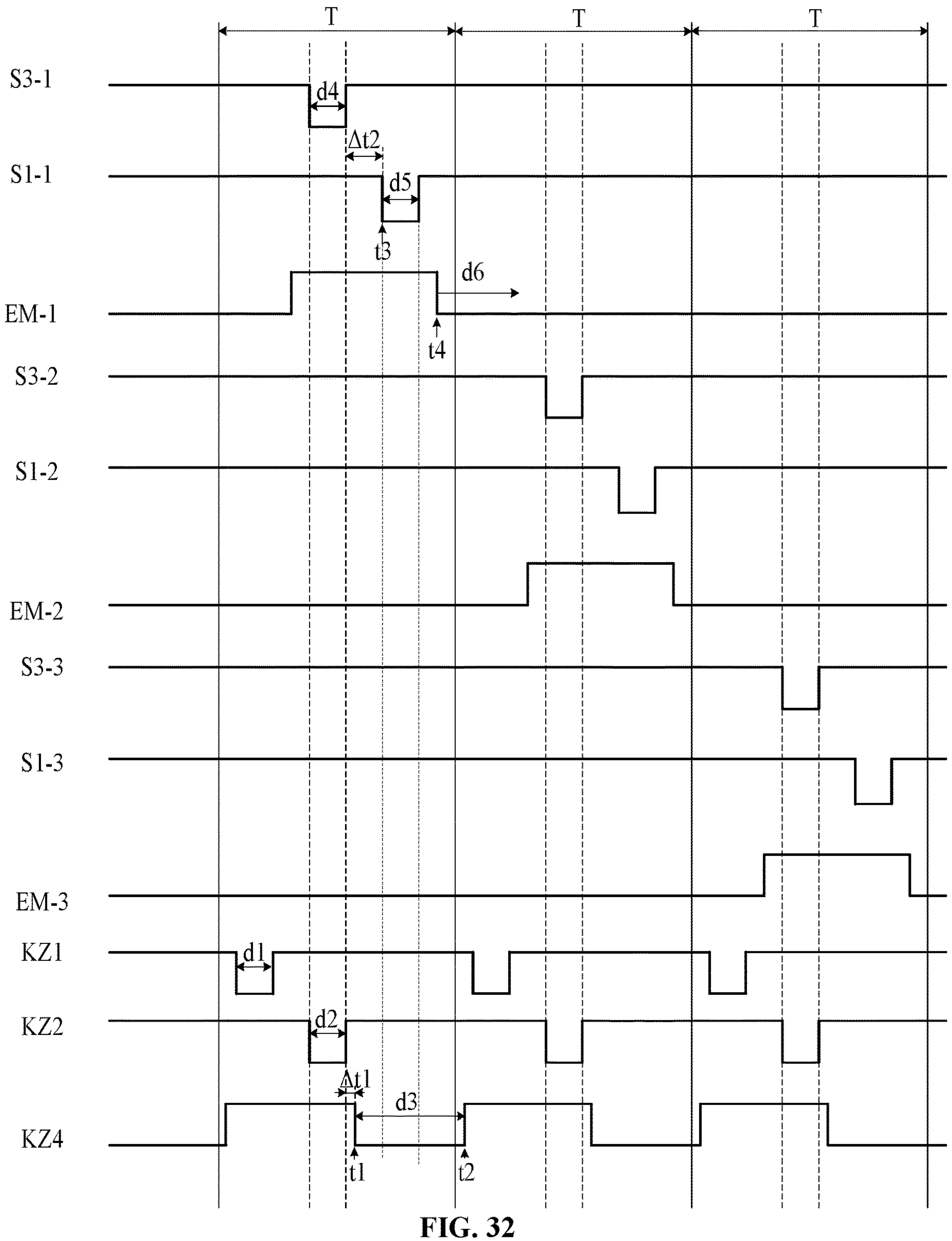
FIG. 32 illustrates a driving time sequence diagram of a pixel circuit and a current source circuit according to various embodiments of the present disclosure.

FIG. 32 illustrates a driving time sequence diagram of the pixel circuit and the current source circuit according to various embodiments of the present disclosure. FIG. 32 shows the operation time sequence of the multi-row pixel circuits. For example, S1-1 represents the first scan signal line S1 connected to the pixel circuit in the first row, S3-1 represents the third scan signal line S3 connected to the pixel circuit in the first row, and EM-1 represents the light-emitting control signal line EM connected to the pixel circuit in the first row. For another example, S1-2 represents the first scan signal line S1 connected to the pixel circuits in the second row, S3-2 represents the third scan signal line S3 connected to the pixel circuits in the second row, and EM-2 represents the light-emitting control signal line EM connected to the pixel circuit in the second row. For another example, S1-3 represents the first scan signal line S1 connected to the pixel circuit in the third row, S3-3 represents the third scan signal line S3 connected to the pixel circuit in the third row, and EM-3 represents the light-emitting control signal line EM connected to the pixel circuit in the third row.

In embodiments shown in FIGS. 31-32, the second scan signal line S2 may be reused as the first scan signal line S1, the fourth scan signal line S4 may be reused as the third scan signal line S3, the third control signal line KZ3 may be reused as the second control signal line KZ2, the fifth control signal line KZ5 may be reused as the fourth control signal line KZ4, and the sixth control signal line KZ6 may be reused as the first control signal line KZ1. In other embodiments, the second scan signal line S2 may not be reused as the first scan signal line S1, the fourth scan signal line S4 may not be reused as the third scan signal line S3, the third control signal line KZ3 may not be reused as the second control signal line KZ2, the fifth control signal line KZ5 may not be reused as the fourth control signal line KZ4, and the sixth control signal line KZ6 may not be reused as the first control signal line KZ1, which may not be limited in the present disclosure.

Referring to FIGS. 31-32, according to some embodiments of the present disclosure, optionally, the pre-charge circuit 110 may include the pre-charge unit 701, the driving unit 702, the compensation unit 703, the signal input unit 704, and the first switching unit 705, the second switching unit 706, the storage unit 707 and the reset unit 708. The pre-charge unit 701 may include the first transistor M1, the driving unit 702 may include the second transistor M2, the compensation unit 703 may include the third transistor M3, the signal input unit 704 may include the fourth transistor M4, and the first switching unit 705 may include the fifth transistor M5, the second switching unit 706 may include the sixth transistor M6, the storage unit 707 may include the first storage capacitor Cst1, and the reset unit 708 may include the seventh transistor M7.

The connection manners of all transistors in the pre-charge circuit 110 refer to the above description of the connection manners of all modules/units in the pre-charge circuit 110, which may not be described in detail herein.

Referring to FIGS. 31-32, according to some embodiments of the present disclosure, optionally, the pixel circuit 120 may include the first driving module 101, the data writing module 102, the second driving module 103, the first switching module 104, the second switching module 105, the first reset module 106, the second reset module 107 and the first storage module 108. The first driving module 101 may include the first transistor M1, the data writing module 102 may include the second transistor M2, the second driving module 103 may include the third transistor M3, the first switching module 104 may include the fourth transistor M4, the second switching module 105 may include the fifth transistor M5, and the first reset module 106 may include the sixth transistor M6, the second reset module 107 may include the seventh transistor M7, and the first storage module 108 may include the second storage capacitor Cst2.

The connection manners of all modules in the pixel circuit 120 have been described in detail above, which may not be described in detail herein.

Referring to FIGS. 31-32, in the period T of providing the data signal to one pixel circuit 120, the pre-charge circuit 110 may include the first reset stage d1, the current control signal write stage d2 and the first data writing stage d3 which are arranged in chronological order. The working process of the pixel circuit 120 may include the second reset stage d4, the second data writing stage d5 and the light-emitting stage d6 which are arranged in chronological order. The first data writing stage d3 may be at least partially overlapped with the second data writing stage d5.

Referring to FIGS. 31-32, in the first reset stage d1, the first transistor M1 may be turned on to be in conduction under the control of the first control signal line KZ1, and the pre-charge voltage signal of the pre-charge voltage signal terminal VD may be transmitted to the data-signal line data to pre-charge the data-signal line data. In the first reset stage d1, the seventh transistor M7 may be turned on to be in conduction under the control of the first control signal line KZ1 (or the sixth control signal line KZ6), and the reset signal on the reset signal line Vf may be transmitted to the first control node K1 to reset the first control node K1.

In the current control signal write stage d2, the third transistor M3 and the fourth transistor M4 may be turned on to be in conduction under the control of the second control signal line KZ2, and the current control signal of the current control signal terminal VK may be written into the first control node K1 sequentially through the third transistor M3, the second transistor M2, and the fourth transistor M4, such that the first control node K1 may reach the target potential.

In the first data writing stage d3, the second transistor M2 may be turned on to be in conduction under the control of the first control node K1 at the target potential, the fifth transistor M5 and the sixth transistor M6 may be turned on to be in conduction under the control of the fourth control signal line KZ4 (or the fifth control signal line KZ5), and the second transistor M2 may output the electrical signal driven by the target voltage signal which is provided by the target voltage signal line V1. The data signal may include the electrical signal outputted by the second transistor M2. The electrical signal (i.e., data signal) outputted by the second transistor M2 may be transmitted to the data-signal line data through the fifth transistor M5.

In the second reset stage d4, the thirteenth transistor M13 and the fourteenth transistor M14 may be turned on to be in conduction in response to the conduction level of the third scan signal line S3; the ninth transistor M9 and the twelfth transistor M12 may be turned off to be in disconnection in response to the cut-off level of the first scan signal line S1; and the eleventh transistor M11 may be turned off to be in disconnection in response to the cut-off level of the light emission control signal line EM. The thirteenth transistor M13 may transmit the second power supply voltage signal of the second power supply voltage signal line VSS to the first electrode of the light-emitting element D to reset the first electrode of the light-emitting element D. The fourteenth transistor M14 may transmit the second reset signal of the second reset signal line Vref2 to the first node N1 to reset the first node N1.

In the second data writing stage d5, the ninth transistor M9 and the twelfth transistor M12 may be turned on to be in conduction in response to the conduction level of the first scan signal line S1; the eleventh transistor M11 may be turned off to be in disconnection in response to the cut-off level of the light emission control signal line EM; and the thirteenth transistor M13 and the fourteenth transistor M14 may be turned off to be in disconnection in response to the cut-off level of the third scan signal line S3. The data signal of the data-signal line data may be written into the first node N1 sequentially through the ninth transistor M9 and the twelfth transistor M12. The second storage capacitor Cst2 may maintain the potential of the first node N1.

In the light-emitting stage d6, the eighth transistor M8 and the tenth transistor M10 may be turned on to be in conduction in response to the conduction level of the first node N1; the ninth transistor M9 and the twelfth transistor M12 may be turned off to be in disconnection in response to the cut-off level of the first scan signal line S1; the eleventh transistor M11 may be turned on in response to the conduction level of the light emission control signal line EM; and the thirteenth transistor M13 and the fourteenth transistor M14 may be turned off to be in disconnection in response to the cut-off level of the third scan signal line S3. The eighth transistor M8 may provide the driving current to the first electrode of the light-emitting element D, and the driving current of the tenth transistor M10 may be transmitted to the first electrode of the light-emitting element D through the eleventh transistor M11. The eighth transistor M8 and the tenth transistor M10 may jointly drive the light-emitting element D to emit light.

Referring to FIG. 32, according to some embodiments of the present disclosure, optionally, the starting time t1 of the first data writing stage d3 may be earlier than the starting time t3 of the second data writing stage d5; and the duration of the first data writing stage d3 may be longer than the duration of the second data writing stage d5. And/or, the ending time t2 of the first data writing stage d3 may be later than the staring time t4 of the light-emitting stage d6.

In such way, the starting time t1 of the first data writing stage d3 may be earlier than the starting time t3 of the second data writing stage d5, the data signal provided by the pre-charge circuit 110 may be written into the data-signal line data in advance to ensure that the data signal has sufficient time to be written into the pixel circuit 120 from the data-signal line data. And/or, the ending time t2 of the first data writing stage d3 may be later than the staring time t4 of the light-emitting stage d6, which may ensure that the data signal has sufficient time to be written into the pixel circuit 120 from the data-signal line data.

Referring to FIG. 32, according to some embodiments of the present disclosure, optionally, the current control signal write stage d2 and the second reset stage d4 may be at least partially overlapped with each other. For example, in some embodiments, the current control signal write stage d2 and the second reset stage d4 may be completely overlapped with each other. And/or, the first time interval Δt1 between the current control signal write stage d2 and the first data writing stage d3 may be less than or equal to the second time interval Δt2 between the second reset stage d4 and the second data writing stage d5.

In such way, the first time interval Δt1 between the current control signal write stage d2 and the first data writing stage d3 may be relatively small, which may reduce the current leakage time of the transistor (e.g., the fourteenth transistor T14) in the pre-charge circuit 110, maintain the stability of the potential of the first control node K1, and desirably ensure that the current value of the data signal provided by the pre-charge circuit 110 may reach desired current value.

Figure 33:
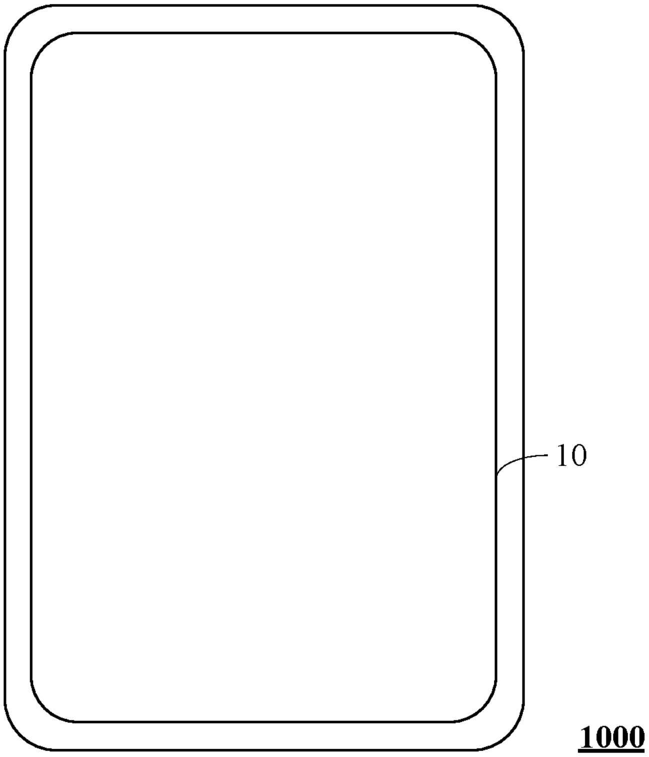
FIG. 33 illustrates a structural schematic of a display apparatus according to various embodiments of the present disclosure.

Based on the display panel 10 provided in above-mentioned embodiment, correspondingly, the present disclosure further provides a display apparatus including the display panel provided by the present disclosure. Referring to FIG. 33, FIG. 33 illustrates a structural schematic of a display apparatus according to various embodiments of the present disclosure. A display apparatus 1000 provided in FIG. 33 may include the display panel 10 provided in any of above-mentioned embodiments of the present disclosure. In one embodiment of FIG. 33, a mobile phone is taken as an example to illustrate the display apparatus 1000. It may be understood that the display apparatus provided by embodiments of the present disclosure may be a wearable product, a computer, a television, a vehicle-mounted display apparatus, or other display apparatus with a display function, which may not be limited in the present disclosure. The display apparatus provided by embodiment of the present disclosure has the beneficial effects of the display panel 10 provided by embodiment of the present disclosure, which may refer to specific description of the display panel 10 in above-mentioned embodiments and may not be described in detail in embodiments of the present disclosure.

It should be understood that specific structure and time sequence of the circuits provided in the drawings of embodiments of the present disclosure may be only exemplary and may not be intended to limit the present disclosure. In addition, above-mentioned embodiments provided in the present disclosure may be combined with each other without conflict.

It should be noted that each embodiment in the present disclosure is described in a progressive manner; same or similar parts between various embodiments are referred to each other; and each embodiment focuses on differences from other embodiments. According to above-described embodiments of the present disclosure, these embodiments do not exhaustively describe all details, and the present disclosure is not limited to embodiments described. Obviously, various modifications and variations may be made based on above description. The present disclosure selects and describes above-mentioned embodiments to better explain the principles and practical applications of the present disclosure, such that those skilled in the art may desirably use the present disclosure and make modifications based on the present disclosure. The present disclosure is limited only by the claims and their corresponding full scope and equivalents.

Those skilled in the art should understand that above-mentioned embodiments are exemplary rather than restrictive. Different technical features in different embodiments may be combined to achieve beneficial effects. Those skilled in the art should understand and implement other modified embodiments of disclosed embodiments based on the drawings, description and claims. In the claims, the term "comprise" may not exclude other structures; the quantity "one" may not exclude "plurality"; and the terms "first" and "second" may be configured to indicate names rather than to indicate any specific order. Any reference signs in the claims shall not be understood as the limitation of the protection scope. Certain technical features in different dependent claims may not indicate that these technical features cannot be combined to achieve beneficial effects.

It may be seen from above-mentioned embodiments that the display panel and the display apparatus provided by the present disclosure may at least achieve the following beneficial effects.

According to the display panel and display apparatus in the present disclosure, the display panel may include the pre-charge circuit, the data-signal line and the pixel circuit; the pre-charge circuit may be electrically connected to the pixel circuit through the data-signal line; before the data signal is written into the pixel circuit, the pre-charge circuit may provide the pre-charge voltage signal to the data-signal line; and the data-signal line may be charged through the pre-charge voltage signal. Pre-charging the data-signal line through the pre-charge circuit may be beneficial for compensating or reducing the impact of the load at the data-signal line on writing the data signal (i.e., charging) to the pixel circuit. Since the data-signal line has been at the pre-charge potential in advance, when the data-signal line charges the pixel circuit, the potential of the data-signal line may reach desired target potential relatively quickly from the pre-charge potential, thereby shortening the time for the pixel circuit to enter the charging state or improving the charging efficiency of the pixel circuit at an initial stage of charging. When the time for the pixel circuit to enter the charging state is shortened or the charging efficiency at the initial stage of charging is improved, overall charging efficiency of the pixel circuit during the charging process may be improved, and the charging process may be accelerated, which may reduce the problem of low actual brightness of the light-emitting element due to insufficient charging of the pixel circuit and improve the display effect of the display panel.

Although some embodiments of the present disclosure have been described in detail through various embodiments, those skilled in the art should understand that above embodiments may be for illustration only and may not be intended to limit the scope of the present disclosure. Those skilled in the art should understand that modifications may be made to above embodiments without departing from the scope and spirit of the present disclosure. The scope of the present disclosure may be defined by the appended claims.

What is claimed is:

1. A display panel, comprising:

a pre-charge circuit, a data-signal line and a pixel circuit, wherein:

the pre-charge circuit is electrically connected to the pixel circuit through the data-signal line;

before a data signal is written into the pixel circuit, the pre-charge circuit provides a pre-charge voltage signal to the data-signal line, and the data-signal line is charged through the pre-charge voltage signal; and the pre-charge circuit includes a pre-charge unit, wherein a control terminal of the pre-charge unit is electrically connected to a first control signal line, a first terminal of the pre-charge unit is electrically connected to a pre-charge voltage signal terminal, and the second terminal of the pre-charge unit is electrically connected to the data-signal line; and the pre-charge unit is configured to be in conduction under control of the first control signal line and transmit a pre-charge voltage signal of the pre-charge voltage signal terminal to the data-signal line.

2. The display panel according to claim 1, wherein:

the pre-charge circuit is electrically connected to at least two pixel circuits disposed along a first direction through the data-signal line; and the at least two pixel circuits include a first pixel circuit and a second pixel circuit;

before a first data signal is written into the first pixel circuit, the pre-charge circuit provides a pre-charge voltage signal of a first voltage value to the data-signal line, and the data-signal line is charged through the pre-charge voltage signal of the first voltage value; and before a second data signal is written into the second pixel circuit, the pre-charge circuit provides a pre-charge voltage signal of a second voltage value to the data-signal line, and the data-signal line is charged through the pre-charge voltage signal of the second voltage value, wherein the first voltage value is different from the second voltage value.

3. The display panel according to claim 2, wherein:

the pixel circuit includes a first driving module configured to drive a light-emitting element to emit light;

along the first direction, a distance between the first pixel circuit and the pre-charge circuit is greater than a distance between the second pixel circuit and the pre-charge circuit; and the first driving module includes an N-type transistor, and the first voltage value is greater than the second voltage value; or the first driving module includes a P-type transistor, and the first voltage value is less than the second voltage value.

4. The display panel according to claim 1, wherein:

the pre-charge circuit is electrically connected to a plurality of pixel circuits arranged along a first direction through the data-signal line; the plurality of pixel circuits is divided into a quantity n of pixel circuit groups arranged sequentially along the first direction, wherein n is a positive integer; a pixel circuit group includes at least one pixel circuit; and along the first direction, a minimum distance between a first pixel circuit group and the pre-charge circuit is greater than a minimum distance between an n-th pixel circuit group and the pre-charge circuit;

the pixel circuit includes a first driving module configured to drive a light-emitting element to emit light; and the first driving module includes an N-type transistor, and voltage values of pre-charge voltage signals corresponding to pixel circuits in the first pixel circuit group to the n-th pixel circuit group decrease progressively; or the first driving module includes a P-type transistor, and voltage values of pre-charge voltage signals corresponding to pixel circuits in the first pixel circuit group to the n-th pixel circuit group increase progressively.

5. The display panel according to claim 1, wherein:

the pre-charge circuit provides a data signal with a controllable current value to the pixel circuit through the data-signal line.

6. The display panel according to claim 1, wherein the pre-charge circuit further includes:

a driving unit, wherein a control terminal of the driving unit is electrically connected to a first control node, a first terminal of the driving unit is electrically connected to a target voltage signal line, and a second terminal of the driving unit is electrically connected to the data-signal line; and the driving unit is configured to transmit a target voltage signal of the target voltage signal line to the data-signal line under control of the first control node, wherein the data signal includes the target voltage signal.

7. The display panel according to claim 6, wherein the pre-charge circuit further includes:

a compensation unit, wherein a control terminal of the compensation unit is electrically connected to a second control signal line, a first terminal of the compensation unit is electrically connected to the first control node, and a second terminal of the compensation unit is electrically connected to the first terminal of the driving unit; and a signal input unit, wherein a control terminal of the signal input unit is electrically connected to a third control signal line, a first terminal of the signal input unit is electrically connected to a current control signal terminal, and a second terminal of the signal input unit is electrically connected to the second terminal of the driving unit, wherein:

the compensation unit is configured to be in conduction under control of the second control signal line; the signal input unit is configured to be in conduction under control of the third control signal line; and a current control signal at the current control signal terminal is transmitted to the first control node sequentially through the signal input unit, the driving unit and the compensation unit.

8. The display panel according to claim 7, wherein the pre-charge circuit further includes:

a first switching unit, wherein a control terminal of the first switching unit is electrically connected to a fourth control signal line; a first terminal of the first switching unit is electrically connected to the second terminal of the driving unit and the second terminal of the signal input unit respectively; and a second terminal of the first switching unit is electrically connected to the data-signal line;

a second switching unit, wherein a control terminal of the second switching unit is electrically connected to a fifth control signal line; a first terminal of the second switching unit is electrically connected to the first terminal of the driving unit and the second terminal of the compensation unit respectively; and a second terminal of the second switching unit is electrically connected to the target voltage signal line;

a storage unit, wherein a first terminal of the storage unit is electrically connected to the target voltage signal line, and a second terminal of the storage unit is electrically connected to the first control node; and a reset unit, wherein a control terminal of the reset unit is electrically connected to a sixth control signal line, a first terminal of the reset unit is electrically connected to a first reset signal line, and a second terminal of the reset unit is electrically connected to the first control node; and the reset unit is configured to be in conduction under control of the sixth control signal line and transmit a first reset signal of the first reset signal line to the first control node.

9. The display panel according to claim 7, further including:

a plurality of fan-out lines and a plurality of pre-charge circuits, wherein a fan-out line is electrically connected to the first terminal of the signal input unit of at least one pre-charge circuit; and the fan-out line is configured to provide the current control signal to the first terminal of the signal input unit.

10. The display panel according to claim 9, further including:

a first demultiplexer circuit, wherein one fan-out line is electrically connected to first terminals of signal input units of at least two pre-charge circuits through the first demultiplexer circuit; and the one fan-out line sequentially writes the current control signal to the first terminals of the signal input units of the at least two pre-charge circuits through the first demultiplexer circuit.

11. The display panel according to claim 10, wherein:

the first demultiplexer circuit at least includes a first switching element and a second switching element, wherein:

a first terminal of the first switching element and a first terminal of the second switching element are both electrically connected to a same fan-out line; a second terminal of the first switching element and a second terminal of the second switching element are electrically connected to first terminals of signal input units of different pre-charge circuits respectively; and the first switching element and the second switching element are in conduction in a time-sharing manner.

12. The display panel according to claim 1, wherein:

the display panel includes a plurality of data-signal lines extending along a first direction and arranged to be spaced apart along a second direction, wherein the first direction intersects the second direction;

the display panel further includes a second demultiplexer circuit, wherein one pre-charge circuits is electrically connected to a plurality of data-signal lines through the second demultiplexer circuit; and the one data-signal lines is electrically connected to at least two pixel circuits arranged along the first direction; and the one pre-charge circuit provides the pre-charge voltage signal and/or the data signal to the plurality of data-signal lines in a time-sharing manner through the second demultiplexer circuit; or the one pre-charge circuit provides the pre-charge voltage signal and/or the data signal to a part of the plurality of data-signal lines through the second demultiplexer circuit.

13. The display panel according to claim 1, wherein:

the display panel includes a display region and a non-display region; the display region is disposed with a light-emitting element; the pixel circuit is at the display region; and the pre-charge circuit is at the display region or the non-display region.

14. The display panel according to claim 1, wherein the pixel circuit includes:

a first light-emitting driving branch connected to a light-emitting element, wherein the first light-emitting driving branch includes a first driving module; a control terminal of the first driving module is electrically connected to a first node, a first terminal of the first driving module is electrically connected to a first power supply voltage signal line, and a second terminal of the first driving module is electrically connected to a first electrode of the light-emitting element; and a data writing module, wherein a control terminal of the data writing module is electrically connected to a first scan signal line, a first terminal of the data writing module is electrically connected to the data-signal line, and a second terminal of the data writing module is electrically connected to the first node; and the data writing module is configured to transmit the data signal of the data-signal line to the first node.

15. The display panel according to claim 14, wherein the pixel circuit further includes:

a second light-emitting driving branch connected to the light-emitting element, wherein the second light-emitting driving branch includes a second driving module; and a control terminal of the second driving module is electrically connected to the first node, a first terminal of the second driving module is electrically connected to the first power supply voltage signal line, and a second terminal of the second driving module is electrically connected to the first electrode of the light-emitting element.

16. The display panel according to claim 15, wherein:

the second light-emitting driving branch further includes a first switching module, wherein a control terminal of the first switching module is electrically connected to a light-emitting control signal line; a first terminal of the first switching module is electrically connected to the second terminal of the second driving module and the second terminal of the data writing module; and a second terminal of the first switching module is electrically connected to the first electrode of the light-emitting element.

17. The display panel according to claim 16, wherein:

the first switching module is turned off to be in disconnection in a stage that the data writing module is in conduction; and/or the first switching module is turned on to be in conduction in a stage that the light-emitting element emits light.

18. The display panel according to claim 14, wherein:

the pixel circuit further includes a second switching module, wherein a control terminal of the second switching module is electrically connected to a second scan signal line, a first terminal of the second switching module is electrically connected to the second terminal of the data writing module, and a second terminal of the second switching module is electrically connected to the first node; and the second switching module is configured to be in conduction in a stage when the data writing module is in conduction, and/or the pixel circuit further includes a first reset module, wherein a control terminal of the first reset module is electrically connected to a third scan signal line, a first terminal of the first reset module is electrically connected to a first reset signal line, and a second terminal of the first reset module is electrically connected to the first electrode of the light-emitting element; and the first reset module is configured to reset the first electrode of the light-emitting element.

19. A display apparatus, comprising:

a display panel, comprising:

a pre-charge circuit, a data-signal line and a pixel circuit, wherein:

the pre-charge circuit is electrically connected to the pixel circuit through the data-signal line;

before a data signal is written into the pixel circuit, the pre-charge circuit provides a pre-charge voltage signal to the data-signal line, and the data-signal line is charged through the pre-charge voltage signal; and the pre-charge circuit includes a pre-charge unit, wherein a control terminal of the pre-charge unit is electrically connected to a first control signal line, a first terminal of the pre-charge unit is electrically connected to a pre-charge voltage signal terminal, and the second terminal of the pre-charge unit is electrically connected to the data-signal line; and the pre-charge unit is configured to be in conduction under control of the first control signal line and transmit a pre-charge voltage signal of the pre-charge voltage signal terminal to the data-signal line.

* * * * *